United States Patent [19]
Woodworth et al.

[11] Patent Number: 4,876,737
[45] Date of Patent: Oct. 24, 1989

[54] SATELLITE DATA TRANSMISSION AND RECEIVING STATION

[75] Inventors: Donald J. Woodworth; Frank A. Ziegler; James B. Grabenstein, all of Ocala, Fla.

[73] Assignee: Microdyne Corporation, Ocala, Fla.

[21] Appl. No.: 935,197

[22] Filed: Nov. 26, 1986

[51] Int. Cl.⁴ ............................................. H04B 7/14
[52] U.S. Cl. ......................................... 455/12; 455/20; 455/197
[58] Field of Search ................. 455/12, 183, 192, 313, 455/197, 314, 260, 315, 51, 14, 4, 32, 71, 131, 151, 161, 179, 228, 20–23; 375/37, 52, 57

[56] References Cited

U.S. PATENT DOCUMENTS

| | | | |
|---|---|---|---|
| 4,228,538 | 10/1980 | Scharla-Nielsen et al. | 455/12 |
| 4,232,389 | 11/1980 | Loiler | 455/12 |
| 4,252,995 | 2/1981 | Schmidt et al. | 375/52 |
| 4,384,365 | 5/1983 | Malinowski et al. | 455/197 |
| 4,607,257 | 8/1986 | Noguchi | 455/12 |
| 4,608,710 | 8/1986 | Sugiur | 455/4 |

Primary Examiner—Robert L. Griffin
Assistant Examiner—Curtis Kuntz
Attorney, Agent, or Firm—Shlesinger & Myers

[57] ABSTRACT

A satellite signal identification system utilizes distinguishable unique coded identifiers impressed on a carrier sent from a transmitting ground station to be identified. The identifier is recieved and identified by the receiving station to specifically identify a particular underlying carrier signal for reception. The invention utilizes a data modem for transmitting to an earth relay satellite coded identification signals together with various data and error correcting information. An IF carrier signal may be combined with video and/or audio signals, such combined signals being relayed via satellite to the ground station. The MPU of a modem in the ground station finds its counterpart in the MPU of the downconverter that receives via a block downconverter the data, housekeeping and ID signals after the video has been removed. The downconverter first translates the satellite transponder frequency to an IF frequency and sequentially searches for a carrier and the PSK code. The MPU establishes bit sync using the PSK carrier and then searches for the ID signal. The downconverter frequency sweeps to locate a new carrier if the desired ID is not found. Once the desired ID is detected the receiver locks on the signal through the downconverter utilizing the ID signal via a long phase lock loop to cause the local oscillator to track the phase and frequency jitter introduced by an inexpensive downconverter. The MPU demodulates and separates all of the data and housekeeping signals, the latter utilized in an error correction scheme.

11 Claims, 32 Drawing Sheets

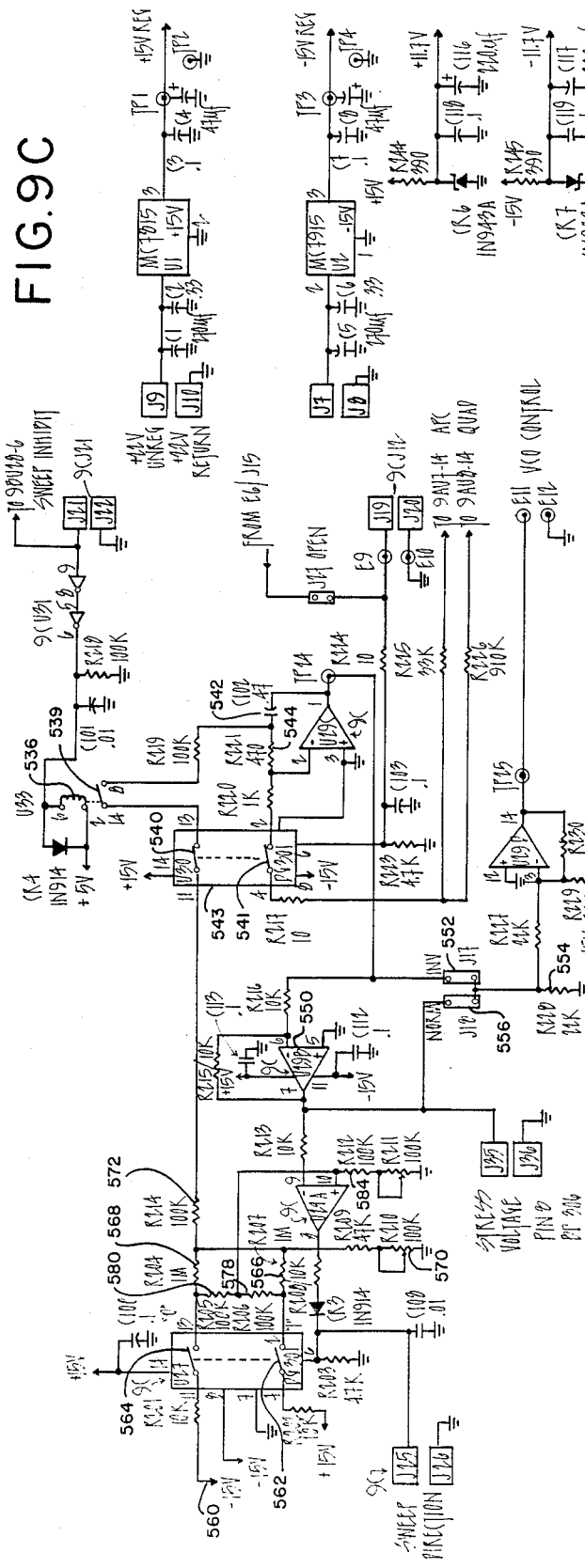

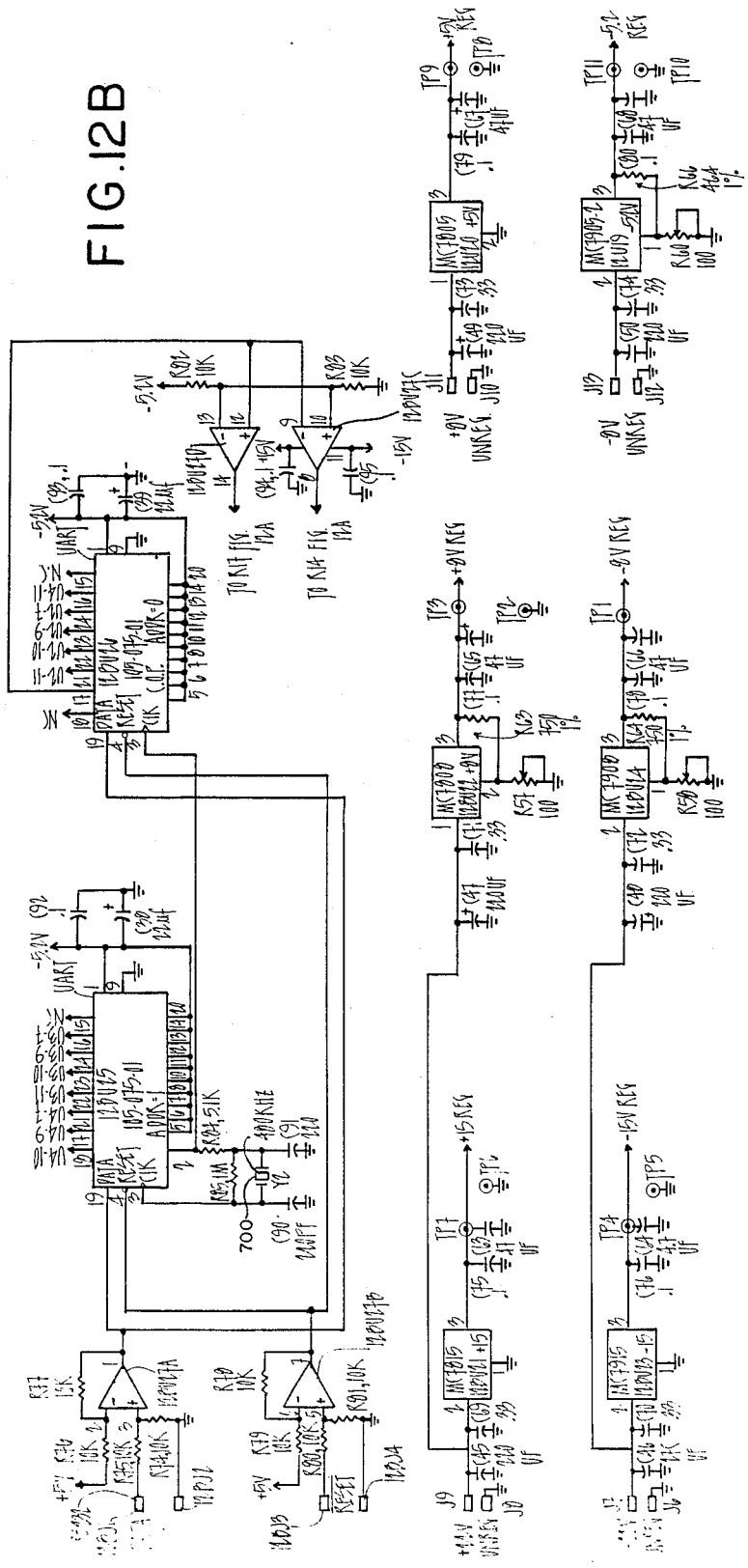

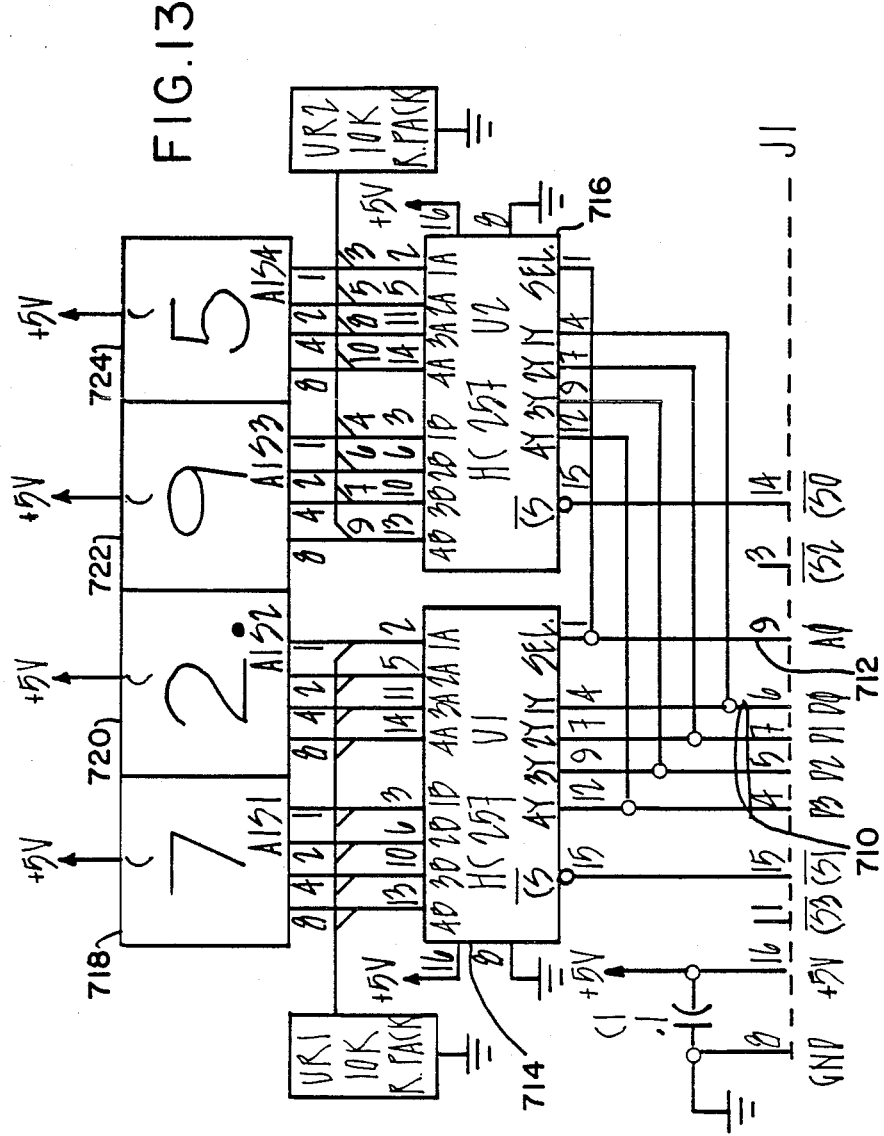

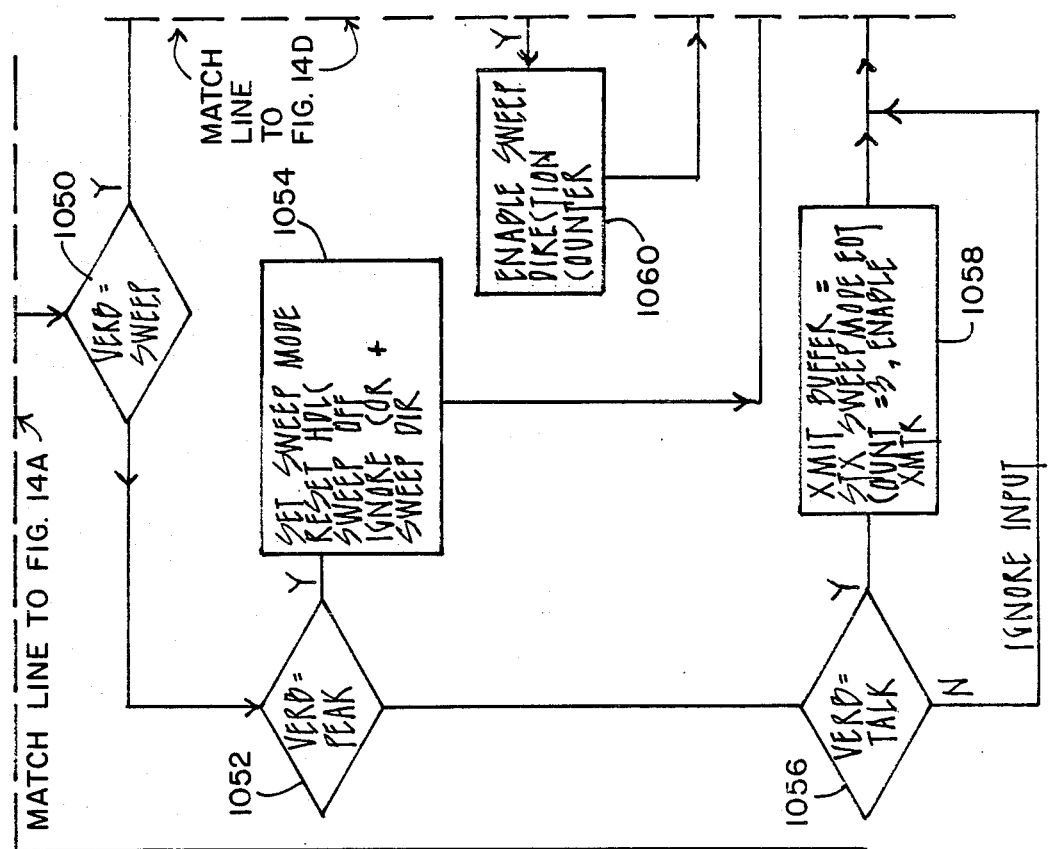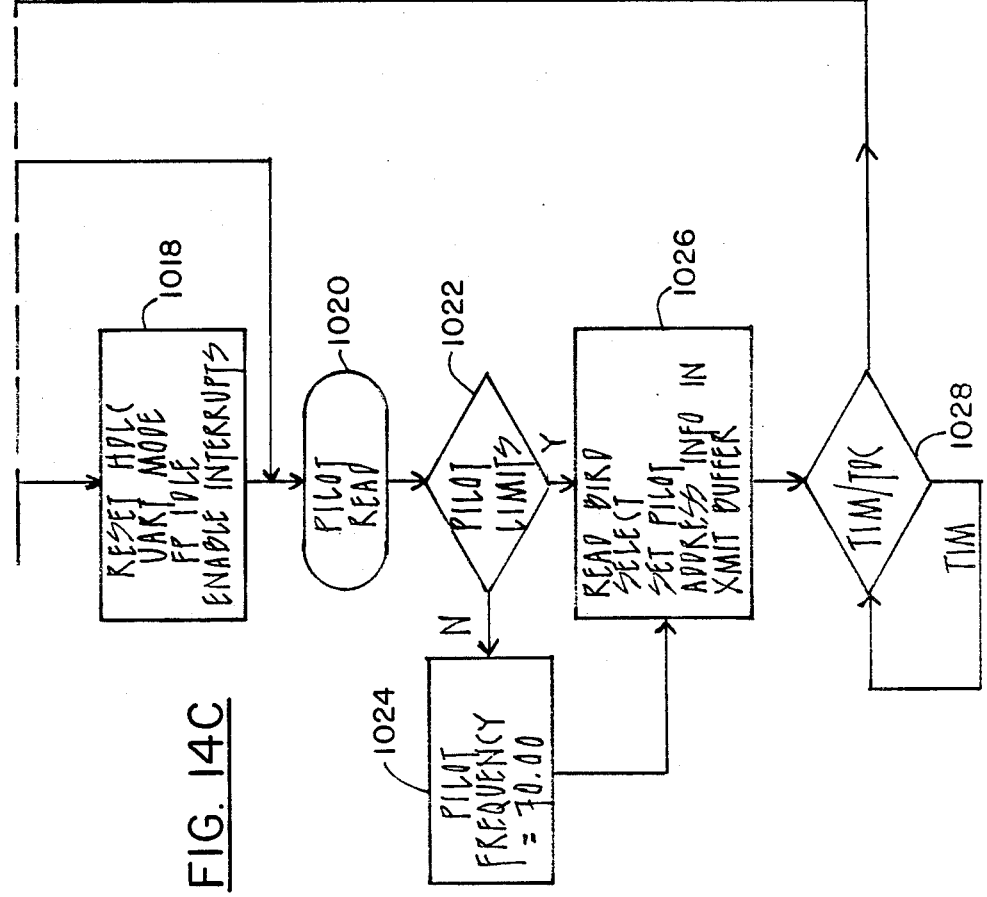
FIG. 14C

SATELLITE DATA TRANSMISSION AND RECEIVING STATION

The present invention relates to a data modem and receiving system for use primarily in earth satellite ground stations and more particularly to a low cost narrow band transmitting and receiving system for both the C and Ku bands.

BACKGROUND OF THE INVENTION

Inexpensive block downconverters have been developed for receiving video signals at earth satellite ground stations over both the C and Ku bands. These converters which typically sell for about $150 each suffer from phase and frequency jitter and variations with temperature and drift with aging. For purposes of video reception these negative characteristics are not a problem since video transmission is wide band and the converter instabilities are well down in the noise. Such characteristics however produce considerable problems in narrow band systems for use in both SCPC and data transmission and in fact produce intolerable results. To overcome the problem the industry is using expensive receivers employing synthesized stabilized front ends. Such receivers cost from $20,000 to $30,0000 dollars per unit and as a result have greatly limited the use of these systems for data transmission.

In addition to the above problem, the overall cost of a full range transmission and reception system; with data error correction video and audio signals at high baud rates; for instance, 9600 band, are currently very expensive requiring a high quality RF tuner, PSK and IF demodulators, bit sync equipment and various interfaces With all of this equipment required to provide a world wide interface the cost is extremely high, costing in the range of $30,000 to $40,000.

BRIEF DESCRIPTION OF THE INVENTION

In accordance with the present invention there is provided a modulator for transmitting data including an ID frequency signal impressed on a 50 MHz to 90 MHz subcarrier together with phase shift coded (NRZ-S) information and additional subcarrier signals impressed on a 950 MHz to 1700 MHz RF at the transmitter end and at the receiver end a tracking downconverter (TDC) for C and Ku bands The TDC locks onto and tracks the identification frequency transmitted in order to identify the desired satellite and transponder and to track phase and frequency variations thus permitting replacement in a data link of the expensive receivers with synthesizer stabilized front ends with a tracking downconverter costing one-fourth to one-sixth as much as a combination of a low noise amplifier, highly stable block downconverter and expensive receivers.

The TDC receives signals in the 950 MHz to 1700 MHz range from block downconverters at the antenna, one converter for C band and the other for Ku band The video signals, if any, are split off before the signals are applied to the TDC so that only the narrow band and ID data signals are applied thereto The TDC sweeps a ±3 MHz band about the frequency it is desired to receive in the 950 MHz to 1700 MHz band The upper limit being used by the current domestic users is 1450 MHz but for overseas operation it is designed to cover the 1700 MHz upper limit available from the block downconverters. Upon detection of a carrier in the sweep band, the sweep is halted The system is designed to receive data in the PSK format and if it detects a PSK signal it locks onto it. After achieving PSK carrier lock, the TDC bit sync locks up assuming that the received signal is at the proper bit rate. Finally the system looks for the ID data format which in the system to be described herein is a five bit digital word having a specific value, for instance 72.95 MHz plus a satellite indentifying letter A-F. If the word is found there is a full match and the system proceeds to demodulate the ID data and stabilize the 50 to 90 MHz output passband suitable for other system demodulators. If, however, the ID signal is not found after a predetermined time interval, the system starts sweeping again; the whole process taking just a few hundred milliseconds. In the case of poor reception particularly in the Ku band in poor weather, the system may acquire the ID and then lose it. Sweep will not start again for at least four or five seconds under these circumstances.

Once lockup has occurred the TDC tracks the jitter and drift in the data carrier through a long loop. In the particular system to be described, the TDC tracks the ID signal for match and controls a local oscillator at the front end of the receiver to follow frequency and phase variations of the carrier in the 950 MHz to 1700 MHz range. Thus the ID signal serves the dual function of identifying the desired transponder and providing the phase and frequency information necessary to cause the system to track the signals supplied from the block downconverters.

The system to be described accommodates a 50 MHz to 90 MHz range of subcarriers with data modulation and PM carriers modulated with analog or data signals. The identification signal is a PSK modulated signal which has a user provided data merge capability in addition to the ID data format described previously. The system utilizes NRZ-S code to overcome ambiguities associated with the standard BPSK code which permits the system to lock onto either of two opposite phases The NRZ-S code prevents this problem but in the absence of data no signal is transmitted and bit sync can be lost. To overcome this problem the microprocessor of the transmitter inserts additional bits whenever the signal goes beyond six bit intervals without data. Thus in the absence of data sufficient transitions are provided to permit bit sync to be maintained. If video signals are also transmitted, the data signals are confined to one and/or the other edge of the transmitted spectrum so that they do not interfere with the video and vice versa.

In summary, the system of the present invention utilizes a data modem for transmitting PSK (NRZ-S) code identification signals together with various data and housekeeping (error correcting) information at, for example, 15.6250 baud all on a 50 MHz to 90 MHz IF signal, which may be combined with video and/or audio signals, if desired, such combined signals being transmitted via satellite to a ground station wherein the microprocessing unit of the data modem finds, its identity in the MPU of the tracking downconverter that receives from an antenna via a block downconverter the data, housekeeping and ID signals, after the video, if any, has been split off, the tracking downconverter first translating, by means of a synthesized local oscillator, the transponder frequency, 950 MHz to 1700 MHz, down to the 50 MHz to 90 MHz IF frequency and then searching in the following order for a carrier and then the PSK carrier, then establishing bit sync using the PSK carrier and then searching for the ID signal, the tracking downconverter going into a frequency sweep to locate a new carrier in the event the ID is not found and if it is, the TDC demodulates and separates all of the data and housekeeping signals, the latter being used in a forward error correction scheme and finally the tracking down converter utilizing the ID signal via a long phase lock loop to cause the local oscillator to track the phase and frequency jitter resulting from the use of an inexpensive block downconverter, all at a cost of under $5,000.

The IF frequency, the use of NRZ-S code, the references to C and Ku band and related references to channels and bands relate to the status of communication systems presently available. The techniques and concepts employed herein are equally useful regardless of transmission bands, which may readily increase in frequency in the future, or specific phase modulated codes, numerous of which may be developed in the future, a video bands or bandwidths that may be employed subsequently. The important features such as ability to acquire a specific transponder with total certainty, to synchronize the local oscillators to the incoming signals and related features are not dependent on specific frequency ranges or phase modulated codes disclosed herein. Thus those that are disclosed are exemplary and used only for purposes of describing the operation of the present embodiment of the system.

BRIEF DESCRIPTION OF THE DRAWINGS

FIGS. 9A, 9B and 9C combine to illustrate the schematic wiring diagram of the data recovery board of the TDC;

FIG. 10 is a schematic wiring diagram of the circuits for deriving the bit sync signal of the TDC;

FIGS. 12A and 12B combine to illustrate the circuit diagrams of the first local oscillator (LO) synthesizer of the TDC;

FIG. 13 is the circuit diagram of the pilot and ID frequency controller of the TDC;

FIGS. 14A-D are a logical flow diagram of the executive routine of the microprocessor control program;

Figure 1:
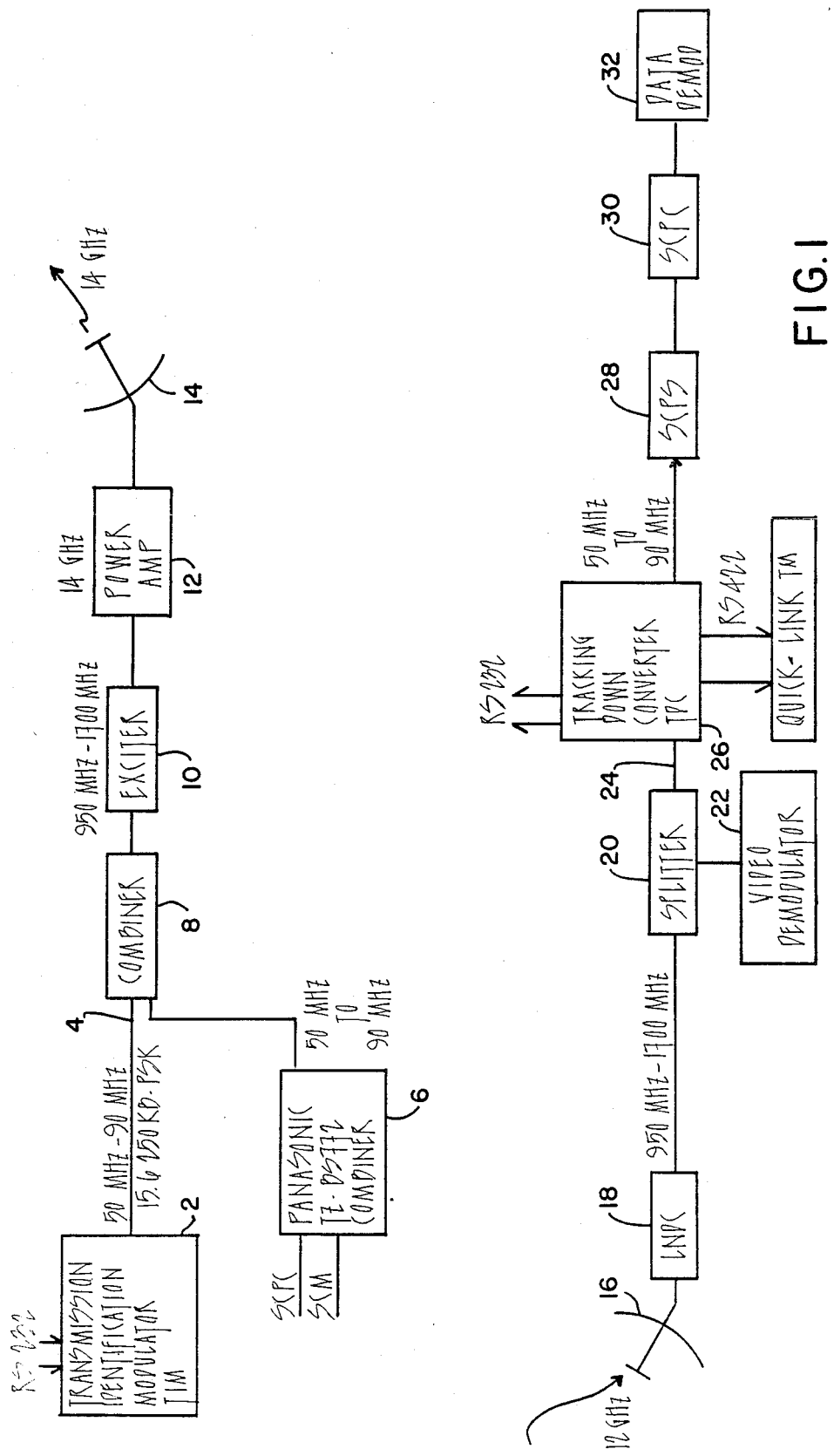
FIG. 1 is a block diagram of the overall system illustrating the major components at both the transmitting and receiving ends thereof.

The microfiche appendix comprises program listings of the microprocessor control program utilized by both the TIM and the TDC, and of the program utilized for taps control.

DETAILED DESCRIPTION OF THE PRESENT INVENTION

An unorthodox numbering system is employed in this description relative to components that appear in one figure but interface with or are referred to or designated in another figure. In these cases, the designation of the element starts with the number of the drawing followed by "U", "R", "L", "C" or "J" standing for chip, resistor, inductor, capacitor and terminal or connector respectively. These designations are then followed by designations of the specific element.

Referring now specifically to FIG. 1 of the accompanying drawings, there is illustrated in block diagram form the major components of the satellite transmission and reception system of the present invention.

A transmission identification modulator 2 (hereinafter "TIM") provides at its output an IF signal in the range of 50 MHz to 90 MHz. A PSK signal, occupying a 20 KHz bandwidth, is modulated sixty times a second by short bursts of a system defined digital code to identify the carrier, the ID signal being selectable in 10 KHz steps. In the following discussion, the IF frequency and the ID frequencies are chosen to be the same although this is not necessary in this system. The IF is modulated by a 15.6250 K bit rate PSK signal using NRZ-S code. The PSK signal may be modulated between bursts of ID code, by various data, as desired, supplied over an RS232 port and by forward error correcting code bits selected in accordance with the type of error correcting code employed In this instance a modified Hamming code is employed The baud rate of data and code may be selected to be 300, 600, 1200 or 9600 baud. If a 9600 baud rate is employed, for instance, 6000 bits are available for error correcting and other housekeeping functions.

There may also be provided various additional sources of signal such as video and audio signals from such sources as single channel per carrier modulators, SCMs, etc. If video signals are being sent they will occupy most of the 40 MHz bandwidth of the IF carrier so that the TIMS IF carrier must reside at one edge of the 50 MHz to 90 MHz band as most other single carrier per channel information. If video is not being transmitted then a number of audio, stereo, two language broadcasts, and other modulated IF frequencies may be spread across the IF band and combined in a linear combiner 6 which feeds a second linear combiner 8 when such signals are combined with the TIMS IF carrier output.

The combined signal from combiner 8 is supplied to an exciter 10 where the 50-90 MHZ intermediate frequency is modulated onto a 950 MHZ-17000 MHZ which is then impressed on a 6 GHZ carrier for C band operation or a 14 GHZ carrier for Ku band transmission. The RF signal is in turn applied to power amplifier 12 and thence to an antenna 14. In one current application the output from the element 12 is one watt supplied to a 12 foot dish at 14 GHz.

Referring now to the down-link, an antenna 16 receives a 12 GHz signal from a selected transponder and applies it to a low noise block downconverter (LNDC) 18. The converter 18 recovers the signals in the range of 950 MHz to 1700 MHz; the specific frequency desired being that transmitted from antenna 14. If the system is to be employed with video, a splitter 20 is used to split off the video to a video demodulator 22. The main signal is supplied over lead 24 to a tracking downconverter ("TDC") 26.

The input tuning of the TDC is fully synthesized in 1 MHz steps over the RF range. The TDC performs a number of functions and initially scans an ±3 MHz range about the frequency to which it is tuned to insure the desired RF can be located over the range of normal drift of the LNDC. Upon finding the desired carrier the TDC 26 seeks the PSK carrier and upon finding it attempts to obtain bit sync with the PSK data. It should be noted that in order for the TDC to accomplish a bit sync, bits must be received on a regular basis. Thus the microprocessor of the TIM inserts bits after every six no data clock cycles so that a relatively steady stream of bits is received by the TDC 26.

Upon achieving bit sync the TDC 26 now looks for the ID code and if found employs a long phase lock loop back to the LO synthesizer to cause the local oscillator to follow the phase and frequency jitter of the LNDC. If the ID signal is not found the TDC again sweeps the band in an attempt to locate another carrier. The frequency shift of the center of the sweep frequencies when the TDC attempts to acquire a new carrier, is always in the same direction to avoid repeated attempts to lock onto the same carrier.

The outputs from the TDC are transmitted via an RS232 port to external equipment such as a printer, an IF output to various demodulators such as several daisey chained single channel per carrier receivers 28 and 30 and a stand alone data demodulator 32. Also provided is an RS422 port for use with automatic acquisition equipment such as the assignee's Quick Link ™. The Quick Link is mentioned herein since the MPUs used in the TIM and the TDC and the TDC used in Quick Link are identical and only one program has been written for all of these functions; the latter with and without Quick Link. Thus Quick Link must be alluded to, to some extent along with the discussion of the program.

Figure 2:
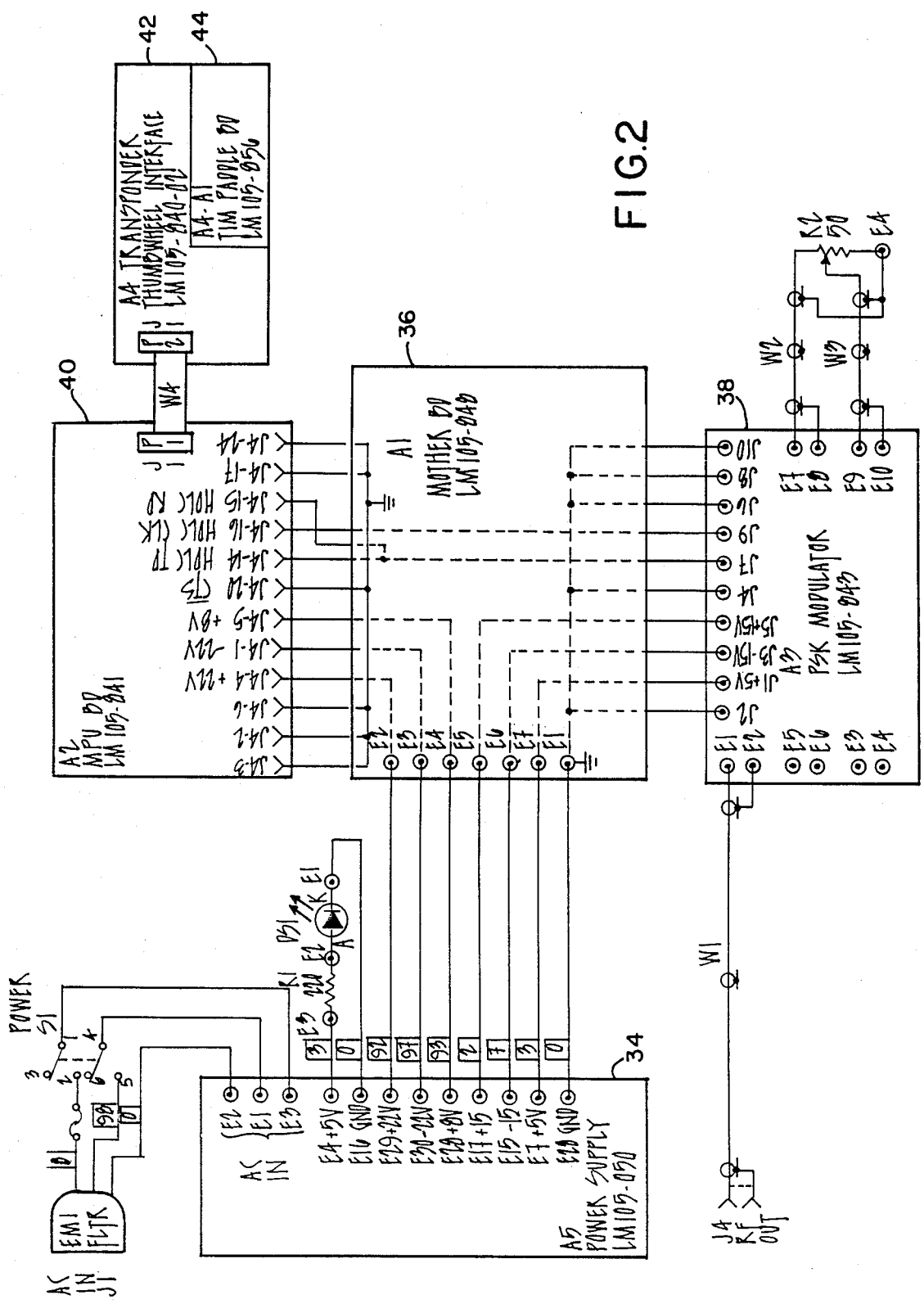
FIG. 2 is a schematic diagram of the interconnections between the major components of the transmitting end of the system.
Figure 3:
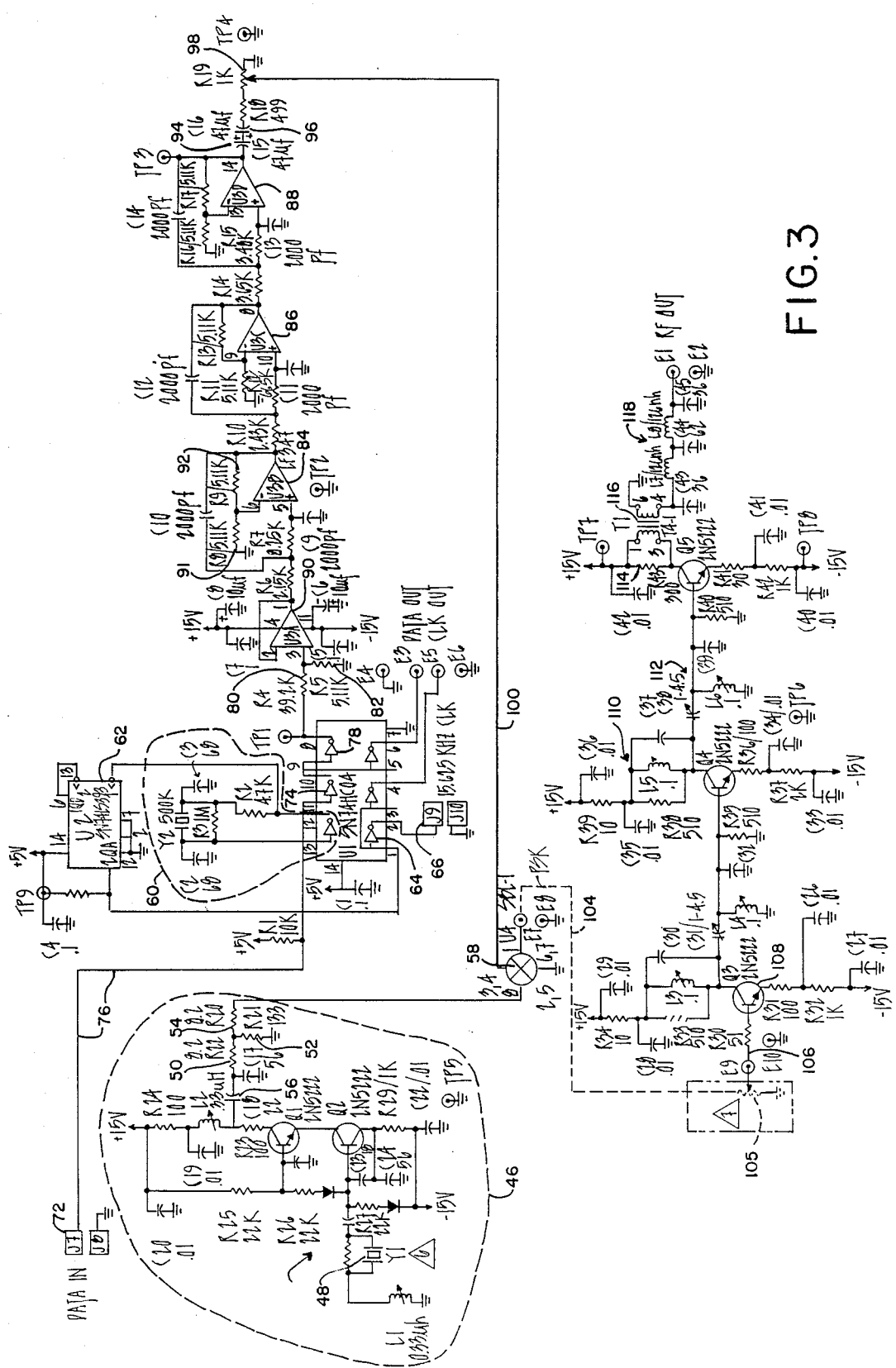
FIG. 3 is a circuit diagram of the phase shift keying modulator employed in the transmitting end of the system.
Figure 4:
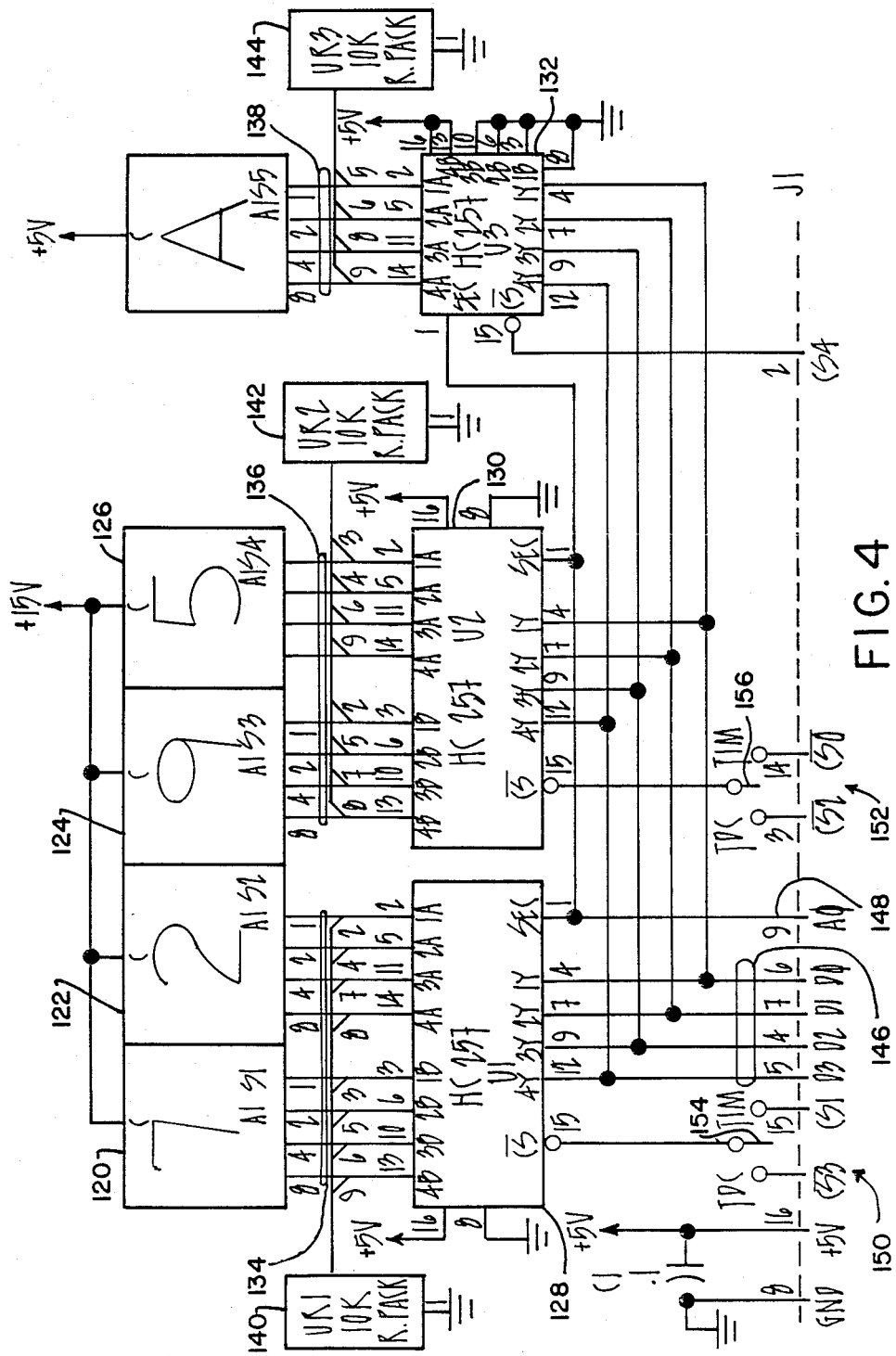
FIG. 4 is the circuit diagram of the pilot and ID frequency selecting element used at both ends of the system.

Referring now specifically to FIG. 2 of the accompanying drawing there is illustrated the major boards of the TIM and their interconnections. The boards comprise a power supply board 34 which is completely conventional and is not discussed further, a mother board 36 which provides interconnection between the various boards and also is not discussed further, a PSK modulator board 38, an MPU board 40 which is referred to in the discussion of both TIM and TDC and a thumbwheel interface 42 used to dial in the IF frequencies A plug-in board 44 to the board 42 may be employed and carries five dip switches having four positions each to define the digitized IF frequency and satellite identifier A-F for selecting the IF frequency if the front panel switches are utilized Referring now specifically to FIG. 3 of the accompanying drawings there is illustrated the circuit diagram of the PSK modulator board 38. The board 38 carries an oscillator 46 having an overtone crystal 48 that determines the IF frequency of the TIM. This frequency is user defined and, as illustrated in FIG. 4, is chosen, for purposes of example at 72.95 MHz, that is, towards the center of the 50 MHz to 90 MHz IF band. The output from the oscillator proceeds through a resistance pad, resistors 50, 52 and 54 and coupling capacitor 56 to impedance match the output of oscillator 46 to the LO port, pin 8 of a doubly balanced mixer 58, an SBL-1, used as a PSK modulator.

The modulator 58 receives data and the ID frequency word on pins 3 and 4 and reference is now made to the data section of the modulator board.

Figure 5A:
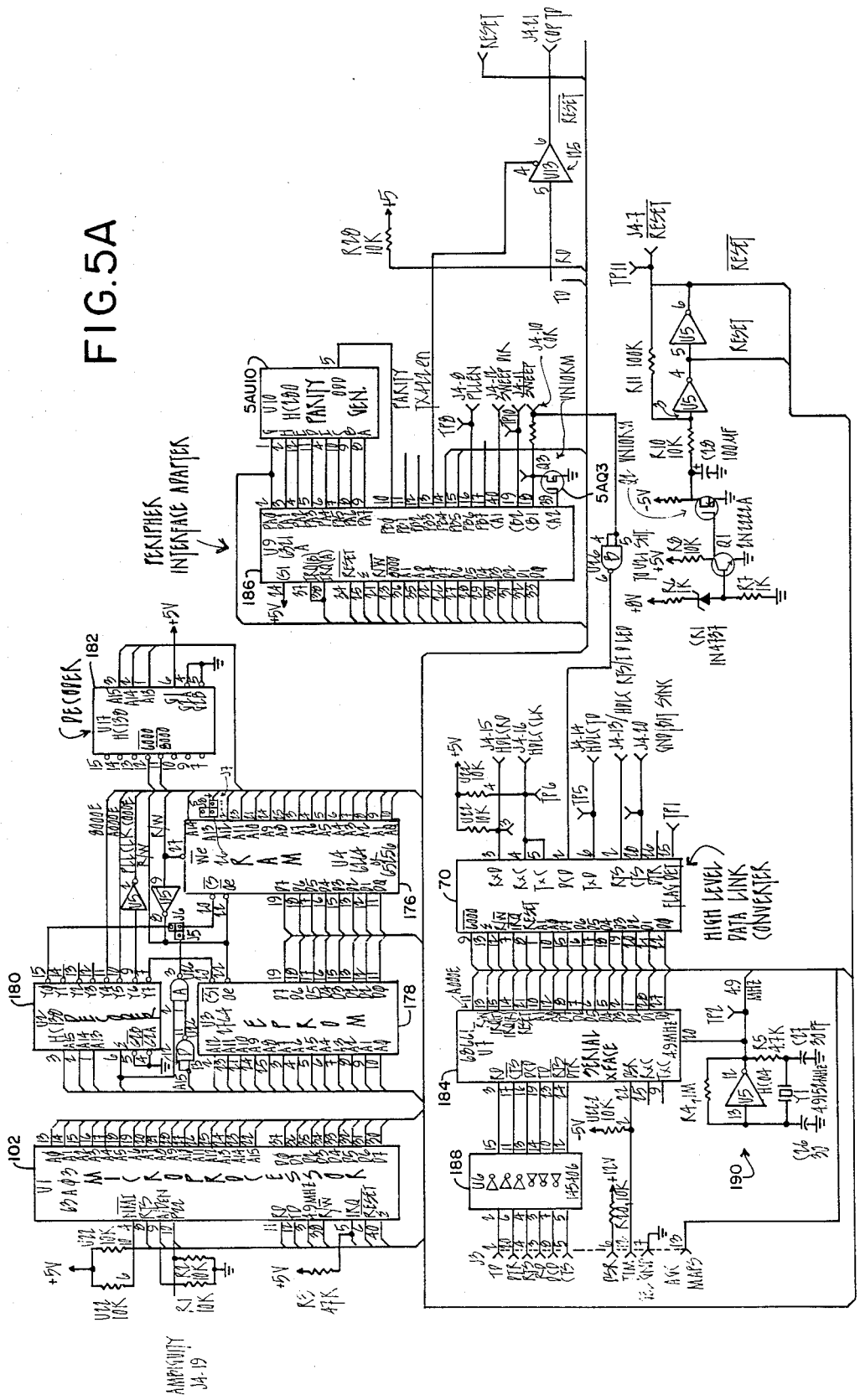
FIGS. 5A and 5B combined illustrate the circuits of the microprocessor board employed at both the transmitting and receiving ends of the system.

As previously indicated, the data phase modulates, a 15.6250 KHz signal as an example. This signal is derived from crystal controlled oscillator 60 which supplies a 500 KHz signal to a divide-by-32 circuit 62 to produce 15.6250 MHz. This signal is buffered in buffer amplifier 64 and outputed on terminal 66 to pin 4 of a high level data link/converter 70 of FIG. 5A; the MPU board. The data to the converter 70 is received on its pins 15 through 22 with the ID information being received on pins 19 through 22.

Returning to FIG. 3, the phase modulated data is supplied to the PSK modulator board 38 on terminal 72 from pin 6 of the HDLC 70 where the data has been modulated on the 15.6250 KHz subcarrier frequency signal. The signal on terminal 72 is applied to buffer amplifier 74 via lead 76. The data signal is again buffered in amplifier 78 and is divided down by resistors 80 and 82. The signal applied to terminal 72 is at TTL level as is the output signal from the buffer 78. The division ratio of resistors 80 and 82 is such as to prevent overdriving of subsequent amplifier stages 84, 86 and 88 each of which has a gain of two. In the particular example under consideration the division ratio is 8:1. Input stage 90 is a further buffer having unity gain followed by the stages 84, 86 and 88 which are configured as a six pole, active, linear phase, low pass filter. The filters are set at approximately three quarters of the bit rate of data to round off the corners of the square wave data to greatly reduce the bandwidth of the signal to about 20 KHz to 30 KHz. Each of the operational amplifiers provides a gain of 2 by virtue of the feedback resistors 90 and 92 associated with amplifier 84 and the corresponding resistors associated with amplifiers 86 and 88. The gain of $8(2^3)$ restores the signal to TTL level for eventual insertion into modulator 58.

The signal output from the amplifier 88 is applied to two large back-to-back capacitors 94 and 96. The use of PSK code requires the system to have a very low frequency, non-polarized response. Thus the two back-to-back electrolytic capacitors employed provide a low frequency response which is non-polarized with the signal swinging symmetrically about ground The signal through the capacitors is applied to a potentiometer 98 and thence via lead 100 to modulator 58. The potentiometer permits adjustment of the TTL level such as not to swamp the modulator; that is, the device operates in a linear mode.

The modulator 58, a doubly balanced mixing device, provides no output signal in the absence of data providing a suppressed carrier signal Thus the signal swings to one phase on a positive input signal, to the other phase on a negative input signal and produces no signal in the absence of an input signal on pins 3 and 4, i.e. no data. The modulator in the absence of a signal appears as an attenuator with attenuations of about 30 to 35 dB.

Therefore a forcing function; that is, a function that requires phase information to be transmitted in the absence of data, is required. This function is found in the program for the microprocessor 102 in FIG. 6. As previously indicated NRZ code is employed to eliminate phase ambiguities in BPSK code. Since however such a code produces no bits in the absence of data the microprocessor program inserts a false bit every six clock periods when no data is present.

The output signal from the modulator on pin 1 is the selected IF frequency signal modulated by the PSK signal. The signal on pin 1 is applied over lead 104 to a potentiometer 106 on the front panel of the device and from the slider thereof, over a lead 106 to the base of a first stage 108 of amplification of a three stage cascaded RF amplifier. The potentiometer 104 is employed to adjust the RF level to ensure linear operation. The first and second stages have double tuned tank circuits 110 and 112 in the second stage, for instance, to broaden the response band of the amplifiers. The resistor 114, transformer 116 (4:1 step down) combination is utilized to provide a proper impedance match for the RF out; 75 ohms. A low pass filter 118, two chokes and a capacitor, is used to suppress high order frequency components.

Reference is now made to FIG. 4 of the accompanying drawings illustrating the circuits of the transponder thumbwheel interface. Four thumbwheels are provided, each to rotate a zero to 9 drum of numbers together with an associated 10 position switch (not illustrated). The thumbwheel interface designates both the ID and the IF frequency to be transmitted or received, a frequency of 72.50 MHz being designated in FIG. 4; the "A", hexadecimal 10, being employed to designate both a part of the ID-pilot and the satellite. This designation is limited to hexadecimal 10 to 15, A to F, and so far on satellite designations is concerned it is not intended to define all satellites that may be contacted but only to designate the one satellite out of a group of closely bunched satellites with which communication is to be established.

The thumbwheels, designated by reference numerals 120, 122, 124 and 126 define from the most significant to least significant digits, respectively and the numbers are stored in latches 128 and 130. Each latch normally stores a byte of information but in the use contemplated herein two binary coded decimal words are stored in each latch.

Each of the leads 134, 136 and 138 from the thumbwheel switches to the latches 128, 130 and latch 132 for the satellite designator, respectively are grounded through 10K resistors in resistor packs 140, 142 and 144. The output signals from the latches 128, 130 and 132 appear on four leads 146 which are supplied to the MPU via a ribbon connector 148 of FIG. 2. The addressing of the latches is supplied over lead 148 from the microprocessor board.

The thumbwheel interface 42 is used in identical form in both the TDC and the TIM. There are two single pole, double throw switches 150 and 152 having movable contacts 154 and 156 which select operation of the interface 42 with the TIM or the TDC as indicated in FIG. 4; the $\overline{CS3}$ and $\overline{CS2}$ settings selecting TDC operation and the $\overline{CS1}$ and the $\overline{CS0}$ selecting TIM operation. The operation of latch 132 is the same regardless of TIM or TDC operation and thus the timing on its pin 15 is the same in both systems and the $\overline{CS}$ signal is not switched Referring now specifically to FIG. 5 of the accompanying drawings there is illustrated the microprocessor board (MPU) 40. The board consists of the microprocessor 102 and the high level data link converter 70 already designated. In addition the board includes a RAM 176 providing external storage for the microprocessor 102, EPROM 178 where the program for the MPU is stored, decoders 180 and 182, a serial interface 184 also known as a UART, a peripheral interface adapter (PIA) 186, a parity generator 190, and a multiple buffer amplifier pack 188. The amplifier pack 188 transmits over an RS232 bus from pins 3, 7 and 8 and receives from the bus over pins 2, 6 and 4. The serial interface 184 transmits data from pin 19 and receives on pin 3. The transmission via terminal 21 to the first LO synthesizer will be discussed subsequently relative to the TDC. A crystal controlled oscillator 190 at 4.9 MHz supplies the clock frequency to serial interface 184 and to the microprocessor on pin 3.

The operation of the MPU is program driven and its operation is discussed in detail relative to the program which follows subsequently. The functions of the various elements which might not otherwise be obvious are as follows: The PIA provides the interrupt and I/O controls, and in the TDC controls sweep of frequency. The Motorola 68A54 HDLC 70, in addition to its function in modulating the PSK carrier serves as a synchronous serial data channel, see pins 15 to 22 and address pins 9 and 10, generating framing flags, sequencing codes, zero bit insertion if more than six clock cycles without data are encountered. It should be noted that the CTS signal appears at its pin 28. The data received on pins 15 through 22 is from the RS232 bus via interface 184 (also known as a UART, an acronym for universal asynchronous receiver transmitter, and by National Semiconductor as a COP). It will be noted that pins 3 and 6 of the HDLC are connected together to permit setting of flags, note pin 25.

Various members of the MPU board are not discussed at all at this time since they relate only to the TDC. Leads within loop 200 and their associated circuits and leads within loop 202 and their associated circuits are not utilized with the TIM as is the element 5U25 an analog-to-digital converter. Also numerous leads such as PLL (phase lock loop) clock and PLL data may also be ignored in the TIM. Pins 2 and 28 of the HDLC 70 are use in the TDC to indicate COR (carrier operated relay) and bit sync by lighting front indicators The remaining TDC features not employed herein will become apparent when discussing the TDC circuits; it being remembered that the MPU board is identical for both TIM and TDC as is the program.

Figure 5B:
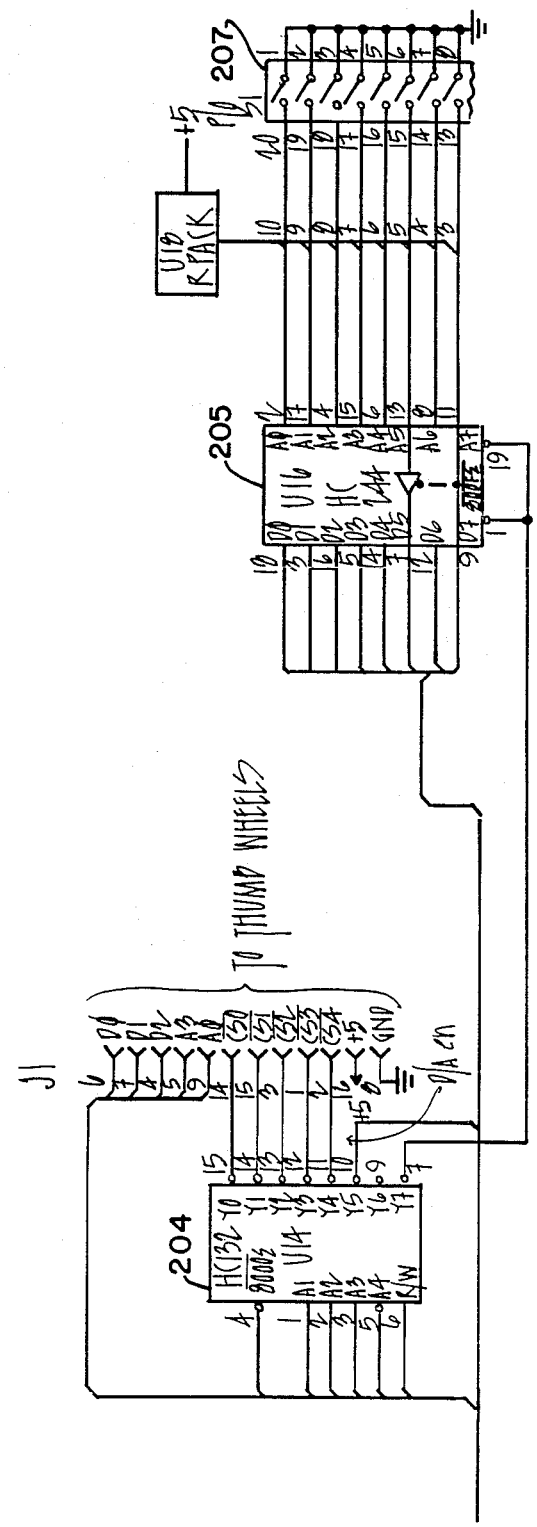

Reference is now made to FIG. 5B of the accompanying drawings, illustrating the remaining small part of the MPU board. Decoder 204 is connected to the leads from the thumbwheel board 4, receiving the binary coded decimal output data from the latches 128, 130 and 132 and converting such data to binary code for communication with the microprocessor and associated elements Referring for the moment to latch 205, this is used in the TDC in conjunction with dip switches 207 to set various parameters therein. Dip switches may also be used in conjunction with the latch 204 in place of the thumbwheel. Dip switches are normally employed where factory setting of the ID code is desired in which case the display part of FIG. 4 is eliminated and replaced with dip switches. The remainder of this figure is employed in the TDC or not used in this system. Although not used in the TIM the table below sets forth the settings of the switches 207 used in conjunction with the TDC.

TABLE I

| 7/8 Bit | Parity | |
|---|---|---|
| Switch 1 | Switch 2 | Switch 3 |
| ON - 7 Bit | ON - None | ON - Odd |
| OFF - 8 Bit | OFF - Enable | OFF - Even |

| | Baud Rate Select | |
|---|---|---|
| Switch 4 | Switch 5 | Switch 6 |
| ON 300 | ON | ON |
| OFF 600 | ON | ON |
| ON 1200 | OFF | ON |
| OFF 1800 | OFF | ON |
| ON 2400 | ON | OFF |
| OFF 4800 | ON | OFF |
| ON 9600 | OFF | OFF |

| | Controller | |
|---|---|---|
| Switch 7 | | Switch 8 |
| ON - Quicklink Controller | | OFF |
| OFF - No External Controller | | OFF |

The exciter 10 and power amplifier 12 are completely conventional elements and are not discussed further.

This completes the description of the transmitter on the up-link end of the system and reference is now made to the receiver or down-link end of the system. As previously indicated the signals received on dish 16 are converted to signals in the 950 MHz to 1700 MHz by the LNDC 18 and passed through a splitter 20, if necessary, to the TDC 26.

Figure 6:
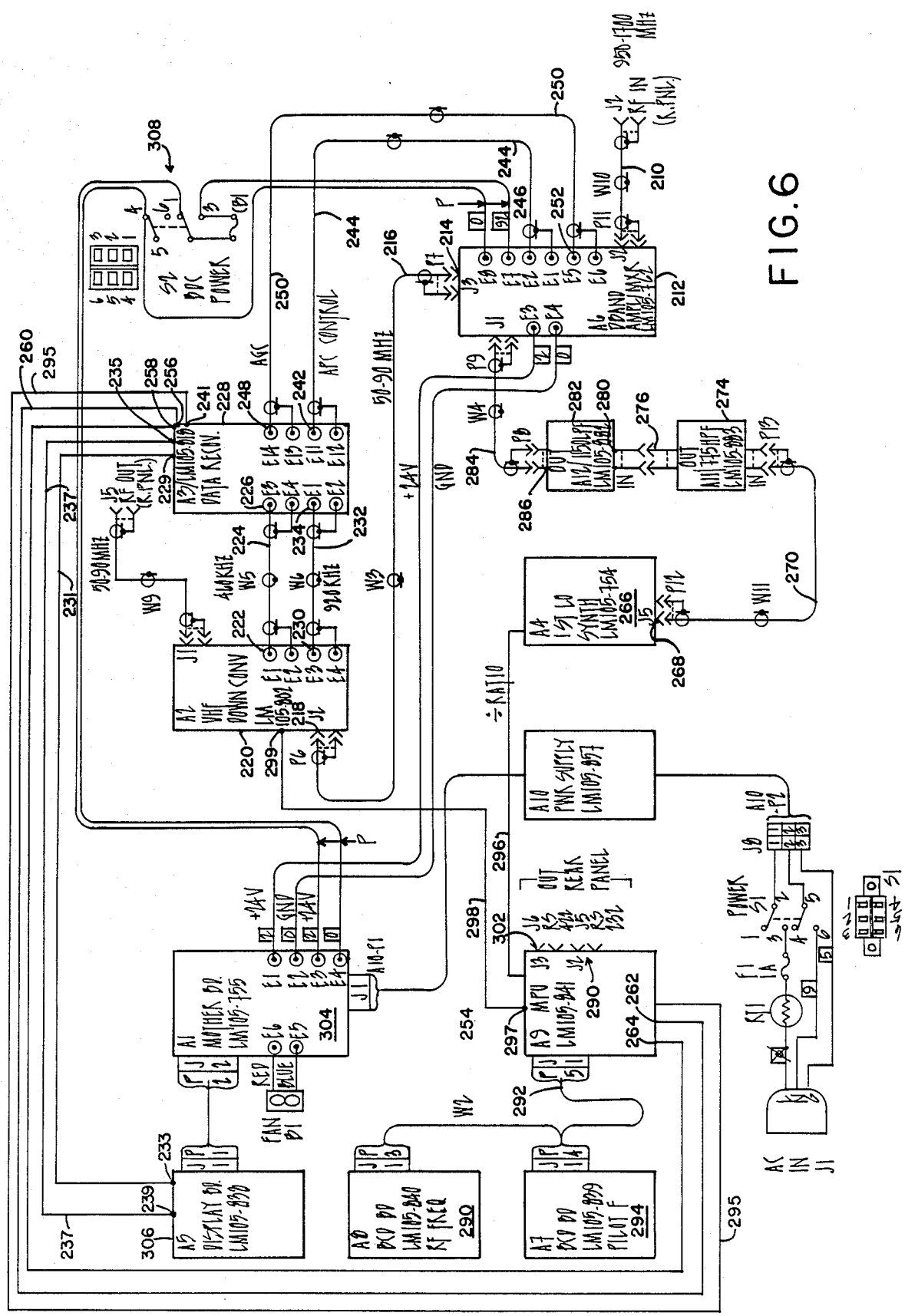
FIG. 6 is a diagram illustrating the major interconnections between the principal components of the tracking downconverter.

Reference is now made to FIG. 6 of the accompanying drawings illustrating the various PC boards employed in TDC and their basic interconnections. The 950 MHz to 1700 MHz RF input signal is applied via lead 210 to a D-band amplifier-mixer board 212. The incoming signal is bandwidth limited and goes through a dual conversion to bring the signal down into the 50 MHz to 90 MHz frequency range. This signal is applied via terminal 214 and cable 216 to terminal 218 of a VHF downconverter 220. The VHF downconverter has a synthesized tuning which enables the downconverter to process to precise IF frequency in the 50 MHz to 90 MHz range transmitted from the data modem to tune the input to the board to the IF input. The synthesizer is tunable in 10 KHz steps to any pilot frequency in the 50 MHz to 90 MHz range.

The downconverter 220 heterodynes the signal down to 10.7 MHz, runs it through a selected one of several band pass filters and then heterodynes it against a crystal oscillator to reduce the frequency to 460 KHz. This signal, the IF signal of this board, is passed through a further band pass filter, appears on terminal 222 and is applied via lead 224 to terminal 226 of a data recovery board 228. The frequency of this signal is also doubled in the downconverter 220 to 920 KHz and is applied via terminal 230, lead 232 to terminal 234 of the data recovery board 228. The selected frequency of the 50 MHz to 90 MHz band is passed through via terminal 236 and lead 238 to a rear panel connector 240. This output may be passed on to SCPC-type receivers, a 70 MHz video demodulator or to other data demodulators in the range of 50 MHz to 90 MHz.

The 460 KHz signal which has been bandwidth limited to about 20 KHz contains the PSK data to be abstracted in the data board. This board contains the PSK phase detector and the PCM bit synchronizer used to reconstruct the PCM in the presence of noise and provides a coherent reconstructed clock at the same time. The board uses the 920 KHz as the input signal to another phase detector to produce a reference signal used in an automatic phase control circuit The phase control loop supplies an input signal to a loop filter forming a part of the long loop feedback control to phase lock a local oscillator in the D band oscillator/mixer 212 so that phase coherence is maintained; a requisite for meaningful phase demodulation. The long loop is completed via terminal 242 lead 244 and terminal 246 of oscillator/mixer 246.

The data recovery unit 228 also (1) supplies an AGC signal to the oscillator/mixer via terminal 248, lead 250 to terminal 252 of the latter board for carrier detection, (2) has a quadricorrelator employed to permit faster acquisition of the PSK signal than might otherwise be possible, and (3) the sweep circuitry employed to facilitate a sweep search acquisition mode to acquire a carrier. The board 228 also supplies a 15.6250K bit data stream and a 15.6250 KHz clock to the MPU board designated here by reference numeral 254 to avoid confusion with the identical board in the TIM. The interconnections for the data and clocks are terminals 256 and 258 on board 228, leads 260 and 262 and terminals 264 and 266, on the board 254, all respectively.

Reference is now made to a first local oscillator synthesizer board 266. This oscillator permits the amplifier/mixer 212 to be tuned by the front panel switches via the microprocessor over the 950 MHz to 1700 MHz band in 500 KHz steps. The mixer in the board 212 is a subharmonic mixer using high side LO injection. Thus the synthesizer 266 is required only to generate a frequency at one-half that required to achieve the desired frequency conversion. The first IF frequency is 600 MHz so that the first LO synthesizer produces signals in the range from 775 MHz to 1150 MHz. This signal appears on terminal 268 and is applied over lead 220 to terminal 272 of a 775 MHz low pass filter 274, then from a terminal 276 via cable 278 to a terminal 280 of a 1150 MHz high pass filter 282. The fully filtered signal is applied to a cable 284 from terminal 286 to terminal 288 of the amplifier/mixer 212.

The band pass of the two filters 274 and 282 is 375 MHz which is exactly one-half of the tuning range and thus the band pass required in the first IF stages of the amplifier/mixer 212.

The frequency of the first LO synthesizer is controlled from the MPU board 254 but is actually set by switches on a front panel of the TDC; the switches being located on a board 290 that is identical to the transponder thumbwheel interface of FIG. 4 of the TIM. The frequency is set and the coded information is applied to the MPU 254 via a lead 292 on which combined with the signals from a pilot frequency control board 294. The MPU board applies an appropriate signal to the first LO synthesizer board over a bus 296. Sweep signals developed in the data recovery board are processed in the microprocessor and fed to the first LO synthesizer to initiate a sweep acquisition function. The MPU board also supplies via a lead 298, a designation of the IF frequency in the 50 MHz to 90 MHz range.

The MPU 254 in addition to its other function extracts the ID signals from the data supplied from the data recovery board 228 and compares it with the ID designation set on the switches of board 294. It should be noted that both the TIM and TDC may through program control provide separate pilot and ID frequencies as will become apparent from the discussion of the program. From the point of view of hardware this function is unimportant and is not discussed further.

The MPU also separates the data at the specified baud rate with RS232 information appearing on a connector 300 and RS422 (Quick Link) information appearing on connector 302 both located on the rear panel of the TDC. As previously discussed the baud rate is set by a series of dip switches as illustrated in Table I. The TIM can transmit at a higher baud rate then the TDC is set to process, but the MPU has 7 kilobytes of storage so if the TIM transmits information in appropriately timed bursts the TDC can handle the information.

Other than an interconnect, a mother board 304, the only remaining board is a front panel display board 306 which provides displays indicating carrier lock, PSK carrier lock, bit sync lock and that the ID signal has been received. A further display indicates signal strength and a final display indicates the voltage stress in the long control loop of the D-band oscillator.

A switch 308 applies +24 volts to terminal 310 of the amplifier/mixer 212 where it is internally reunited to lead 210 and is sent to the block downconverter to supply them with DC power.

Figure 6A:
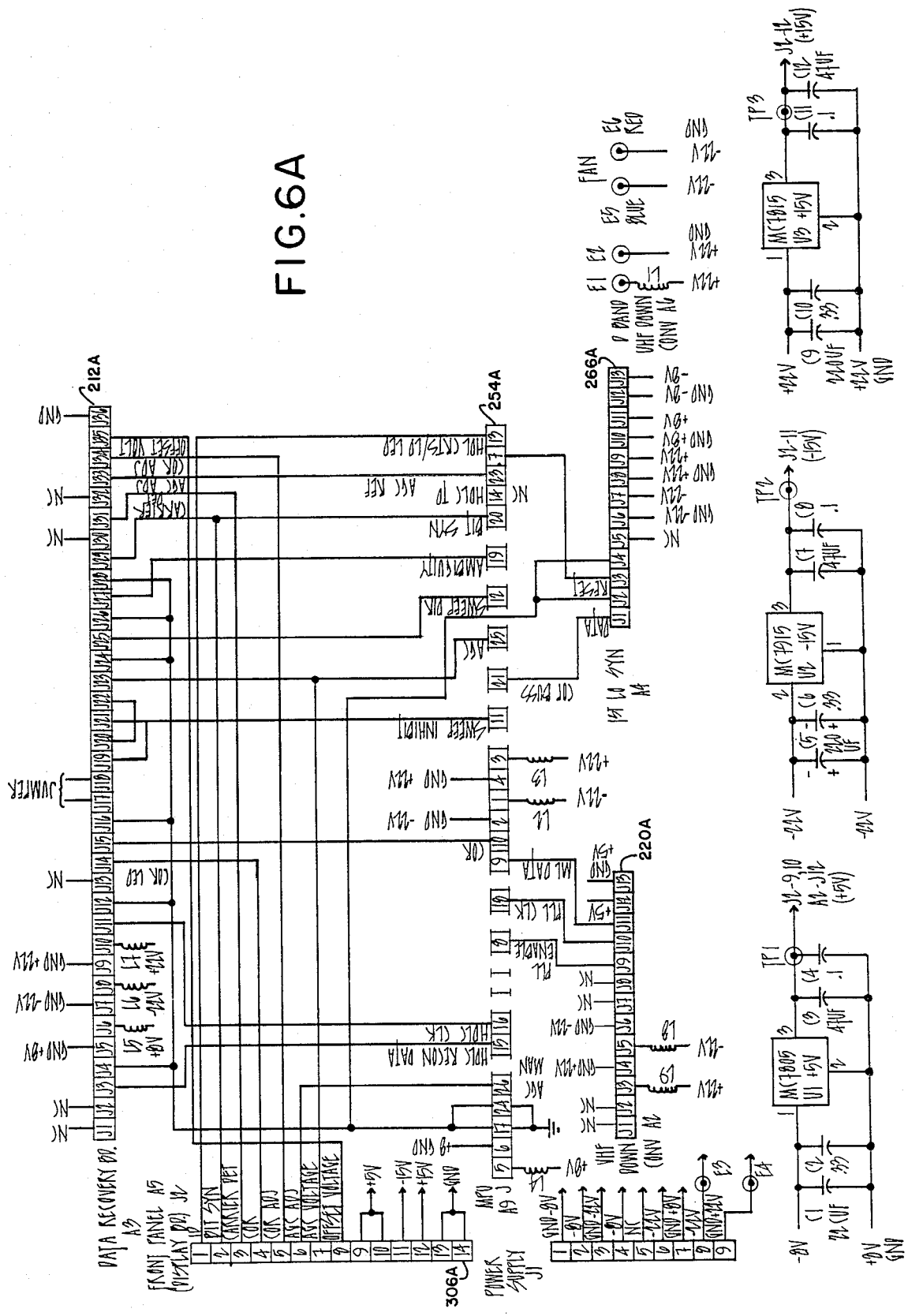
FIG. 6A illustrates the interconnections between a mother board and the major active boards of the tracking downconverter.

Reference is made to FIG. 6A which provides a diagram of those specific interconnections between the various boards that go through the mother board 304. References to this figure will be by the board reference numeral used in FIG. 6 plus the letter A. Throughout the drawings reference is made to the pins of these connectors by their J numbers and all such references can be traced through this diagram.

Figure 7:
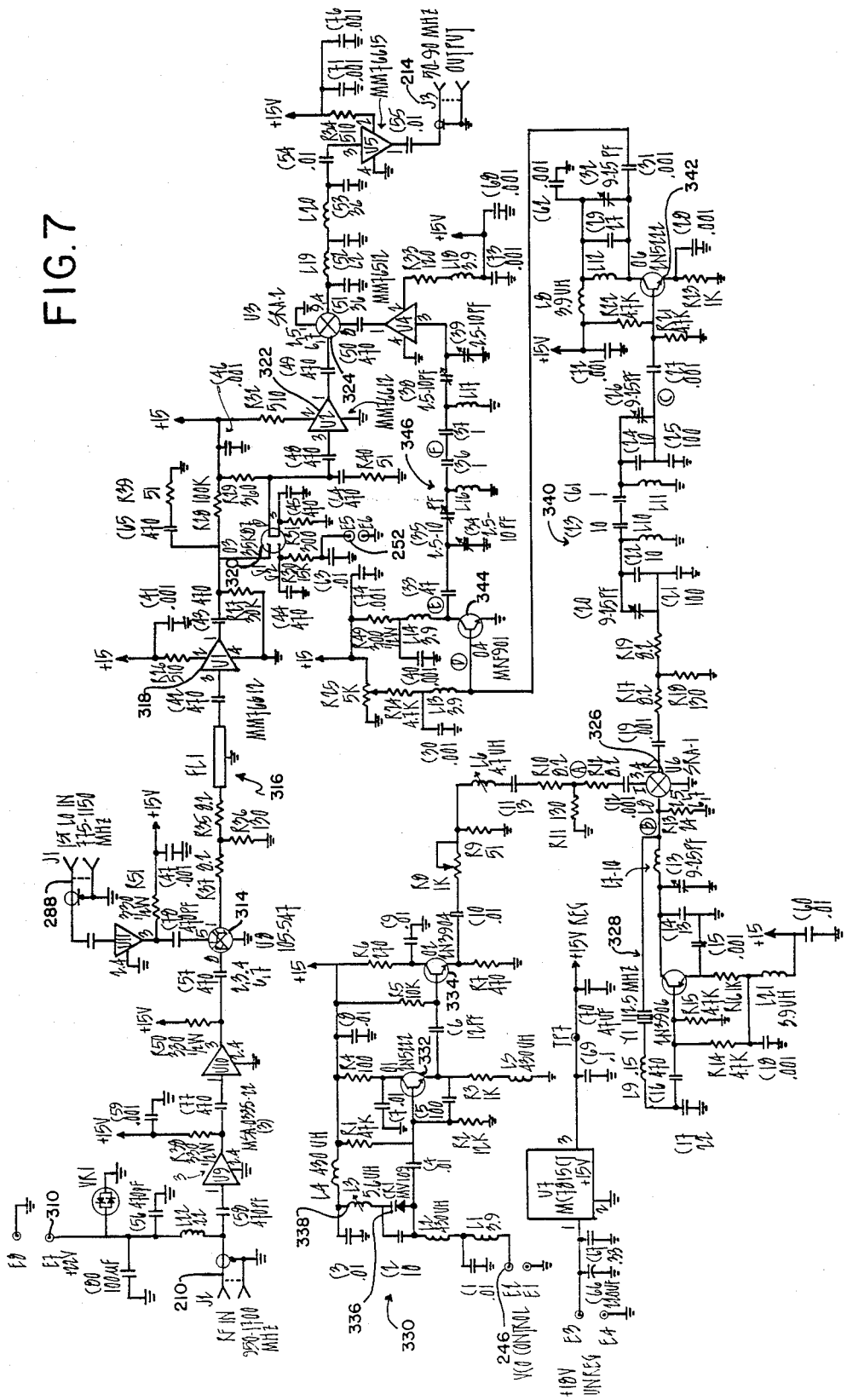
FIG. 7 is a schematic wiring diagram of the D-band UHF downconverter of the TDC.

Referring now specifically to FIG. 7 of the accompanying drawings, there is illustrated the circuit diagram of D-band amplifier/mixer 212 of FIG. 6. The RF enters the circuit on lead 210 which has the DC voltage for the block downconverter appearing on terminal 310 applied through an isolation inductor 312. The RF is passed through two stages of 10 dB of amplification to subharmonic mixer 314. The LO frequency applied on the terminal 288 is amplified and applied to pin 5 of the mixer 314. A 600 MHz signal output is passed through a first IF filter 316 having a bandwidth of 46 MHz (600 MHz ±23 MHz). The signal is passed through a further amplifier 318 and into a dual gate MOS-FET 320 used as an AGC control. The AGC signal is derived in the data recovery board 228 and applied via terminal 252 to the MOS-FET 320. The variable DC bias voltage on pin G2 of the MOS-FET provides variable attenuation to achieve automatic gain control having a 40 dB dynamic range. The signal is now amplified in amplifier 322 and applied to a second mixer 324 (Mini-Circuits SRA-2). Again high side injection is employed so that the VCO injection frequency to bring the signal down from a center frequency of 600 MHz to a center frequency of 70 MHz is 670 MHz. Since the bandwidth of the 600 MHz signal is ±23, the frequency out is 70 MHz A23 MHz or 47 MHz to 93 MHz. This extra width is required to accommodate the sweep range during carrier sweep search which is ±3 MHz so that if the signal is at one or the other end of the band, the necessary sweep range can be accommodated.

The local oscillator frequency is derived from a mixer 326, Mini-Circuits SRA-1, having the output of a crystal controlled local oscillator 328 at 112.5 MHz output frequency applied to pin 8 of the mixer. The other input to the mixer 326 is a 21.5 MHz signal derived from a conventional varactor controlled transistor oscillator 330 comprising transistors 332 and 334 and varactor 336. A phase/frequency control signal is applied to the oscillator 330 from terminal 246 received from the data recovery board 228 and closes the long loop feedback control of the system. Specifically the control voltage is injected into the oscillator tuning circuit comprising varactor 336 and choke 338 pulling the phase and frequency of the oscillator into sync with the phase control signal. A varactor controlled oscillator is employed to eliminate the problems incident to adjusting a crystal to follow drift in the downconverter.

The high side output signal from mixer 326 is 134 MHz and is passed through a 134 MHz filter 340. The 134 MHz frequency must be multiplied by five to achieve a 670 MHz signal for injection into mixer 324. Multiplication accomplished by heavily amplifying the signal and then filtering out the fifth harmonic for use in the mixer 324. High gain amplifiers 342 and 344 are employed for this purpose; the amplifier 344 being followed by a fifth harmonic bandpass filter 346. The signal out of the filter is again amplified and then applied to mixer 324. The output of the mixer 324 is filtered and applied to output terminal 214.

Figure 8A:
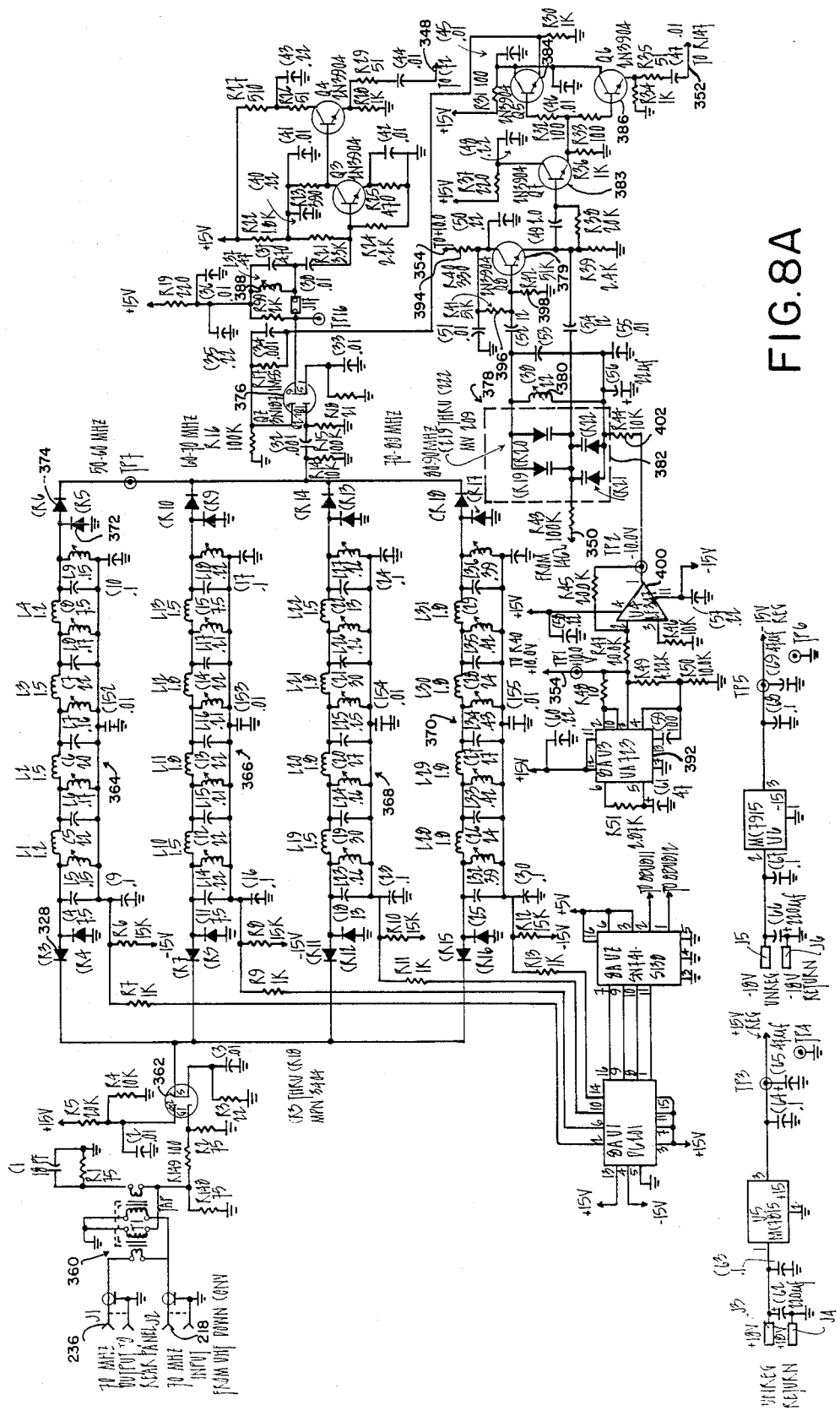
FIGS. 8A and 8B combined illustrate the wiring diagram of the VHF downconverter of the TDC.
Figure 8B:
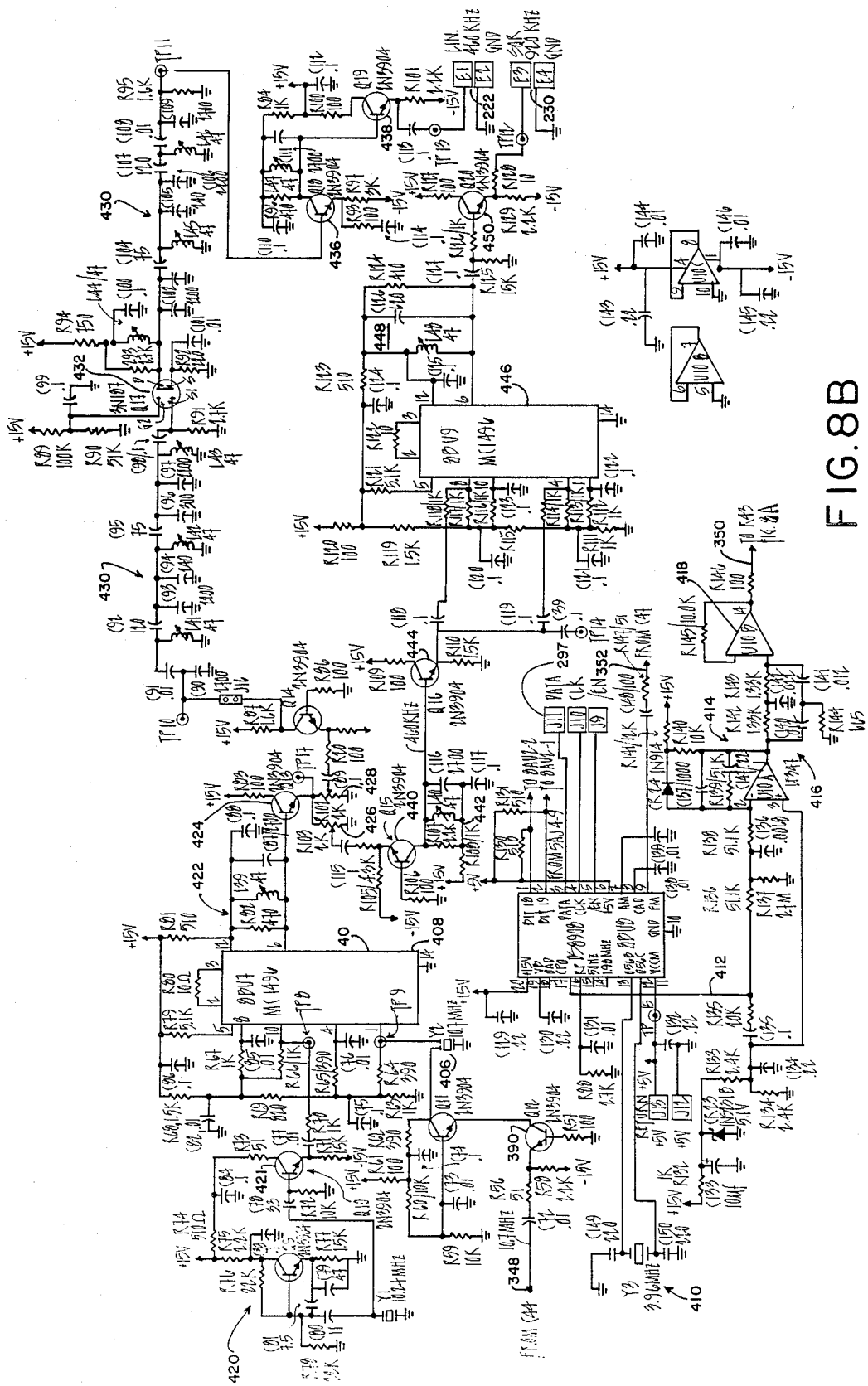

Referring now specifically to FIGS. 8A and 8B there is illustrated the detailed circuit diagram of the VHF downconverter 220 of FIG. 6. The 50 MHz to 90 MHz signal from the amplifier/mixer 212 is applied on terminal 218 of FIG. 8A and loops back out on terminal 236 through directional coupler 360 for use in SCPC and other narrow band data reducing circuits. The input signal on lead 218 is applied through a FET RF amplifier 262 to a group of four 10 MHz 3 dB bandwidth filters 364, 366, 368 and 370 covering, respectively, the bands 50 MHz to 60 MHz, 60 MHz to 70 MHz, 70 MHz to 80 MHz and 80 MHz to 90 MHz whereby to separate the IF signal into four bands. This process assists in locating the ID frequency and PSK carrier frequency. Each unused filter terminates in a pin diode to ground 372 and a pin diode 374 couples the selected filter output to a dual gated MOS-FET mixer 376. The specific filter which contains the desired signal is selected by a FET switch device 8AU1 fed by 8AU2 a decoder receiving signals on pins 1 and 2 to select the desired one of the four filters. Selection is made by a pin diode switch comprising pin diodes 378 for the series pass element and 380 to shunt the unused filter input to ground in each filter. The four filters are used to narrow the selected band and to provide image rejection of some of the images in the circuit. The signal out of the selected filter is the band in which the PSK pilot signal is to be found and it is down converted by mixer 376 to 10.7 MHz to further limit imaging. The mixer receives the output of the selected filter on its drain Q2 and the heterodyning frequency is received on drain Q1.

The heterodyning frequency is derived in a VCO generally designated by the reference numeral 378 having a transistor amplifier 379, a tuning coil 380 and four varactors within the dashed line box 382. The oscillator is thus tunable and is tunable over a range from 60.7 MHz to 100.7 MHz to provide an LO 10.7 MHz above the 50 MHz to 90 MHz band. The output of the oscillator 378 is fed to an emitter follower 383 and thence to dual followers, transistor amplifiers 384 and 386. Transistor follower 384 supplies drain Q1 of MOS FET mixer 376 with the IF frequency selection signal or more specifically heterodyning frequency and follower 386 supplies a signal via lead 352 to drive a frequency synthesizer chip in FIG. 8B.

Returning momentarily to the mixer 376, the output is processed by a single tuning coil 388 so that the signal is still fairly wide band, about 200 KHz and must subsequently be narrowed down to about 20 KHz. The signal is passed through two further stages of amplification and is passed via lead 348 to amplifier 390 in FIG. 8B.

To finish the description of the operation of the VCO 378, a voltage regulator chip 392 provides a very precise +10 volts to the collector of oscillator amplifier 379 via resistor 394 which is part of a resistor string including resistors 396 and 398. The regulator 392 via amplifier 400 provides a very precise −10 volts at its output applied via resistor 402 to the anodes of the varactors group 378. The controlled voltage range is thus −10 to +10 volts, which applies a bias to the varactor diodes of −2 to −20 volts; the range of the tuning voltage supplied via lead 350.

Returning now to the lead 348 (FIG. 8B) and cascaded amplifiers 390 and 404, the amplifier 404 has a 10.7 MHz ceramic filter 406 in its collector circuit feeding pin 1 of an active doubly balanced mixer 408. The filter 406 reduces the bandwidth of the 10.7 MHz signal to acceptable levels for phase detection.

Reference is now made to the chip 8BU8 a National Semi-Conductor chip, DS8408, which is the heart of the LO synthesizer 378 for tuning from 60.7 MHz to 100.7 MHz. The chip has internal latches and can store a fourteen bit serial data stream which stream defines the division function provided internally of the chip. The serial stream is emitted by the microprocessor on the MPU board 254 and carries information for designating the desired filter as determined by the pilot frequency setting on the front panel board 294. The chip 8BU8 must also receive the VCO 378 frequency and this is supplied to the chip via lead 352. Also required is a precise crystal controlled frequency and this is supplied by crystal 410 at 3.9600 MHz. The chip 8BU8 also receives from the microprocessor, an enable signal on pin 5, a clock on pin 4 and the data stream on pin 3. The chip outputs the filter selection bits, for selection of one of the four filters of FIG. 8A, on its pins 1 and 2.

The chip 8BU8 also contains the phase detector forming part of or more precisely the feed into the loop filter controlling the VCO 378. Specifically the output of the phase detector in chip 8BU8 appears on its pin 17. The signal is applied via lead 412 and amplifier 414 to a twin-T 10 KHz notch filter 416 to eliminate any residual signals at that frequency. The signal is then buffered at 418 and applied over lead 350 to control the VCO 378; the feedback via lead 352 providing comparison between the actual and desired frequencies and phases.

It is apparent that this entire process is controlled by the program in the MPU ROM and that the system can be tailored to specific needs of a particular user by making minor changes in the program.

Returning to the doubly balanced mixer 8BU7, the use of this mixer again makes it apparent that a continuous stream of data is required since without it zeros are produced by the mixer and synchronization cannot be maintained. The second input frequency to the mixer 8BU7 is on pin 10 and is derived from a crystal controlled 10.24 MHz oscillator 420 via buffer 421. The beat frequency is 460 KHz and appears a pin 6 where it is applied through a low Q tank circuit 422 to emitter follower 424. The signal is split at this point, there being two potentiometers 426 and 428 in the emitter of the emitter follower 424; each potentiometer supplying a different path. The potentiometer 428 and 426 feed the paths that output the 460 KHz and 920 KHz signals, respectively, to the data recovery chip 228.

The signal proceeding from the potentiometer 428 is passed through six poles of filtering, three poles 430 before MOS FET 432 and three poles 434 after the FET. This processing produces a signal 20 KHz wide at the 3 dB points. This bandwidth is sufficient to accommodate to the 15.6250 KHz PSK data signal. The signal is then amplified in transistor 436 having another low Q circuit to further linearize the pass band before data reduction The output is applied to a buffer 438 and thence to the data recovery board 228, via terminal 222 and lead 224.

The signal from potentiometer 426 is applied to amplifier 440 having a low Q tank circuit 442 in its output. The signal is then applied to an emitter follower 444 and is applied to pins 4 and 8 of another doubly balanced mixer 8BU9 which operates as a squaring circuit to produce doubling of the frequency so that 920 KHz appears on pin 6 of the mixer. A low Q tank circuit 448 is connected to pin 6, buffered in amplifier 450 and applied to the data recovery board via terminal 230 and 232.

Figure 9A:
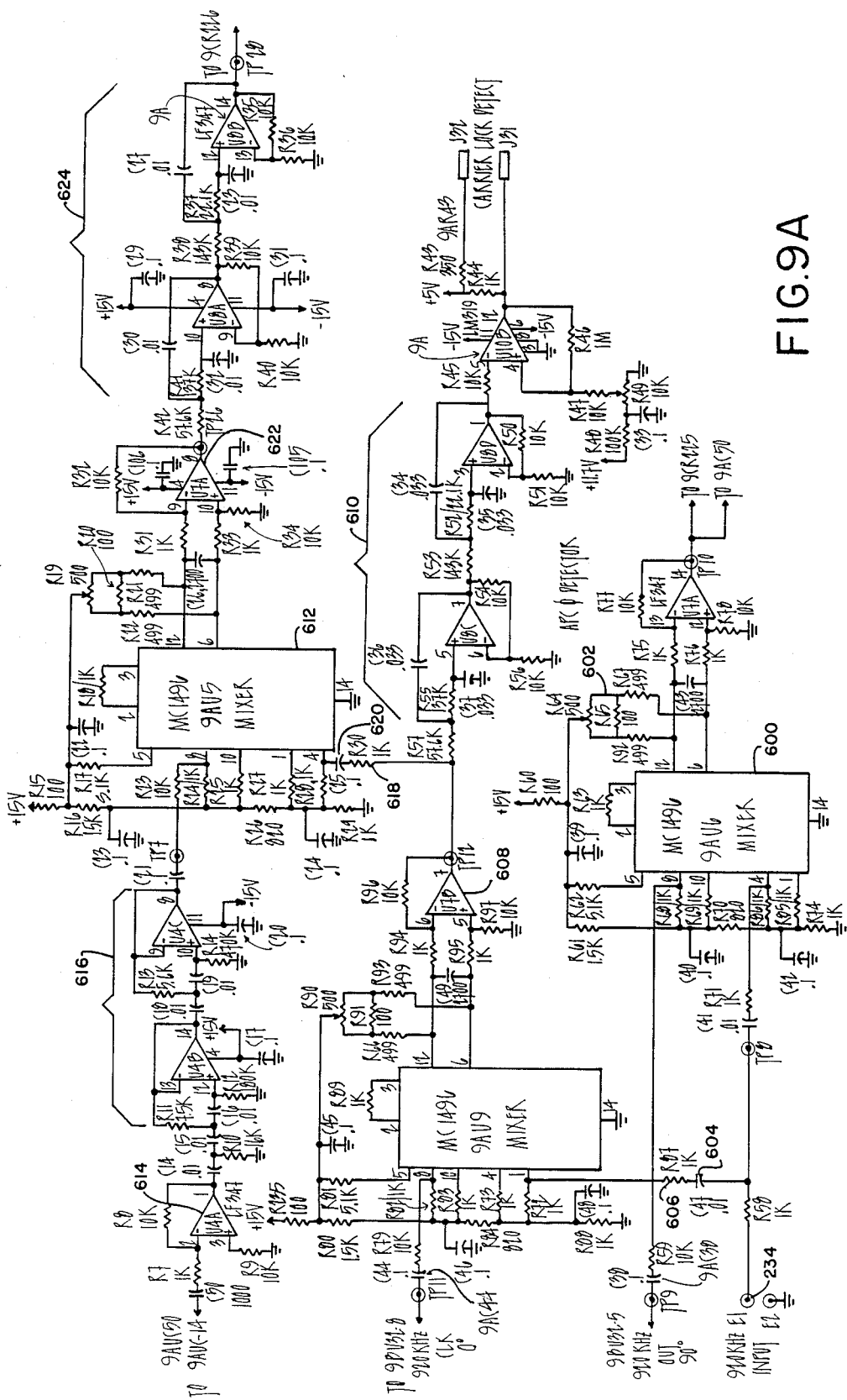
Figure 9B:
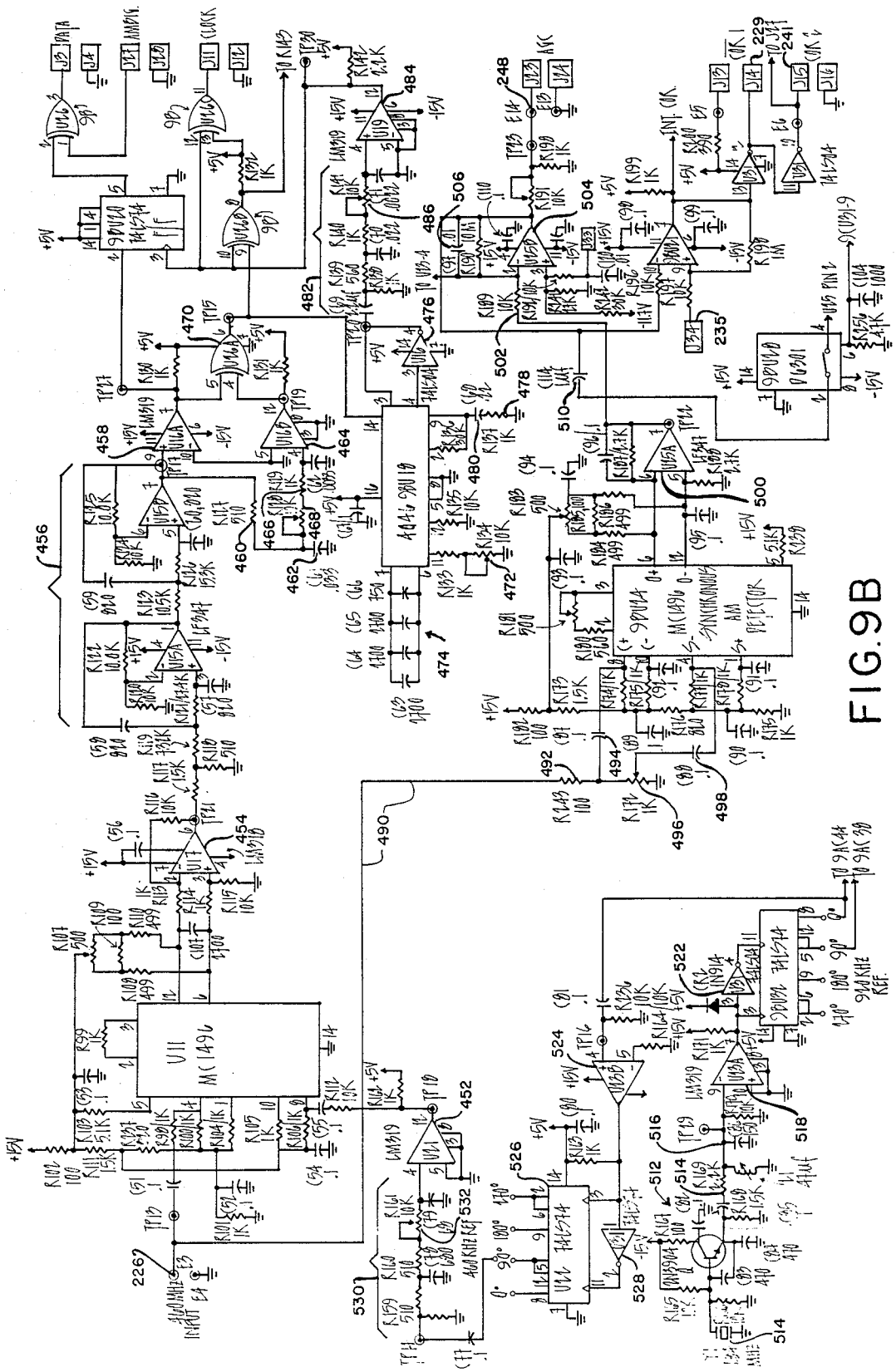

Referring now specifically to FIG. 9B, the 460 KHz signal is applied via terminal 226 to pin 4 of doubly balanced mixer 9BU11 serving as a PSK phase demodulator. The other input to the mixer is a square wave clock in phase with the 460 KHz signal on terminal 226. This clock is fed to pin 8 of the mixer 9BU11 from a high gain comparator 452. Thus if the signal input to its pin 4 goes positive the output on its pin 12 will go to TTL-1 level and if the input is below zero the output is TTL zero. Simply put the device squares whatever signal is put in.

Returning to the mixer 9BU11, its output is across pins 6 and 12 and is fed to an op-amp 454. The output of the mixer toggles about zero being either positive or negative and it has some carrier still riding on it as a result of both the IF and the square wave being at 460 KHz. The baud rate is 15.6250. The signal is now passed through a low pass filter 456 having its maximum pass frequency at one half the baud rate; i.e. 7.8125 KHz. The code, as previously pointed out, is an NRZ-S code, a bi-phase code, and as such the highest frequency component is at one-half the bit rate. The signal is now passed through a high gain comparator 458 to square up the signal so that TTL levels are again established from small swings about zero at the output of the filter 456. The signal is now applied to pin 2 of a D flip-flop 9BU20 and a clock is applied to pin 3 of the flip-flop, the timing on the clock being such as to catch the signal at its peak. In consequence whatever level is at the output of amplifier 458 it is stored in the flip-flop 9BU20 until the next clock pulse 9BU20 is received.

The clock signal applied to pin 3 of flip-flop 9BU20 is a coherent 15.6250 pulse stream; remembering that PSK is 460 KHz while PCM is at 15.6250 KHz. The output of the flip-flop is fed to an exclusive OR-gate 9BU26 operated as an invert/non-invert device in response to receipt or non-receipt of an "ambiguity" signal from the microprocessor. If the carrier, PSK and bit sync signals are generated but the ID is not found, the microprocessor sends a signal to chip 9BU26C to cause it to invert the signal in the event that an inverted ID signal has been sent.

The generation of the clock is in a phase detector circuit 9BU18. It is necessary to drive this circuit at 15.6250 KHz at 90° relative to the originating signal. To accomplish this, the output signal from the filter 456 is applied to cascaded resistor capacitor networks resistor 466 and capacitor 468 and resistor 460 and capacitor 462 each producing a 45° phase shift. The signal is then applied to a high gain amplifier 464. The signal is then combined in an exclusive OR-gate 470 which doubles the frequency back up to 15.6250 KHz. The frequency doubled signal is a square wave which is produced only when ones and zeros alternate. Thus the output of the exclusive OR-gate 470 is intermittent but is available on pin 14 of chip 9BU18 a sufficient percentage of the time to synchronize a voltage controlled oscillator in the chip 9BU18 which produces the clock applied to pin 3 of the flip-flop 9BU20. Thus a bit rate clock is generated that is synchronized with the PCM bit stream.

The nominal frequency of the VCO in the chip 9BU18 is determined by a time constant circuit including potentiometer 472 and capacitors 474. The potentiometer is used to set the basic frequency of 15.6250 KHz and the signal on pin 14 syncs this signal both in phase and frequency with the PCM signal. The synchronization actually takes place in a phase comparator in the chip. The output of the VCO on pin 4 is buffered in amplifier 476 and fed back on pin 3 connected to the other leg of the phase detector. Thus there is a continuous input to the phase detector on pin 3 and a discontinuous input on pin 14. The phase detector loop is completed via pin 2 of the chip 9BU18 to pin 9 with a long time constant circuit resistor 478 and capacitor 480 connected between pin 9 and ground. The time constant of the loop is sufficient to maintain control of the VCO during the maximum internal between pulses permitted by the software in the MPU at the transmitting end.

The output of the chip 9BU18 on pin 3 is 90° out of phase with the signal on pin 5 of the D flip-flop 9BU20 but in order for the exclusive OR-gate to operate properly the signals on its pins 2 and 3 must be approximately in phase. Thus the signal on pin 3 of chip 9BU18 is passed through cascaded 45 degree phase shifting networks, generally designated by reference numeral 482. The signal is passed through a high gain amplifier 484 to create a TTL level signal. It should be noted that as previously indicated, it is desired to gate the signal from the flip-flop through the exclusive OR-gate at maximum signal level regardless of actual phase coincidence. A potentiometer 486 in the 90° phase shift network 482 is employed for this purpose. It should be noted also that a potentiometer 488 in the phase shift network 466 is adjusted to make the output from amplifier 464 symmetrical so that the coincidence between the various signals on 9BU20 and 9BU26B and 9BU26C is maintained. The 9BU26C produces the clock on terminal 258 to the MPU board terminal 264 and the 9BU26B produces the sync signal to the bit sync detector in FIG. 9C.

The function of the exclusive OR-gate 9BU26B is to provide a pure bit signal. The signal output from exclusive OR-gate 470 has data and other non-bit rate signals riding on the signal. By gating the output of gate 470 with the clock from 9BU18, virtually only the bit rate components are gated. The average signal out is thus related only to bit rate which as explained subsequently is used to indicate bit rate sync.

Reference is now made to the AGC circuitry of FIG. 9B. The signal appearing on terminal 226 is applied via a lead 490 to pin 8 of a synchronous AM detector 9BU24 via a resistor 492 and capacitor 494; the latter for a.c. coupling. The signal is also applied to pin 1 of the detector 9BU24 via potentiometer 496 and capacitor 498. The chip 9BU24 is again a doubly balanced mixer employed as a synchronous AM detector by inserting the same signal into the device through pins 4 and 8. The outputs on pins 6 and 12 are differentially coupled to op-amp 500; the two elements constituting a synchronous AGC detector. The output is essentially d.c. proportional to signal strength with an a.c. ripple on it.

The signal passes through a resistor 502 to the input of amplifier 504 which together with associated circuitry serves as a loop integrator. The integrator upon receiving a signal ramps up to a maximum voltage but the ramp slope is switched as a function of receipt of a carrier. If a carrier is detected the integrator ramps up slowly to the saturation level of amplifier 504 in order to smooth out the ripple and follow the slow fluctuations in signal strength. In the absence of carrier, the ramp up is quite fast so that the signal can track the sweep.

Referring to the circuitry for accomplishing the switching of the ramp rate, the resistor 502 in conjunction with a 0.01 microfarad feedback capacitor 506 defines the rapid ramp time constant. A FET switch 9BU28 has its pin 2 connected via a microfarad capacitor 510 to the output of amplifier 564 (pin 1) and its pin 4 connected to input pin 2 of the same amplifier. Thus when the FET switch 9BU28 is closed the capacitor 510 shunts capacitor 506, the time constant of the integrator is greatly increased and the voltage ramps up slowly. The switch 9BU28 is controlled by a signal derived from pin 9 of inverter 9CU31 on which appears the sweep inhibit command. The purpose of the change in ramp rate is related to the sweep function employed to search for a carrier. During sweep its is desired that the AGC voltage changes rapidly to follow the rapid changes in signal level since sweep is occurring at a quite rapid rate over a 20 KHz bandwidth, the AGC must respond rapidly to rapid changes in signal level or a carrier can be easily missed. Thus the integrator time constant must be short.

It should be noted that the sweep inhibit command is generated on pin 11 of the microprocessor on the MPU board 254 in response to a COR signal on its pin 10.

The output signal from the amplifier 504 is applied to terminal 248 which, as previously indicated, is applied to terminal 252 of the D band amplifier/mixer 212. The output signal of amplifier 504 is also applied to the input on pin 10 of a high gain amplifier 9BU21 which receives a voltage used for comparison purposes from the COR adjustment on the front panel of the TDC via terminal 235. When the AGC signal is large enough the amplifier 9BU21 toggles and supplies a signal to pin 13 of inverter 9BU31 which lights an LED on the front panel to indicate that a carrier has been received.

The output signal on pin 12 is applied to pin 11 of inverter 9BU31 and out on pin 10 and connector 241 to the MPU board to indicate that the AGC threshold has been crossed thus indicating that the system should lock up on this carrier and change the time-constant of the AGC circuit.

Reference is now made to crystal oscillator 512 which produces the signal ultimately supplied to the phase demodulator 9BU11. The crystal 514 is set at 1.84 MHz. The signal out of the oscillator is loosely coupled through resistor 514 to a parallel tank circuit 516 which produces a good sinusoidal signal. This signal is applied to a very high gain comparator 518 that looks for zero crossings and produces TTL output levels. The output signal toggles between zero and 5 volts at 1.84 MHz and is applied to pin 3 of a dual J-K flip-flop 9BU32. The same signal is applied via inverter 522 to pin 11 of the inverter. The device thus operates as a divide-by-two circuit and thus generates a 920 KHz signal at 0°, 90°, 180° and 270° phases. The 0° signal on pin 8 is applied to a.c. high gain comparator 524. The output of comparator 524 is applied to pin 3 of another J-K flip-flop 526 and through inverter 528 to pin 11 of the flip-flop. Thus the 920 KHz signal is divided by 2 to produce four phases of a 460 KHz signal. The 90° phase signal is used and is passed through two cascaded 45° phase shift networks 530; the second network having a potentiometer 532 to adjust the phase of the output signal from amplifier 452. This circuit serves the same purpose relative to timing of the signals out from amplifier 452 with regard to the 460 KHz signals on terminal 226 as specified relative to the circuits 482 previously described. Specifically it is essential that the signals from pin 8 occur at the time of maximum signal on terminal 226. The use of the 90° phase signal out of the dual JK flip-flop 526 is now apparent; it permits movement of the phase of this signal in the networks required to bring the signal into proper synchronization.

It is to be noted that the 920 KHz reference at 0° and 90° are derived from pins 8 and 5 of the dual J-K flip-flop 9BU32 for use in other circuits of this board; primarily the circuits of FIG. 9A.

Reference is now made to FIG. 9C of the accompanying drawings which illustrates the sweep acquisition circuits of the TDC. As previously indicated the sweep inhibit signal comes in on terminal 9CJ21 to drive a coil 536 of a relay 538 having a normally open contact 539 in series with a normally open contact 540 of a solid state relay 543 having a contact 541 that is closed when a carrier is detected. The normally closed contact 541 is connected in the input circuit of an inverter amplifier 9CU29C. This circuit is part of the long phase lock loop used in the TDC. The amplifier 9CU29C and associated circuits serve two functions; as the loop filter integrator and as the sweep circuit when searching for a carrier in the appropriate frequency range.

The input to amplifier 9CU29C is on pin 2 via contact 541 with integrating capacitor 542 and resistor 544 in its feedback path, the resistor 544 being used as a damping resistor that sets the damping factor for the long loop. The input to the amplifier 9CU29C is derived from pin 14 of amplifier 9AU7A via resistor 9CR225 and from 9AU8B pin 14; the former going to the automatic phase control circuitry and the latter to a quad signal correlator. Suffice it to say at this point that the quad signal correlator produces an S-shaped function to facilitate acquisition of a signal when it is quite weak and its function totally disappears when the loops become phase locked.

The underlying approach to this part of the system is to disable the integrator during sweep and to disable the sweep upon detecting a carrier and to activate the automatic phase control loop associated with amplifier 9CU29C. As previously indicated during phase lock the contacts 541 of relay 543 are closed; this in response to a sweep inhibit signal on terminal 9CJ12. This operation causes the phase locked loop to be connected into the automatic phase control loop. The time constant of the loop is determined by the capacitor 542 at 0.47 microfarads and resistor 543, resistor 544 and resistor 546; a total of about 34K ohms. The sweep inhibit signal is generated in response to receipt of a carrier; the COR signal.

The output voltage of the loop on pin 1 of 9CU29C is applied to a lead 548 which connects to input pin 6 of inverter amplifier 550 and through a jumper 552 to ground through resistor 554 to ground. The resistor 554 is connected through jumper 556 to the input pin 9 of amplifier 558. Both jumpers are not used concurrently; the inclusion of one or the other jumper determining whether or not the signal output of the loop integrator amplifier 9CU29C is to be inverted or not. If the jumper 552 is removed the signal is not inverted and if the jumper 556 is removed the signal is inverted. This feature has been inserted to provide flexibility in design of the system. As is apparent the signal to amplifier 9CU29C is applied to the minus input so the output is inverted. Thus if jumper 552 is kept in the circuit the output of 9CU29C is inverted and comes out at zero phase. The jumper 552 is the one normally kept in the circuit.

Completing the discussion of the long phase locked loop, the signal across resistor 554 is applied to pin 3 of amplifier 9CU29D which provides a signal on pin 14 to terminal 242. This signal is applied via lead 244, FIG. 6 to terminal 246 of the D-band amplifier/mixer 212 illustrated in detail in FIG. 7. The terminal 246 is connected to the oscillator 330 to complete the long loop controlling this oscillator to maintain phase and frequency sync of the oscillator 330 with the incoming signal set to the mixer 324.

Returning to FIG. 9C, the loop filter integrator is used as the sweep oscillator during sweep intervals to produce a linear triangular wave form. During sweeping the sweep inhibit signal causes contacts of relay 538 and contacts 540 of the solid state relay 543 to close. The voltage from the −15 volt terminal 560 is applied to the junction of capacitor 542 and resistor 544. If applied directly to pin 2 of amplifier 9CU29C the wave would tend to rise and have a small pedestal or it could drop due to the integrating current from the capacitor. If inserted between the resistors 543 and 544, the charging current through the capacitor would distort the wave shape. The sweep signal is also applied to oscillator 330 to produce of sweep of the signals applied to mixer 324 during search for a carrier.

The use of the relay 538 is to eliminate small leakage currents through the solid state relay 543 during non-sweep operation which would have a deleterious effect on output of the integrator of the long loop.

Reference is now made to solid state switch 29CU27 and associated circuits which are used in QUICK-LINK. Positive and negative fifteen volts are applied to pins 4 and 11 respectively of the switch 9CU27. The switch has two sets of contacts 562 and 564; which are closed in alternation. The contacts 562 and 564 are connected through different one megohm resistors 566 and 568, respectively, to common lead 570 connected at one end through resistor 572 to pin 11 of relay 543 and the other end connected through resistor 574 and potentiometer 576 in series to ground. The potentiometer 576 determines the magnitude of the voltage applied to the integrator associated with amplifier 9CU29C and thus the sweep rate of the system.

The two pins 2 and 13 of the switch 9CU27 are connected together by serially connected equal value resistors 578 and 580, respectively. The midpoint between these resistors is connected via a lead 582 to pin 10 of a very high gain amplifier 9CU29A, the other input being to its pin 9 from amplifier 550. Pin 10 is connected to ground through series(?) connected resistor 584 and potentiometer 586; the latter controlling the voltage pin 10. The output of amplifier 9CU29A is applied to the switching control pin 6 of the solid state switch 9CU27 and to terminals 9CJ25-26, the sweep output from this board to the microprocessor to cause the first LO synthesizer to sweep the RF section to look for a carrier.

The signal applied to the pin 6 of the switch 9CU27 ramps in a negative direction when a positive voltage is applied to the integrator and vice versa. Each time the voltage on pin 9 crosses the voltage on pin 10 the output of amplifier switches and changes the position of the contacts of switch 9CU27 and causes reversal of the voltage to the sweep generator. Thus the integrator integrates up to a specific threshold level at which the output of 9CU29A toggles and then integrates down until it crosses the reverse threshold. Basically the arrangement is an oscillator with the potentiometer 570 setting the frequency and the potentiometer 580 setting the amplitude of the signal.

It will be noted that a terminal 9CJ35 receives a signal from the output of amplifier 550, the so-called stress voltage. This terminal is connected to a bar indicator on the front panel and during sweep the illuminated bar is swept back and forth. During phase lock however, the voltage output from the amplifier 550 is an indication of how far off the tuning is from the signal being received. As will be discussed subsequently, the front panel switched of the TDC can be employed to change the frequency in 1 MHz steps to center the indicator; that is, to fine tune the RF frequency.

Reference is now made to FIG. 9A of the accompanying drawings. The 920 MHz signal from the VHF downconverter 220 is a.c. coupled via terminal 234 to pin 4 of doubly balanced mixer 600. Pin 8 of the mixer 600 receives a 920 MHz signal phase shifted 90 from the pin 5 of the dual JK flip-flop 9BU32. Thus the mixer serves as an automatic phase detector; the output of which is connected via amplifier 9AU7A to the APC input to the contact 541 of the switch 543 via resistor 9CR225 as previously indicated. A potentiometer 602 is employed to provide a small amount of offset correction so that the average value of the output is nominally about zero.

Reference is now made to double balanced mixer 9AU9 which also receives on pin 1 the 920 MHz signal from the VHF downconverter via capacitor 604 and resistor 606 in series. Pin 8 of 9AU9 receives a zero phase 920 MHz signal from the zero degree output of the dual JK flip-flop 9BU32 and is followed by circuitry through amplifier 608 that is identical to the mixer 600.

The output from amplifier 608 is at a high dc level relative to the output from amplifier 9AU7A because of the 90 degree phase shift between the inputs on pins 8 of the mixers. Specifically the output of amplifier 9AU7A is zero and the output of amplifier 608 is at a a high dc level when there is phase lock. Upon loss of phase lock both amplifiers put out a beat frequency.

The amplifier 608 output is passed through a four pole active filter 610 to amplifier 9AU10B and outputs a carrier lock signal to the front panel LED.

The important feature of the two doubly balanced mixers is that when sync is lost both produce beat frequencies but these signals have different harmonics and weighting coeficients and the like. These two signals are applied to still another doubly balanced mixer 612, the signal from 9AU7A pin 14 being applied via capacitor 9AUC50 amplifier 614 and a four pole active 300 Hz high pass filter 616 to pin 8 of mixer 612. The output of amplifier 608 is applied to pin 4 of the mixer 612 via series connected resistor 618 and capacitor 620. The mixer 612 again operates as a phase detector and produces on its output in the absence of phase lock an S-shaped curve. This circuit is described in detail in Gardiner's book *Phase Lock Techniques*, Second Edition, page 86. The purpose of the circuit is to eliminate the problem with standard phase detectors where the greater the discrepancy between desired and achieved frequency, the weaker the signal. In the circuit described above, the S-shaped curve of the output signal from amplifier 622 increases in voltage as the spread between desired and achieved increases. The S-shape is symmetrical about the phase lock point and thus always drives the VCO toward phase lock; that is, toward the desired frequency.

In the circuit described, the output signal also has an ac component at twice the input frequency but this is filtered out by a 300 Hz low pass ac four pole active filter 624. The output of the filter which appears on pin 14 of amplifier 9AU8B is applied, as previously indicated, through resistor 9CR226 to the phase loop integrator via contact 541 of relay 543. Thus the loop is closed and at phase lock there is no signal applied to the integrator because of zero output from amplifier 9AU7A-14.

Reference is now made to the circuits of FIG. 10 of the accompanying drawings which illustrates the bit sync detector. As previously indicated, the TDC sweeps to find a carrier and once it finds a carrier it stops the sweep and looks for a PSK carrier. Several different incorrect signals may trigger PSK recognition, such as a CW signal, a data signal, etc. Thus before looking for an ID signal the system looks for bit synchronization tat, in the example under consideration, is a signal at the 15.6250 bit rate. After bit sync is found then the system goes into a routine looking for the ID signal.

The bit sync is actually detected in the exclusive OR-gate 9BU26B where the zero degree pulse from amplifier 484 appears on pin 10 and the incoming signal at the output of amplifier 470 is applied to pin 9. If the signal on pin 9 has alternate ones and zeros when the system is locked onto the carrier and the rate is 15.6250 MHz there is timing coherence, the output from the gate 9BO26B is at one d.c. level, approximately 3.75 volts, and if the rate is otherwise or the signal is a CW signal, etc. the d.c. level falls to about 2.5 volts. This fact is used in the circuits of FIG. 10; the bit sync lock detector. If the threshold on pin 13 of amplifier 10U12A is set at, approximately three volts, if the voltage on pin 12 rises above that level, bit sync has been detected. The amplifiers 10U12A and 590 and associated circuits constitute an active four pole low pass filter used to eliminate a.c. noise. The filtered signal is applied to op-amplifier 592 to drive the bit sync indicator on the front panel.

The amplifiers in this string each have a gain of about two, so again a voltage divider, resistors 9CR143 and 9CR594 serve as a voltage divider to prevent saturation of the amplifiers. A threshold is established on the negative terminal of the amplifier 592, pin 6, according to the setting of a potentiometer 596 in the input circuit to pin 6. The threshold crossing causes the output of amplifier 592 to toggle at TTL levels. Some hysteresis is added by feedback resistor 598 to prevent jitter. The output of 592 is applied through an inverter 594 to drive the bit sync indicator via pin 2 on 306A on the front panel board and to the MPU board via pin 20 of connector 254A to the HDLC 70.

Figure 11:
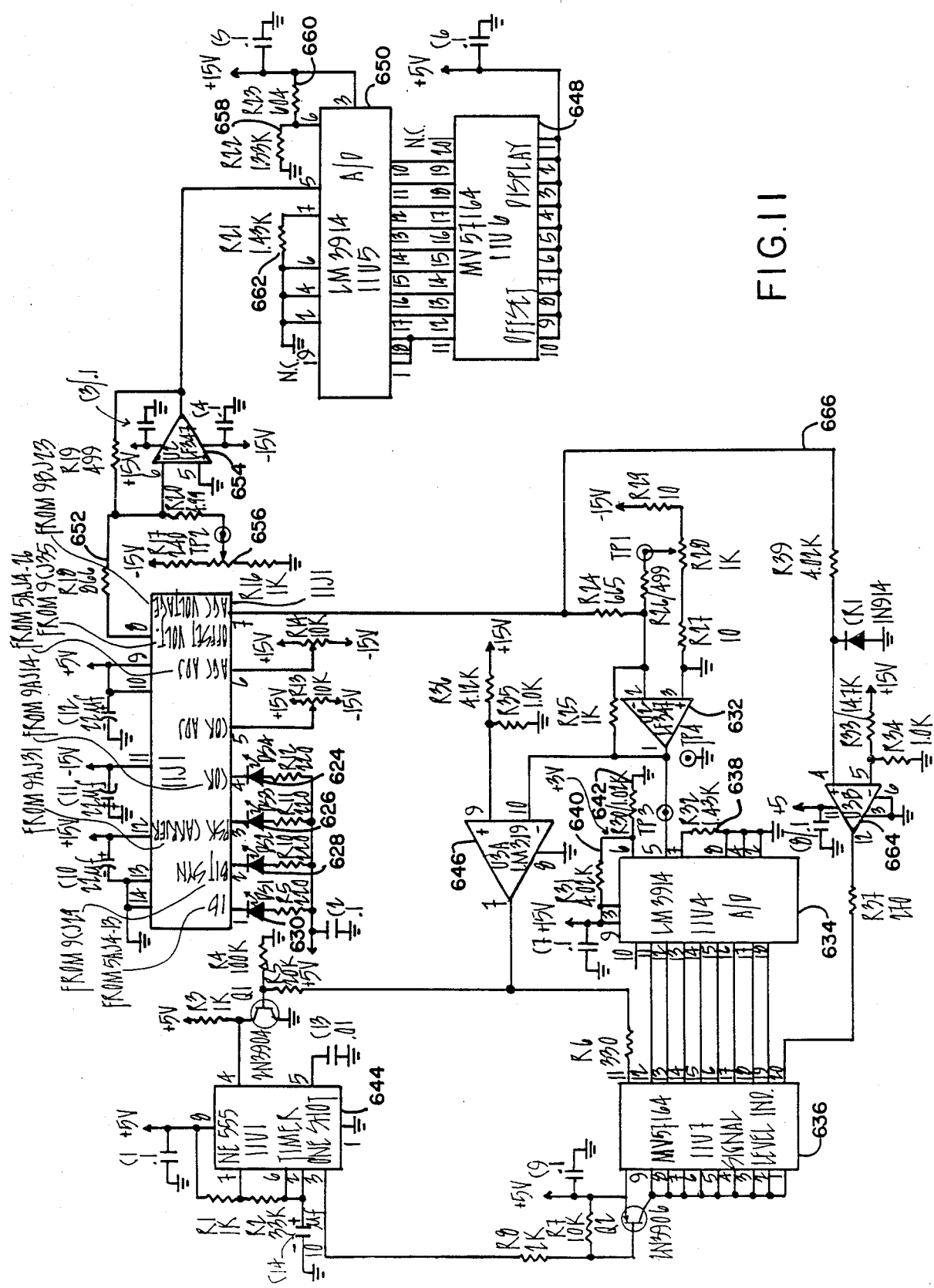
FIG. 11 is a schematic circuit diagram of the front panel control board of the TDC.

Reference is now made to FIG. 11 of the accompanying drawings illustrating the schematic diagram of the display board 306. The interconnection from the various boards to the display board is clearly illustrated in FIG. 6A; the mother board.

The various LED indicators for in order of illumination, are carrier detector, PSK carrier detector, bit sync detector and ID identification and are indicated by reference numerals 624, 626, 628 and 630, respectively. These LED's are driven from the connectors indicated in FIGS. 6A and 11.

The AGC voltage is applied via a comparator amplifier 632 to an analog-to-digital converter 634 for application to a signal level indicator 636. The indicator is a bar type with another bar being illuminated from the bottom toward the top as each successive threshold is exceeded. The resistor 638 between pins 7 and 8 of analog-to-digital converter 634 sets the current level applied to the indicator and thus the light level of each bar. Resistors 640 and 642 set the voltage range over which the indicator 636 renders a display.

Reference is now made to a timer 644, a one shot multivibrator, which is also associated with the indicator 636. The timer is used to flash the indicator whenever the AGC voltage exceeds the dynamic range of the indicator. Note that the output of the amplifier 632 is applied to the negative input of comparator amplifier 646 so that when the voltage on that pin exceeds the input voltage to the positive input pin 9, the timer 644 is activated and flashes all but the top bar of the indicator. The uppermost segment of the range is not controlled by the analog-to-digital converter but is controlled by an amplifier 646. The output of the timer is not applied to the pin 10 of the display and thus does not pulse this bar. The lowest segment of the display 636 is controlled by a comparator amplifier 664. It also receives the AGC signal via a lead 666 and establishes the lowest segment of the AGC display. Specifically the amplifier sets the low end of the AGC range covering that region which is not linear.

The various potentiometers employed throughout this figure are used to set thresholds of operation of the various devices on display.

Reference is now made to an offset (stress) voltage indicator 648 driven by another analog-to-digital converter 650. The voltage is derived on pin 8 of connector 11J1 and is applied via resistor 652 to pin 6 of amplifier 654. Indicator 648 is a horizontal display of vertical bars; a potentiometer 656 adjusting the circuits such that the bar appears in the center of the display in the absence of a stress voltage. Resistors 658 and 660 set the scaling factor and resistor 662 the amplitude of the driver current.

The input voltage to pin 8 of 11J1 is from the connector 9CJ35 which receives the output voltage of the amplifier 550, FIG. 9C. During lock the output amplifier 550 is a dc voltage or zero voltage and during loss of lock is a sweep voltage. The indicator is initially set at the factory to display a bar in the middle of the display. If the input frequency control of the VCO is set in exact frequency synchronization with the incoming signal, the bar is in the center. If the input frequency control signal is not centered, the bar moves to a position in one direction or the other from center. The front panel frequency control can be changed to correct the initial tuning of the VCO.

Figure 12A:
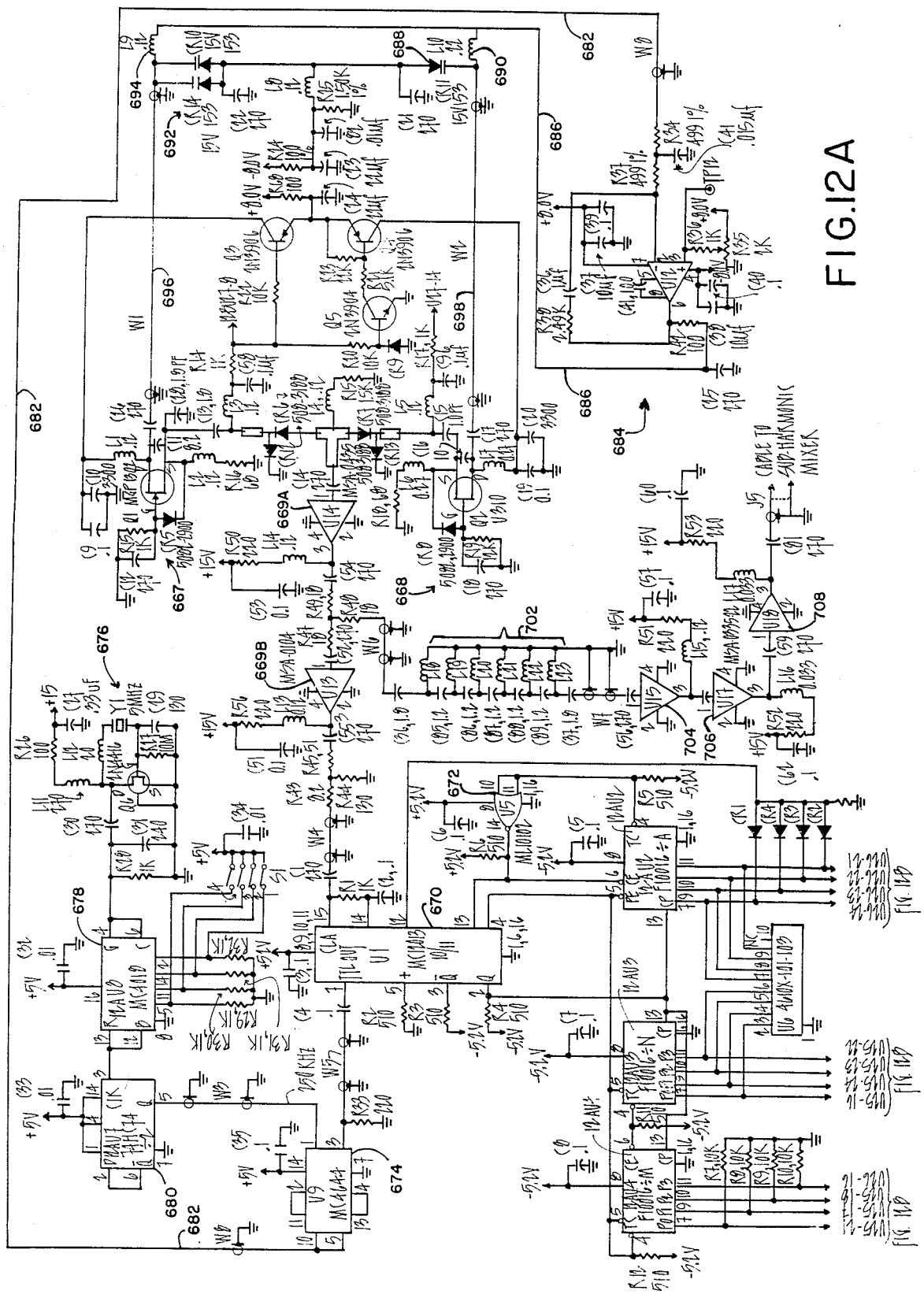

Reference is now made specifically to FIGS. 12A and 12B illustrating the first LO synthesizer which provides the first down conversion frequency to the mixer 314 of FIG. 7 of the accompanying drawings via terminal 228.

The first LO synthesizer has two voltage oscillators generally designated by the reference numerals 667 and 668. The oscillator 667 covers a frequency range of 520 MHz to 575 MHz while the oscillator 668 covers a band from 387.5 MHz to 520 MHz. The specific oscillator activated at any given time is elected by the MPU in accordance with the frequency of the incoming RF signal to be processed, as will be discussed subsequently. The output of the selected oscillator is passed to a first amplifier 669 and thence through a second amplifier 669B to a divide-by-11/10 chip 670.

Reference is now made to a counter in the lower left region of the figure and comprising chips 670 and 12AU2 and 12AU3 and 13AU4. The chip 670 provides on its pin 2 first a divide-by-11 signal and then a divide-by-10 signal. The divide-by-11-signal is applied to divider 12AU2 which further divides by a factor A and thus produces a divide-by-11A which when the function is completed produces an output on pin 4 that is applied via OR-gate 672 to pin 13 of counter 670 and causes it to now divide by 10. The output of the OR gate is also applied to pin 6 of counter 12ASU2 and terminates further counting by this circuit.

The divide-by-10 count output from counter 670 is now applied to counter 12AU3 so that the division is now 10(N−A). The minus A factor is from the fact that the eleven count applied to counter 12AU2 was also applied to counter 12AU3 and was thus subtracted from the factor N for the counter of A. The final count 10N−A is now applied to counter 12AU4 which after a further division by factor M produces an output on its pin 4 to reset all of the counters 670 and 12AU2-U4.

Resetting of the counter 670 causes a chip-to-TTL converter on chip 670 to cause a TTL signal to be produced on pin 7 of counter 670. The signal on pin 7 is supplied to a phase detector 674. The signal from the chip 670 is compared with an output signal from a crystal controlled oscillator generally designated by the reference numeral 676. The crystal frequency is 5 MHz and is divided down to 250 KHz first by a factor of 10 in divider 678 and then by a factor of 2 in divider 680. The phase detector produces an output signal indicative of the phase error between its two input signals. These two signals are the divided down in frequency from the oscillator 676 and as will become apparent subsequently the divided down feedback frequency from the phase control loop.

The output signal from phase detector 674 is applied via a lead 682 to a loop filter (integrator) 684 which drives via a lead 686, various varactors to correct frequency error. Specifically the lead 686 applies a correction voltage to varactor 688 which together with an inductor 690 forms the tuning circuit for the oscillator 668. The lead 686 also provides the correction voltage to paralleled varactors generally designated by the reference numeral 692. The varactors 692 together with inductor 694 form the tuning circuit for oscillator 667. Two varactors are employed because in the physical layout of the board on which these oscillators are arranged cable 696 is quite short and substantially shorter than cable 698 associated with oscillator 668.

The selection of the specific frequency to which the first LO synthesizer is to be tuned is set by the front panel switches which through the MPU board send appropriate signals to the first LO synthesizer board. Specifically, the selection of one of the oscillators 667 and 668 is made via amplifier 12BU27D and 12BU27C, respectively. These amplifiers serve as a band switch and receive signals via pin 17 of a UART (a National Semiconductor COP) 12BU26. Control data for the UART 700 and a second UART UBU25 is received over an RS232 bus 12BJ1 and J2 via an amplifier 12DU27A.

The MPU board also supplies the division ratios A, M & N to the dividers 12AU2-4 in accordance with the selected RF frequency. These signals, as is apparent from the drawings are also supplied by the UARTs 12BU25 and 12BU26 as per the indicators on the various leads. A 480 KHz crystal 700 supplies the clock for the UARTs and provides precise timing for gating in and out data; i.e. band and divider data.

The UARTs are reset as required by a reset signal from the MPU board via terminals 12BJ3 and J4.

To complete the description of the first LO synthesizer, the regulated frequency output from the amplifier 669 is applied through a high pass filter 702 that selects the second harmonic of the frequency generated in the oscillator 667 or oscillator 668. The output of the filter passes through amplifiers 704, 706 and 708 and is fed to the D-band board 212 through the 775 high pass filter 274 and 1150 low pass filter 282 to limit the band of signals to the 775 MHz to 1150 MHz band.

Reference is now made again to FIG. 4 of the accompanying drawings illustrating the pilot thumbwheel interface 42. For use with the TDC, this circuit has the switches 150 and 152 set to the TDC position and otherwise there is no change in the circuit. The program recognizes the interface as providing TDC information, in this instance, the RF frequency, and outputs the appropriate information to the first LO synthesizer 266 for processing as indicated immediately above.

A second interface is also employed in the TDC, the circuit being illustrated in FIG. 13 of the accompanying drawings. This interface, designated by the reference numeral 294 in FIG. 6, establishes the pilot and ID frequency in the TDC and is identical to FIG. 4 except it is smaller and does not have the TIM-TDC switches since it is used only in the TDC. Data to the MPU board appears on bus 710 and the address signal to the interface is supplied over a lead 712 to pins 1 of encoders 714 and 716. Thumbwheel switches 718, 720, 722 and 724, each to ten positions, provide the input data to the encoders. This information is supplied to the MPU board which in turn transmits the appropriate data to the VHF downconverter board 220 specifically chip 8BU8 to determine the IF frequency of the receiving system.

The program identified in the microfiche appendix as TIM/TDC Microprocessor Control Program, the logical flow of which is illustrated in FIGS. 14-17, is utilized by the TIM and the TDC microprocessors. Pages 1-4 of the program define the RAM variable address locations, EEPROM constants and input/output addresses to be utilized by the program. Lines 00C0 through 0064 establish interrupt control register values.

Figure 14A:
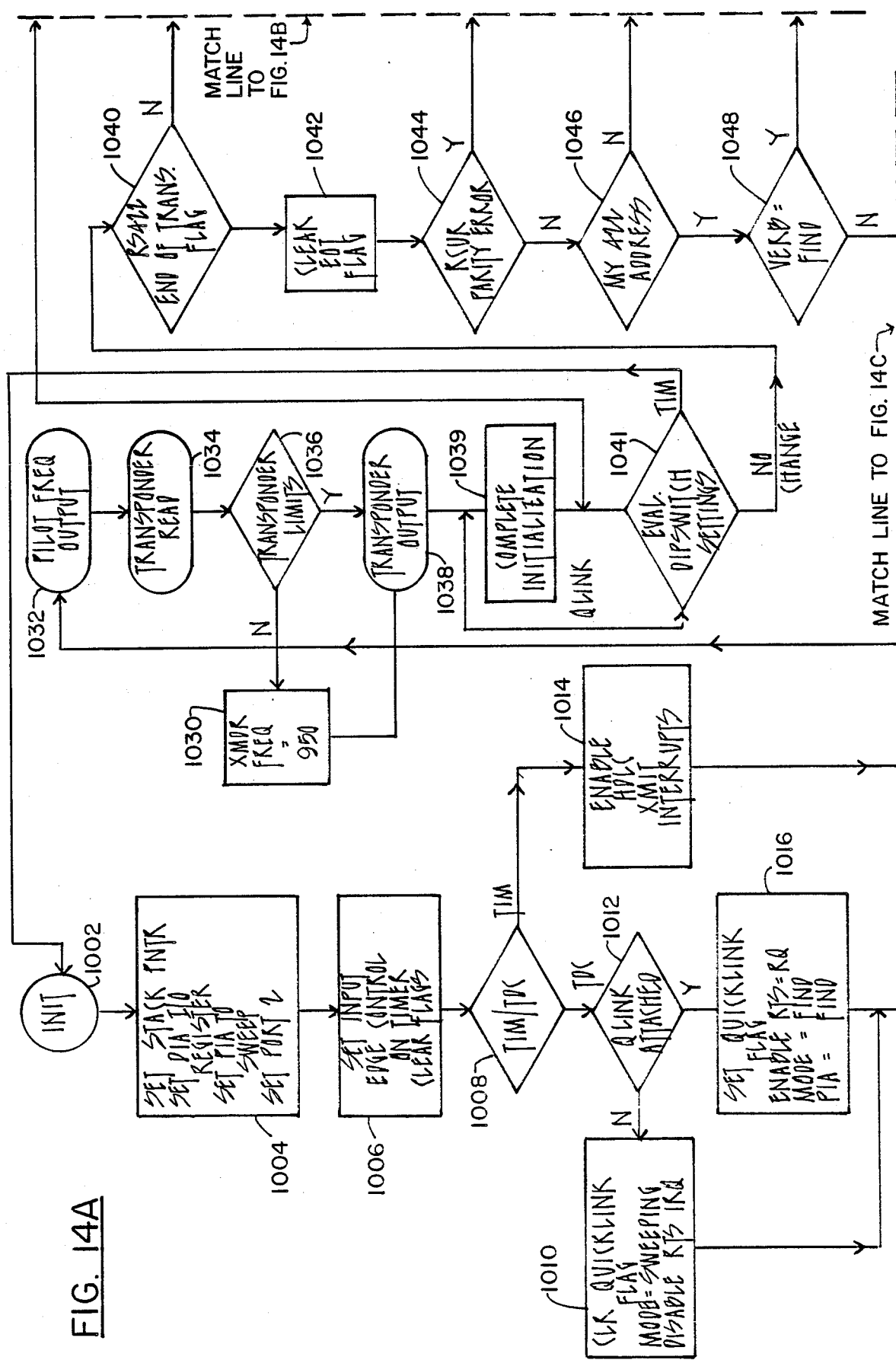
Figure 14B:
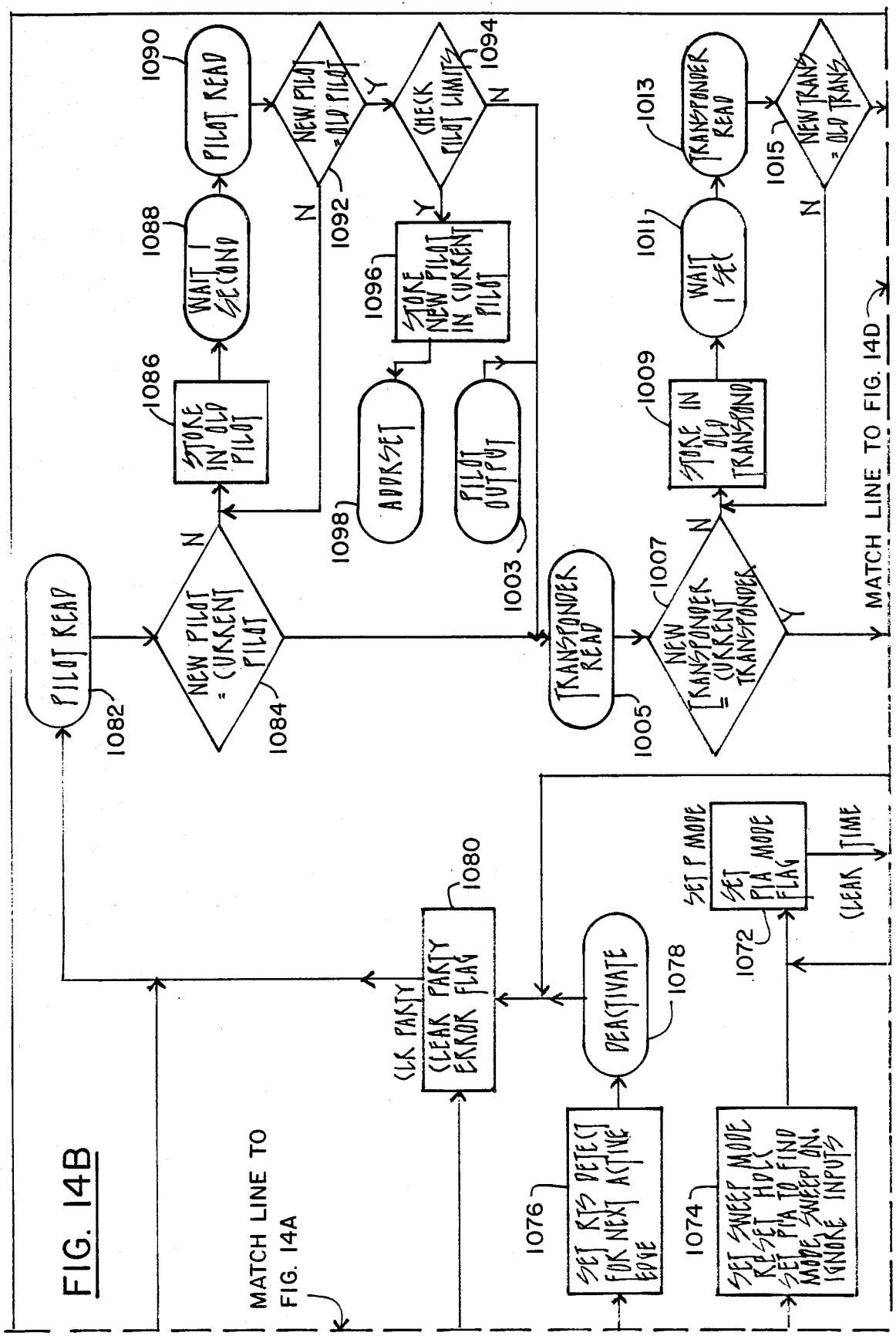
Figure 14D:
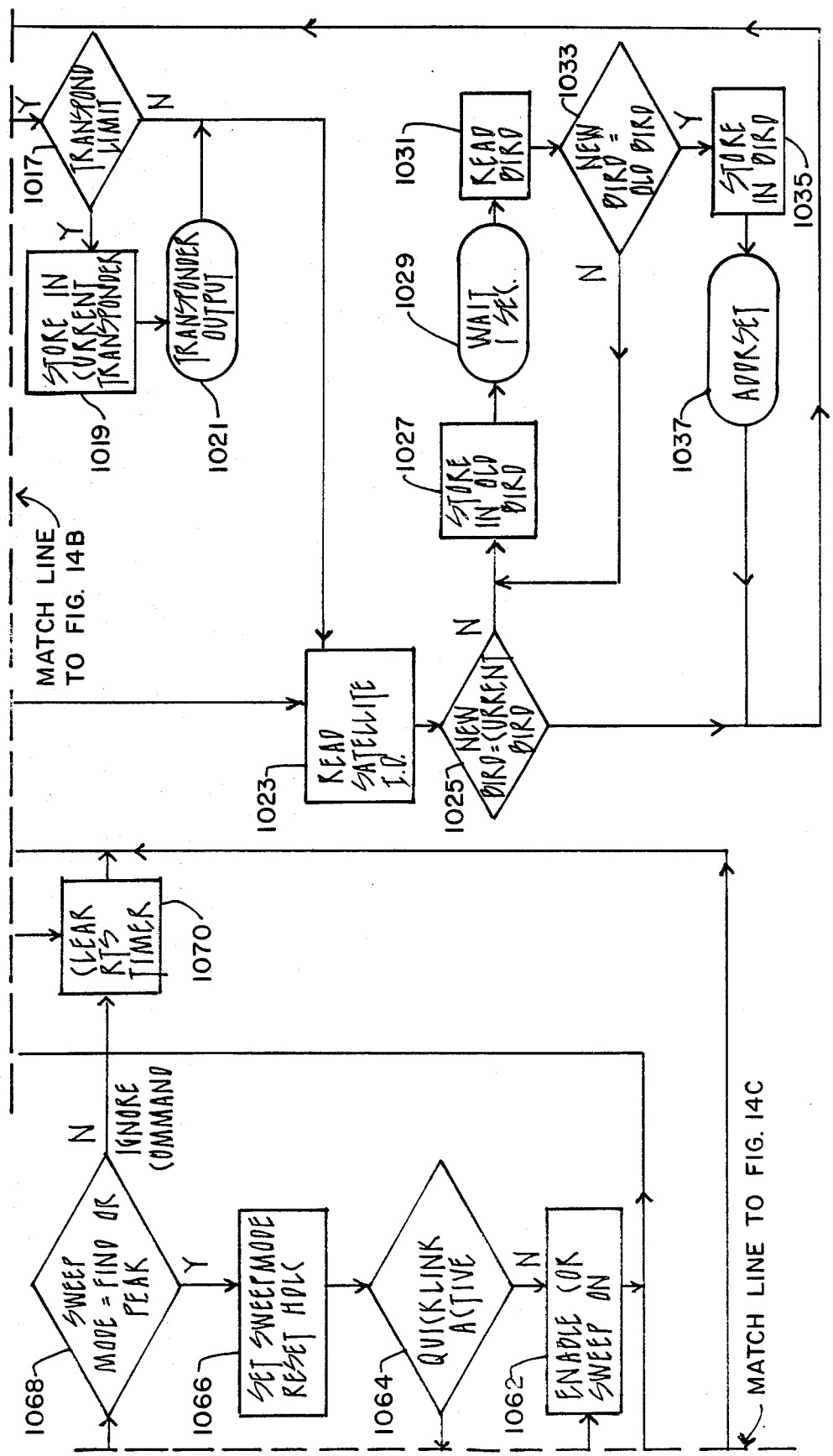
Figure 15A:
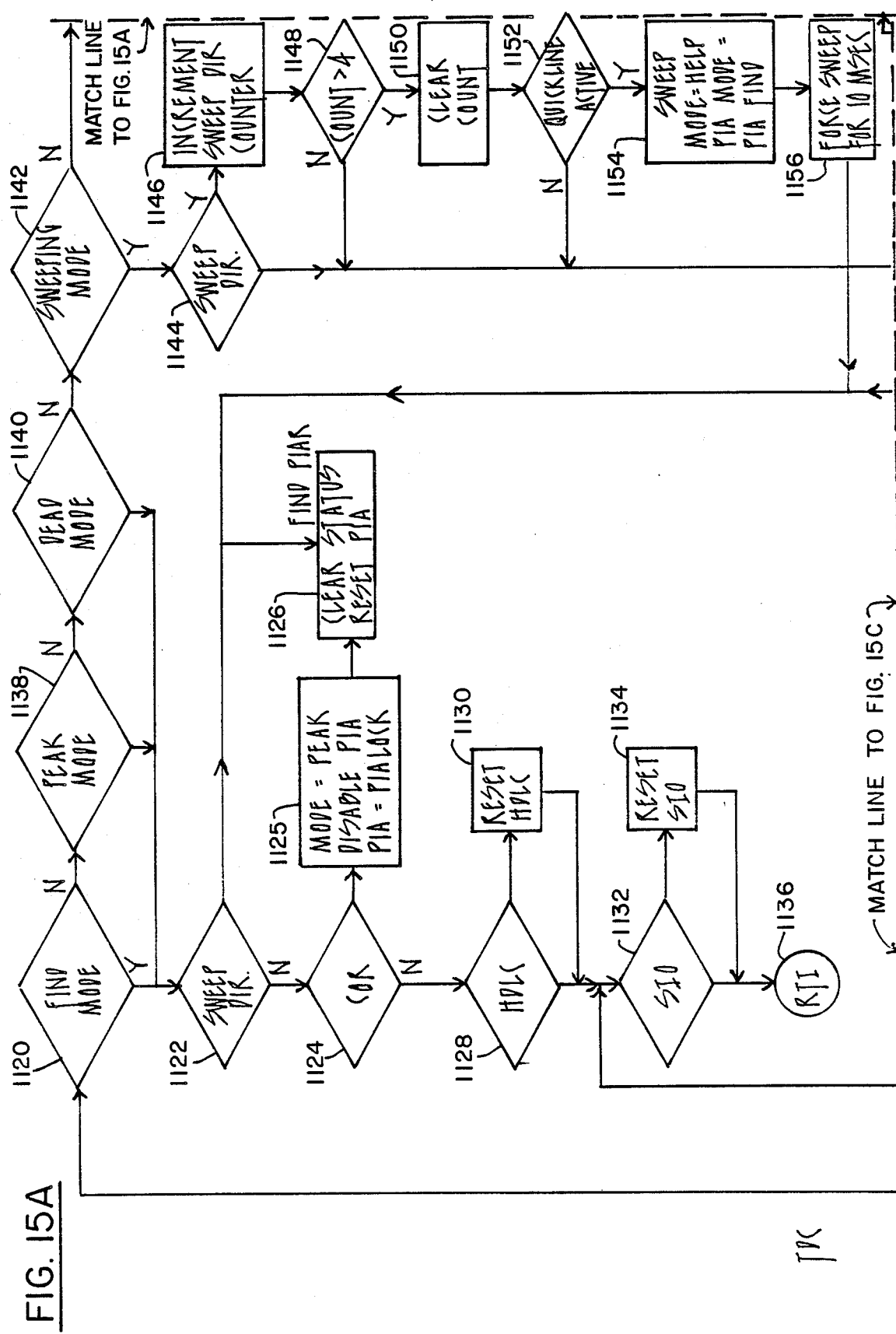
FIGS. 15A-E are a logical flow diagram of the portion of the microprocessor control program utilized for processing of interrupts.
Figure 15B:
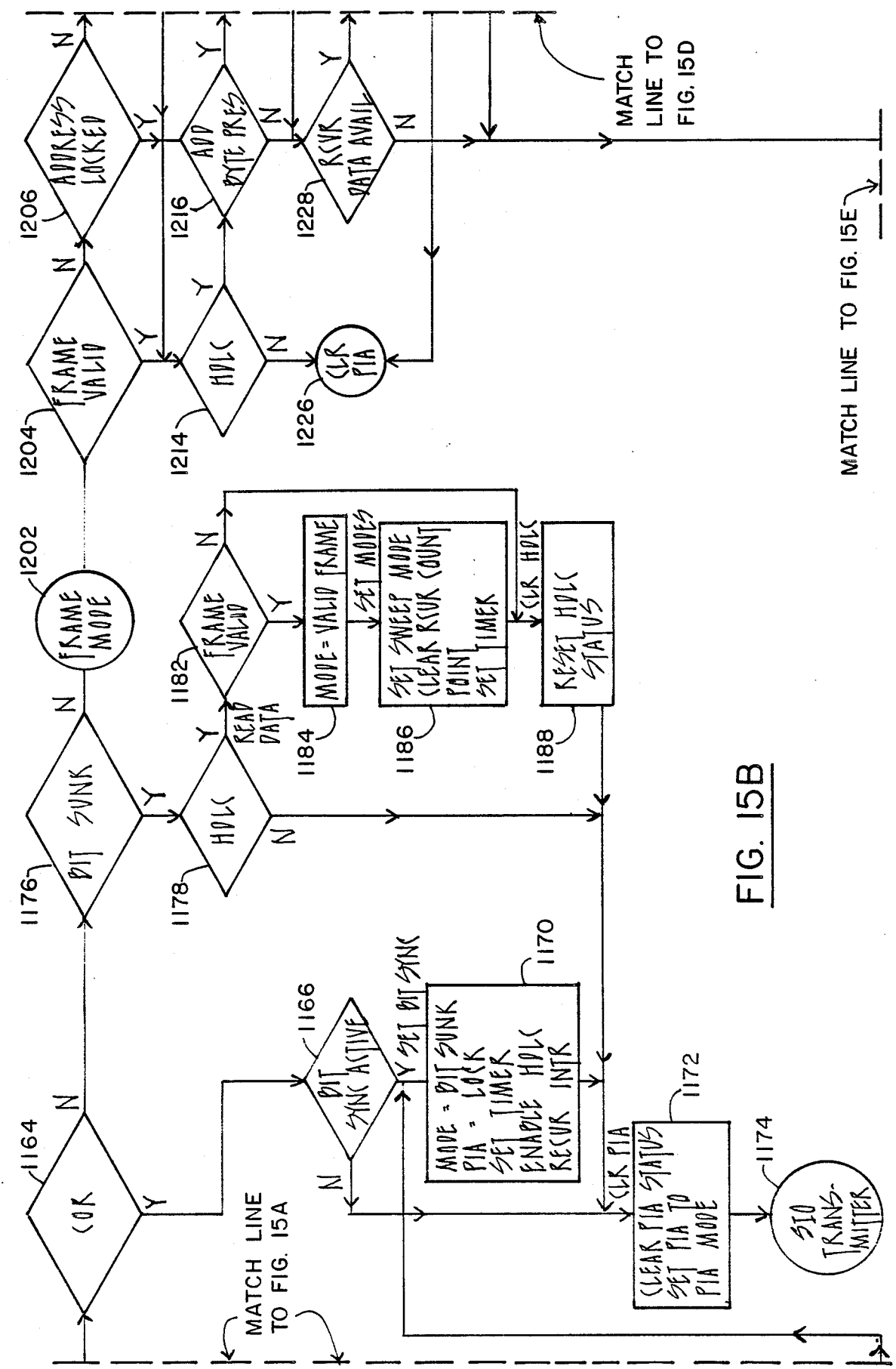
Figure 15C:
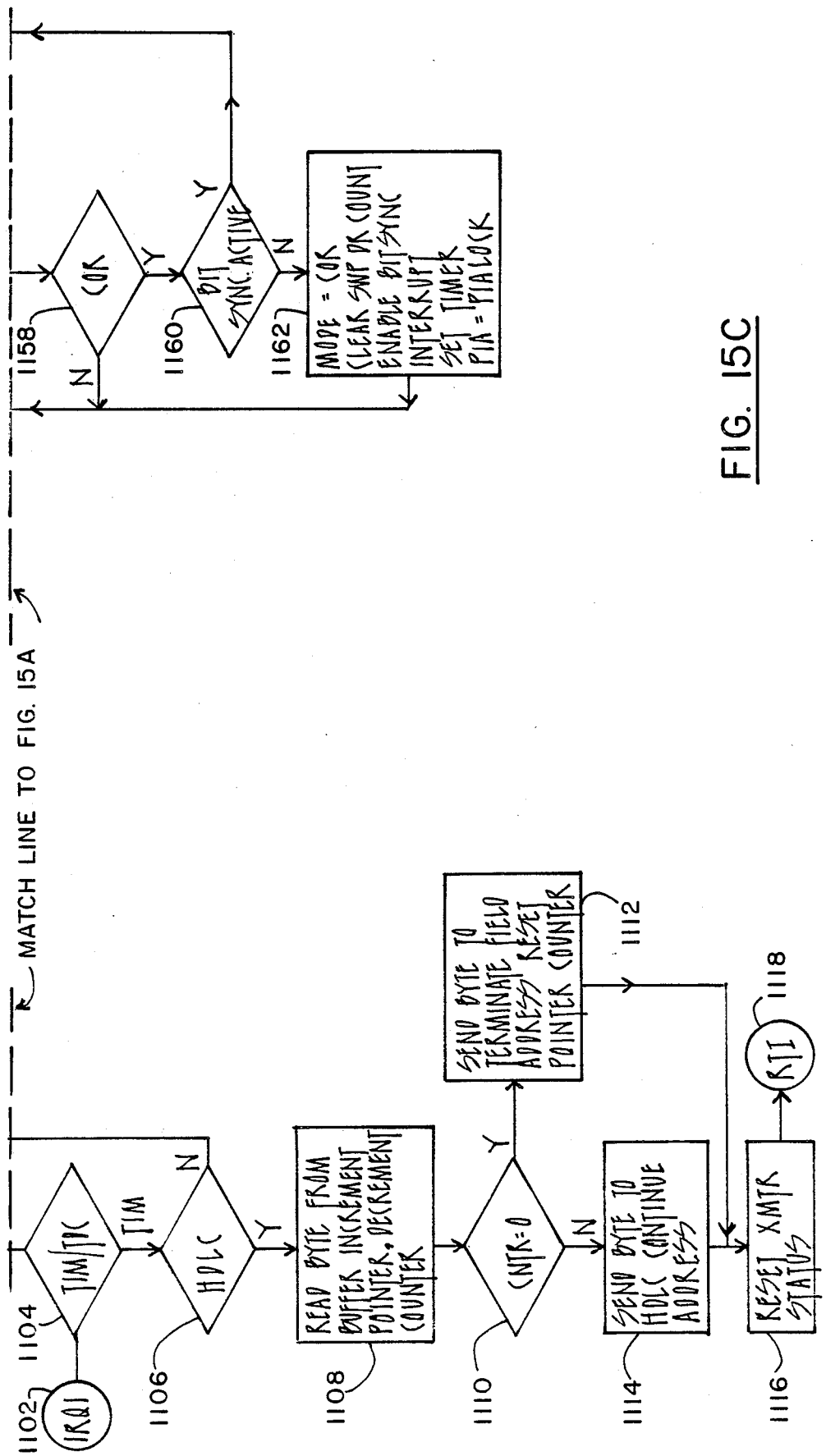
Figure 15D:
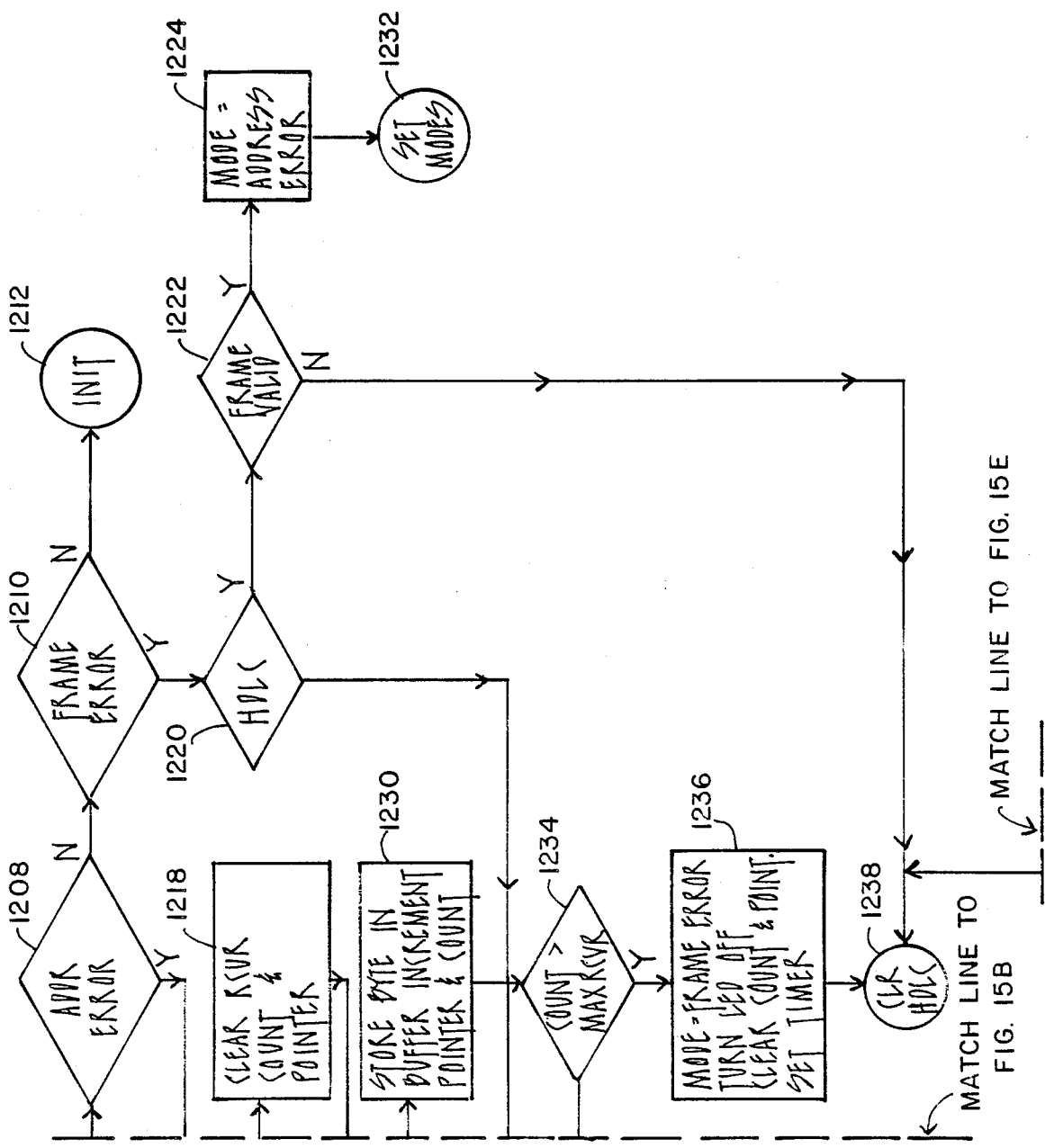
Figure 15E:
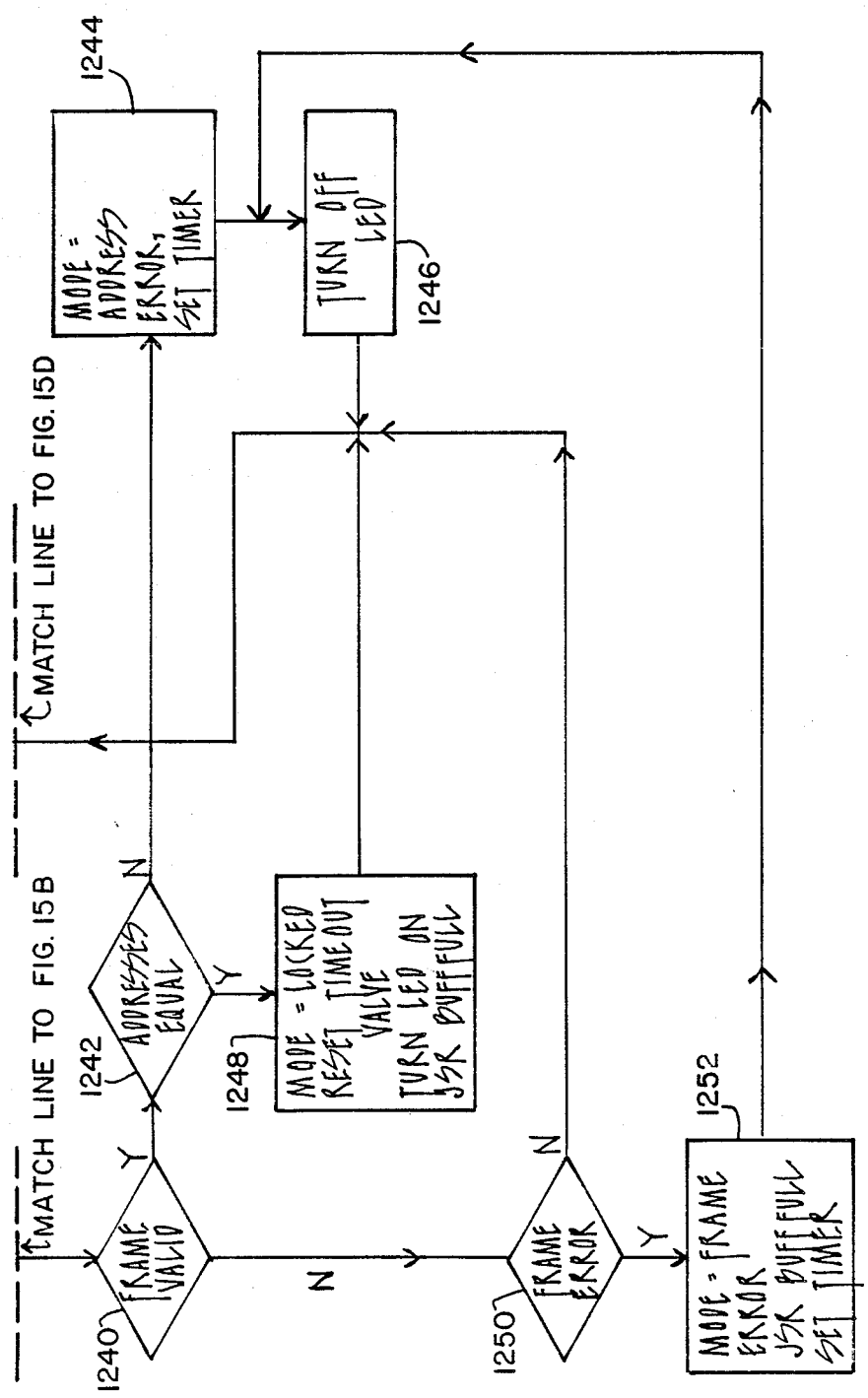

The executable portion of the program, begins at listed line E000 equivalently also block 1002 of the logical flow diagram illustrated in FIG. 14. The initialization sequence includes setting the stack pointer, the PIA I/O registers and PIA to sweep mode, block 1004.

The data pointer is set to access 8K of external RAM. The front panel 422 outputs are established for Quicklink interaction and the HDLC is disabled. The timer edge controls are established, block 1006, and all flags are cleared. Then the processor determines if it is functioning in a TIM or a TDC block 1008. The determination of TIM or TDC configuration is made through the operation of lines E062 through E069 wherein the settings of dip switches 207 are analyzed to determine, receive or transmit mode configuration. If the program is utilized in a TIM setup the HDLC transmit and interrupts are activated or enabled and program flow bypasses the Quicklink verification portion, blocks 1010, 1012 and 1016.

If the program is utilized in a TDC setup this condition will be detected through dipswitch settings, and a check is performed to determine if the TDC is under the control of a Quicklink Controller block 1012. The Quicklink flag is set upon detection of Quicklink control. The Peripheral Interface Adapter (PIA) mode is then set to detect RF carrier or direction changes, block 1016. If a Quicklink controller is not utilized, block 1010, the PIA is set to "sweeping" mode to seek a COR. The HDLC chip 70 is reset and the processor is set to UART mode, block 1018.

At line E049, block 1020 a jump to subroutine PILOTRD is performed whether as TIM or TDC. The front panel pilot frequency is read by the microprocessor from the front panel thumb wheel position settings. This reading is compared against predetermined frequency limits, block 1022. If the thumbwheels settings are out of range, the pilot frequency is reset to 70 MHz, block 1024, otherwise the pilot frequency as read from the front panel remains unchanged. The desired frequency is then stored as the FM setup as variable PILOTFRQ. Blocks 1020-1024 correspond to program lines E049-E056 and associates subroutines.

The ID of the desired satellite is loaded from variable "BIRDSEL" to provide the desired satellite ID "BIRD". The pilot frequency and satellite ID are compacted into two bytes and stored as the setup in L. "ADDRESS" block 1026, Program lines E058-E05F.

Lines E06C-E117 establish the proper parameters for TIM transmit configuration. In line E06C the HDLC is reset to transmit configuration. The HDLC pointers are reset, line E071, to start of HDLC buffer.

The PIAs are set to lock mode, E09B, because they are not utilized at present. The UART command register, referred to as the SIO line E0A1, is loaded. The UART in communication here is the external UART identified as 184 in FIG. 5A. The UART has dual registers at a common address and therefore a secondary pointer must be set to indicate the first or second register for current communication connection. The appropriate pointers registers and dipswitches are read to provide appropriate baud rates, parity, Auto Echo and other necessary communication parameters, lines E0A4-E0DB.

The BUFFFLAG, line E0E2, indicates that the transmit or HDLC buffer is empty and that more data is required from the 8K buffer to replenish the transmit buffer. A temporary buffer is utilized between the 8K and the transmit buffer for assembly of a frame of data which can then be quickly downloaded to the HDLC buffer without processing. Subroutine STUFBUFF is utilized to refill the intermediate buffer.

Lines E0EA-E10B are utilized to determine if the pilot frequency has changed. If the pilot frequency has changed then the new frequency is stored in the variable PILOTFRQ in place of the old frequency. If the frequency remains unchanged or after the new frequency is stored, the setting of the dipswitches are evaluated, lines E10E-E117. If the dipswitches have changed the changes are evaluated and appropriate configuration changes made. Evaluation of the dipswitches at this point can even indicate that the system has been configured as TDC instead of TIM.

If the system appears reconfigured after dipswitch evaluation then the flow jumps back to initialization E001 for complete reconfiguring of the system.

The TIM executable portion of the software, lines E06C-E117 are executed only by a TIM system, if the interrogation of line E065 indicated a TDC, then a jump would have been made to line E11A. A satellite ID has been established and a desired frequency at which to transmit the identifier is supplied by line E066. Therefore if the processor is operating in a TDC, logical flow terminates at block 1028 which is exited only when the setup is TDC.

The remainder of the program, lines E11A et seq., is executed when accessed by a microprocessor within a TDC system environment. The TDC microprocessor, after clearing flags and establishing proper initialization, outputs the pilot frequency, block 1032, line #14B, to the second 50-90 synthesizer to establish the proper setting for the synthesizer. Next the transponder frequency is interrogated, block 1034, line E14E, and analyzed to determine if it is within the proper range, block 1036. If the transponder setting is out-of-range, the transponder is default set to 950 MHz, block 1030 the low end of the 950 to 1700 band. The transponder setting, once established, line E15B, is sent out to the first LO board, block 1038, line E163.

The program next completes the initialization block 1039, first line E166 sets the TDC for "standalone mode" which indicates the configuration of the system when a Quicklink controller is not utilized for remote control of the TDC. Once the TDC is set on this assumption, the dipswitch settings are evaluated to determine if the system is configured for Quicklink control, line E169, and if the dipswitch settings indicate that the TDC is to function without external Quicklink control the program flow jumps to line E187, bypassing the Quicklink flag setup portion of the program lines E170-E185.

The program steps from E187 to E1FE are executed both by a standalone TDC or a Quicklink controlled TDC. The processor first determines if this loop of the program is being entered after the TDC has already locked onto a carrier frequency in which case the flow jumps to line E1C4 from line E197. If line E197 to E1C4 are performed instead of bypassed, the HDLC and the PIA are reset.

Starting at line E1C4 to line E1FE the TDC baud rates are established for the serial input/output (SIO). The 8K buffer is filled with data from the lowest or bottom location to top.

Once the above parameters have been established, initialization is complete, the executive routine enters the processor into a continual loop lines E201-E2D7 wherein the executive routine continuously monitors the dipswitch settings, the pilot frequency, the transponder setting and the satellite ID, to detect any alteration.

First the dipswitch settings are analyzed to determine if the system has been reconfigured from TDC to TIM, if so the initialization sequence begins again from line E001. Also if Quicklink control is now active the processor must jump back to E166 to reconfigure. The intermediate buffer is then evaluated to determine if it is full. If the buffer is full, flow jumps to line EEC4, block 1042, to process the intermediate buffer data. If not, lines E21D through E232 perform a check to determine if the COR had locked onto the appropriate satellite before the PIA had been enabled, in which the interrupt produced by the COR lock would have been missed. Therefore the FET 5AQ3 is pulled low and then released to see if it again becomes active indicating COR carrier lock.

The routine next, lines E233-E243, reads the thumbwheel frequency setting, block 1082 to detect any alteration, block 1084. If there is a change upon taking of a frequency reading and comparison with the current pilot frequency then the new reading is stored as the old pilot frequency, block 1086. After a delay of one second, block 1088, a new reading is taken, block 1090, and the comparison, block 1092 and updating, block 1086 is repeated.

The current stored pilot frequency is read until it has stabilized as indicated by a correspondence between the thumbwheel settings and the last stored frequency value, block 1092. Once the thumbwheel frequency setting is no longer being varied, the setting is compared with established frequency limits, block 1094.

Once the frequency is established it is stored as the current pilot frequency, block 1096 and compacted with the satellite ID information, block 1098 and sent out to the synthesizer, FIGS. 12A-B, block 1003.

A similar program loop, lines E23C-E243, blocks 1005-1021 is then utilized to evaluate and reset the transponder setting (the first LO synthesizer) which varies from the pilot setting which is the 50 to 90. The loop compares the current transponder value read from the front panel thumbwheel settings, block 1005 and compares it with last stored value, block 1007. The comparison is continued as long as the transponder setting is being varied. Once the setting remains stable for at least a set time period, 1 second, the value is stored in variable XPNDRFRQ, block 1019 and sent block 1021.

The satellite ID setting is interrogated for changes through operation of lines E245-E25F, blocks 1024-1037. Once a final satellite ID is determined it is stored as variable "BIRD", block 1035 and stored in compact form with the pilot frequency, block 1037, through operation of subroutine ADDRSET. Routine UNLOCK line E2A2 is utilized for data interruption processing if the transponder satellite or pilot frequency settings are altered.

The operation performed within the Executive loop portion of the program comprised of lines E000 through E305 is concluded with the subroutines from line E20A to line E305. The remainder of the program is utilized to detect, interpret and direct the processing of interrupts from the PIA, the HDLC, the UART chip or other sources. The interrupt producing sources are connected to pin 5 of the microprocessor 102.

Once an external interrupt processed by IRQ1, block 1102 line E306 is detected the processor must determine if it is operating in a TDC or TIM system environment, this is accomplished by loading the dip-switch status line E30B and E309, block 1104. The interrupt will be processed differently by a TDC or TIM system.

In the TIM system application only the HDLC and the UART chip are utilized. If the HDLC is determined to be ready to transmit a bit, i.e. active, block 1106 line E30B the HDLC buffer must be read by the microprocessor, block 1008. The buffer pointer is read line E320 to determine the starting position for reading of data from the buffer. The first byte is read from the buffer and the counter is decremented. Another byte is read and the counter is again decremented until the counter reaches zero and the buffer is empty, lines E322 through E32A, block 1110.

When the counter is equal to zero the final byte is sent to the terminate field address register, block 1112. This will indicate to the HDLC to terminate the buffer frame, and to reset the pointer and counter. The interrupt is then cleared, block 1116 to indicate to the processor that the buffer has been received. This will complete the function performed for TIM configured system, block 1118 where the system returns to the executive loop from the interrupt. This is performed by the load/store sequence of line E320-E34B.

If the interrupt was received by a TDC configured system processing begins at line E34D, the PIA chip is evaluated to determine the interrupt source. The interrupt is processed by that portion of the program beginning at line E34D identified as "RCVRIRQ" (receiver interrupt request). This portion of the program determines the current mode of the TDC. The processor can be in any of the following modes, FIND, PEAK, DEAD, SWEEP, HELP, COR, BITSUNK, FRAME, LOCK AND FRAME ERROR detected in the following blocks, respectively 1120, 1138, 1140, 1142, 1154, 1164, 1176, 1204, 1206 and 1210. Each of these modes is processed by the appropriate routine, i.e. FINDPIA PEAKPIA, DEADPIA, SWEEPPIA, HELP MODE, COR HDLC, BIT HDLC, FRAME MODE, VALID HDLC, FERRO MODE, respectively.

The mode of the TDC will indicate the next step in the proper sequence of events to be accepted by the TDC processor. The TDC must first find the satellite, then peak on the signal from the satellite, then lock onto and track the signal and then monitor the signal for the proper satellite identifier (ID). The interrupt is first evaluated to determine if the HDLC signal is valid "FIND" mode, block 1120, PEAK mode, block 1138, or a "DEAD" mode, block 1140. In the "DEAD" mode the TDC will ignore all PIA input.

The first operating mode, the "FIND" mode is initiated at line E360. In this mode the TDC seeks any carrier through the active COR as a Quicklink function for locking into the signal of any satellite. The SWEEP mode is utilized to lock onto the specific desired signal. First the sweep direction is checked to determine if it is active, block 1122. If the sweep direction indicator is not active a check is performed to determine if the COR is active, block 1124. If the sweep is active upon entry to block 1122 this indicates that the processor is already in "PEAK" mode. Once the COR is established, in "FIND" mode, the processor mode is advanced to "PEEK" mode, with the COR high the PIA DATA is loaded, line E3A2.

In "PEEK" mode the PIA is disabled and reenabled in order to determine if the TDC is still receiving the signal. If no signal exists then the mode reverts to FIND. At line E3C2 the active talker of the TDC is enabled to allow communication between the TDC and a Quicklink controller to transmit the sweep mode to the controller, this is accomplished through line E3D2 where the talker is disabled. The PEAK mode is then utilized againas a Quicklink function to enable the antenna to be peaked on the signal by monitoring of the COR strength.

The PIA 186 has two eight bit output registers one is utilized for communication with the parity generator chip 5AU10, the other is utilized to establish enable conditions for communications between various peripherals and the processor 102. The PIA also has 4 interrupt input/output pins which are configurable by the microprocessor. The COR input, pin 19, can be configured so that upon detection of the edge transition in the desired direction, CB1, pin 18 is set high or low as desired. In this manner CB2, pin 19 is configured as a trigger to detect edge transition to stop the sweep.

A second input 40 is utilized as a sweep direction input to detect changes in sweep direction and triggers a counter at each change on the triangular wave form. The final output CA2, pin 39 drives the FET to short the COR lines 14, 15 and 18 for level detection. The sweep direction is not utilized by the processor in the "FIND" mode and is, therefore, cleared, block 1126.

In "PEAK" mode the microprocessor is configured to detect a carrier. No evaluation is performed on the carrier, it is only detected to allow Quicklink to determine the peak reception of the carrier frequency. Both the "FIND" and "PEAK" modes are TDC configurations for detection of an appropriate carrier for utilization by an associated Quicklink Controller.

In the TDC "DEAD" mode, block 1140, the TDC performs no function while sweeping back and forth and ignores all signals. This mode is utilized during the transition period between satellites experienced as Quicklink is reorienting the antenna from one satellite to another. The "DEAD" mode prevents false triggering during antenna orientation changes. Once Quicklink has oriented the antenna close to the precise final orientation, the TDC is switched from "DEAD" to "FIND" mode. "PEAK" and "DEAD" modes will not normally generate an interrupt, however, the interrupt reset routine is performed to clear any possible false interrupts, lines E413-E428 which includes subroutine TDCSIO lines EDE0-EDF6.

Blocks 1132 and 1134 illustrate the checking and clearing of serial interface interrupts, blocks 1128 and 1130 for resetting the HDLC and 1124 and 1126 for resetting of the COR. If the interface buffer contains data when checked the data will be read from the buffer prior to clearing of the interrupt.

After the Quicklink has peaked on the desired signal the Quicklink controller will set the TDC into "SWEEP" mode line E42C-E48C. "SWEEP" mode is also achieved, in the absence of Quicklink, automatically upon start up of the TDC and detection of the absence of a Quicklink controller, block 1010 FIG. 14.

In "SWEEP" mode block 1142, the sweeper is activated, block 1144. At each sweep direction change the direction counter is incremented block 1146. At every 4th count of the increment, block 1148, the count is cleared, block 1150, and a signal is transmitted to the Quicklink controller if active, block 1152, initiating a "HELP" mode block 1154. The initiation of the "HELP" mode indicates to the Quicklink controller that the TDC has performed 4 sweeps and has been unable to detect the appropriate ID signal When the TDC is unable to locate the ID it is an indication that the antenna is oriented toward an incorrect satellite. Therefore, Quicklink will reorient the antenna to peak on the signal of a different satellite, block 1156. If Quicklink is not active the sweep count is ignored, and the TDC continues to search for the carrier operated relay (COR) to be active, block 1158.

The primary function of the "SWEEP" mode is to monitor the COR and detect when it becomes active. If the COR is active the Bit Sync line is checked to determine if it is also active, block 1160. If the Bit Sync is not active, block 1162, the TDC mode is set to "COR" mode, the sweep direction count is cleared and the Bit Sync Interrupt is enabled, block 1162. The enablement of the Bit Sync Interrupt will redirect the TDC to monitor the Bit Sync line and not the PIA. The PIA is therefore put in a lock mode to disable PIA interrupts and the sweep.

A time interval, 200 milliseconds line E47A, is established during which an active Bit Sync must be detected. Failure to detect the Bit Sync within the appropriate time period indicates improper baud rate or other incompatibility errors.

In COR mode, lines E48E-E4B8, block 1164, the TDC is looking for a bit sync. The HDLC status is evaluated for bit sync activity line E48E, block 1166. If the bit sync is active, block 1170, the mode is set to BIT SYNC the PIA is locked, the timer is set to 500 milliseconds, line E4AF, because a bit sunk active is a strong indication that the desired signal is locked onto and therefore a full half second is allowed for ID reception through an entire frame with zero errors. The HDLC receiver is enabled to allow the HDLC to monitor data.

The PIA is cleared, block 1172 line E4BB-E4CO, and the serial I/O is evaluated for activity block 1174, line E4C3.

If the Bit Sync is active at block 1160, flow is to block 1170 for setting the mode to "Bit Sunk". The PIA remains in lock mode and the timer is reset for the time interval allowable for ID detection. The HDLC is enabled to receive data. The PIA is again cleared, block 1172, and the serial interrupts are checked for active lines.

Once the TDC is in "Bit Sunk" mode, block 1176, lines E4C6-E4F4, the HDLC is checked to determine if it is active, block 1178. If the HDLC is active it is an indication that data is being received. The data is evaluated to determine if it has been received in the proper format by analyzing the frame of the data through a CRC frame check, block 1182. If the data is proper the TDC mode is set to "FRAME" mode, block 1184, and the buffer pointers and timer are cleared and reset, block 1186.

Once the TDC is in "FRAME" mode, or if the data was found to be invalid, the HDLC active status is reset to inactive to await further data reception, block 1188.

The TDC requires a valid frame prior to acceptance of any data to insure that only data of the proper format is processed by the TDC.

The next mode of the sweeping function of the TDC, illustrated in FIG. 15, is the "FRAME" mode, line E4F6, block 1202. Once the TDC has advanced to the "FRAME" mode, the TDC is ready to accept valid data. First the HDLC chip is evaluated to determine if it is active, block 1214. If the HDLC is not active the PIA is cleared, block 1226 and the routine is exited.

If the HDLC is active, the address bit is evaluated to determine if it is present, block 1216, indicating that the current byte is the first byte of the field. If the current byte is the address byte then the receiver buffer counter and pointer are reset to the beginning locations block 1218. The TDC then determines if the Receiver Data line is active, line E50A, block 1228 to determine if a byte follows the address. The byte is then read and stored in the buffer and the counter and pointer are incremented, block 1230, to indicate the next byte storage location.

The incremented byte location is evaluated to determine if it is greater than the maximum allotted memory location (maxrcvr), block 1234. If the location is greater than the allowed maximum, the TDC is put into "FRAME ERROR" mode, block 1236, line E52A, to indicate that a greater number of bits than acceptable were received. If the address is equal to or less than "maxrcvr" the frame valid flag is checked, block 1240, to determine if the end of the frame has been reached. The Address Present flag indicates the beginning of a frame and Frame Valid indicates the end of a frame.

If the Frame Valid flag is not set a check is made for frame errors, block 1250, and if no frame errors are detected the HDLC is cleared, block 1238. If there is a frame error then the TDC mode is reset to "FRAME ERROR", block 1252, any data is processed by subroutine Bufffull, line E524, and the satellite LOCK LED is switched off, block 1246.

A Frame Valid flag in block 1240 indicates that the buffer is full, in this event the addresses are checked for equivalence, line E54F-E570, in block 1242. The address information of the first two bytes of the frame are compared with the current front panel address. If the two addresses are equal the TDC enters LOCKED mode, block 1248, indicating that the correct satellite was found. The timeout value is reset and the front panel LED is activated. A jump is made to subroutine Bufffull, line E581, to process any data contained in the frame, and then flow jumps from line E584 to the end of the routine line E582 where the HDLC is cleared block 1238.

If the address of the frame does not equal the desired address set in the front panel, the TDC mode is set to ADDRESS ERROR, block 1244, line E586, and the timer is reset. The front panel "locked" LED is switched off block 1246. The front panel "locked" LED is switched off whenever an unrecoverable error is detected. After the LED is switched off, the HDLC interrupts are cleared, block 1238, and processing continues.

If a FRAME VALID was not detected in block 1204 and on ADRESS LOCKED, block 1206 or ADDRESS ERROR, block 1208, is detected the same flow is utilized to process these flags as was utilized to process the FRAME VALID flag.

The last flag evaluated in the sweeping flag-evaluation-sequence is the FRAME ERROR flag, block 1210. If the frmae error flag also indicates "no" then the TDC reinitializes because the interrupt is not processable, block 1212.

If the FRAME ERROR mode is set the the HDLC is checked for activity, block 1220. If the HDLC is not active the PIA is cleared, block 1226. If the HDLC is active, the frame validity is evaluated, block 1222, if the frame is not valid the HDLC is reset, block 1238. If the frame is valid the mode is reset to ADDRESS ERROR, block 1224. The flow will then go back through the check mode routine entered as indicated in block 1232.

The microprocessor 102 has an onboard timer and UART. The UART is utilized for communication with the first LO board which accepts a serial UART configured data stream, and communicates with Quicklink via the 422 port. Program lines indicating 422 serial communications are applicable only when the TDC is under the control of an external Quicklink Controller, as are the ACTALKER program lines. The timer is utilized for measurement of set time intervals for the detection of various parameters.

Figure 16A:
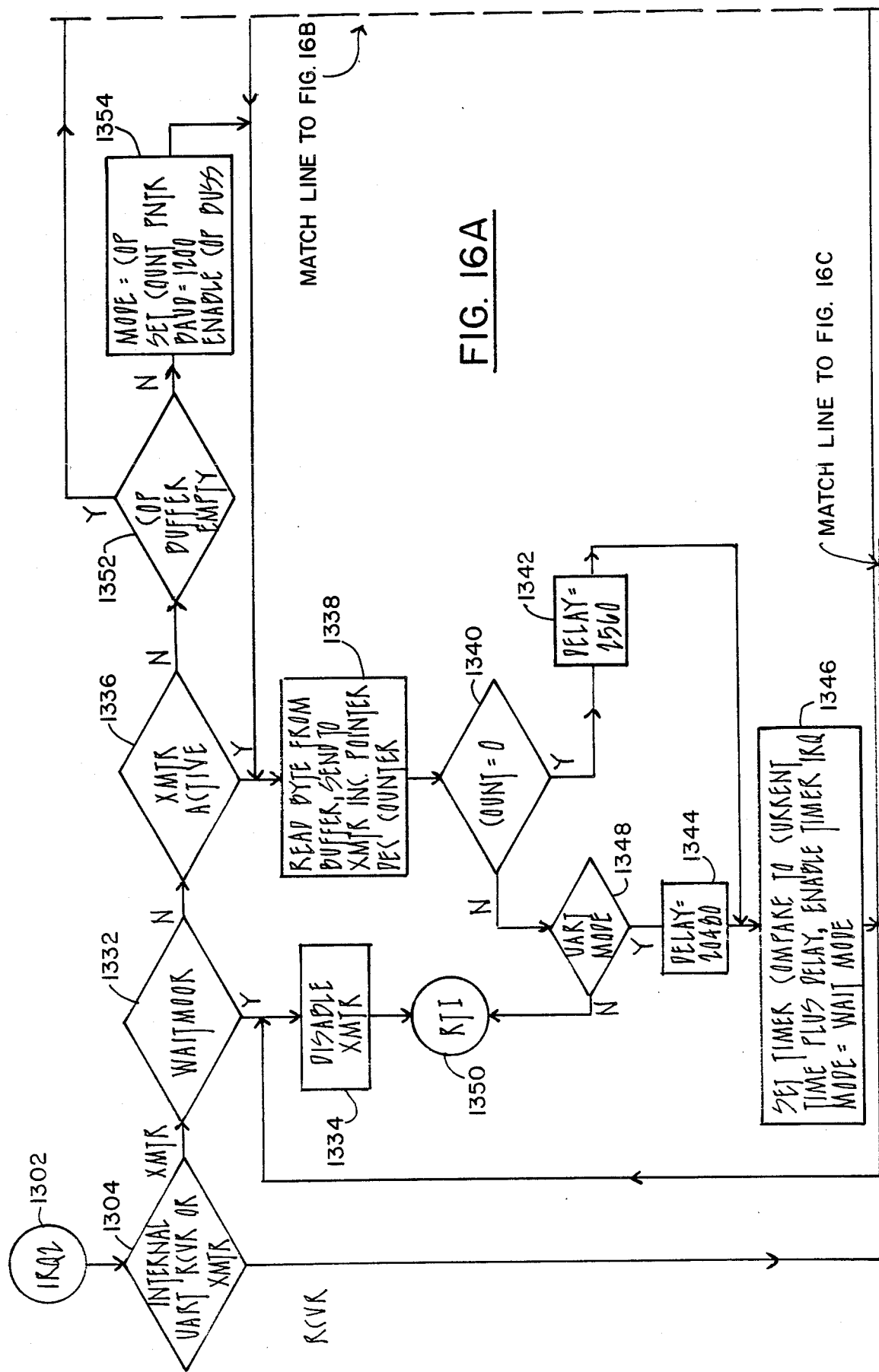
FIGS. 16A-C are a logical flow diagram utilized for processing of internal interrupts.
Figure 16B:
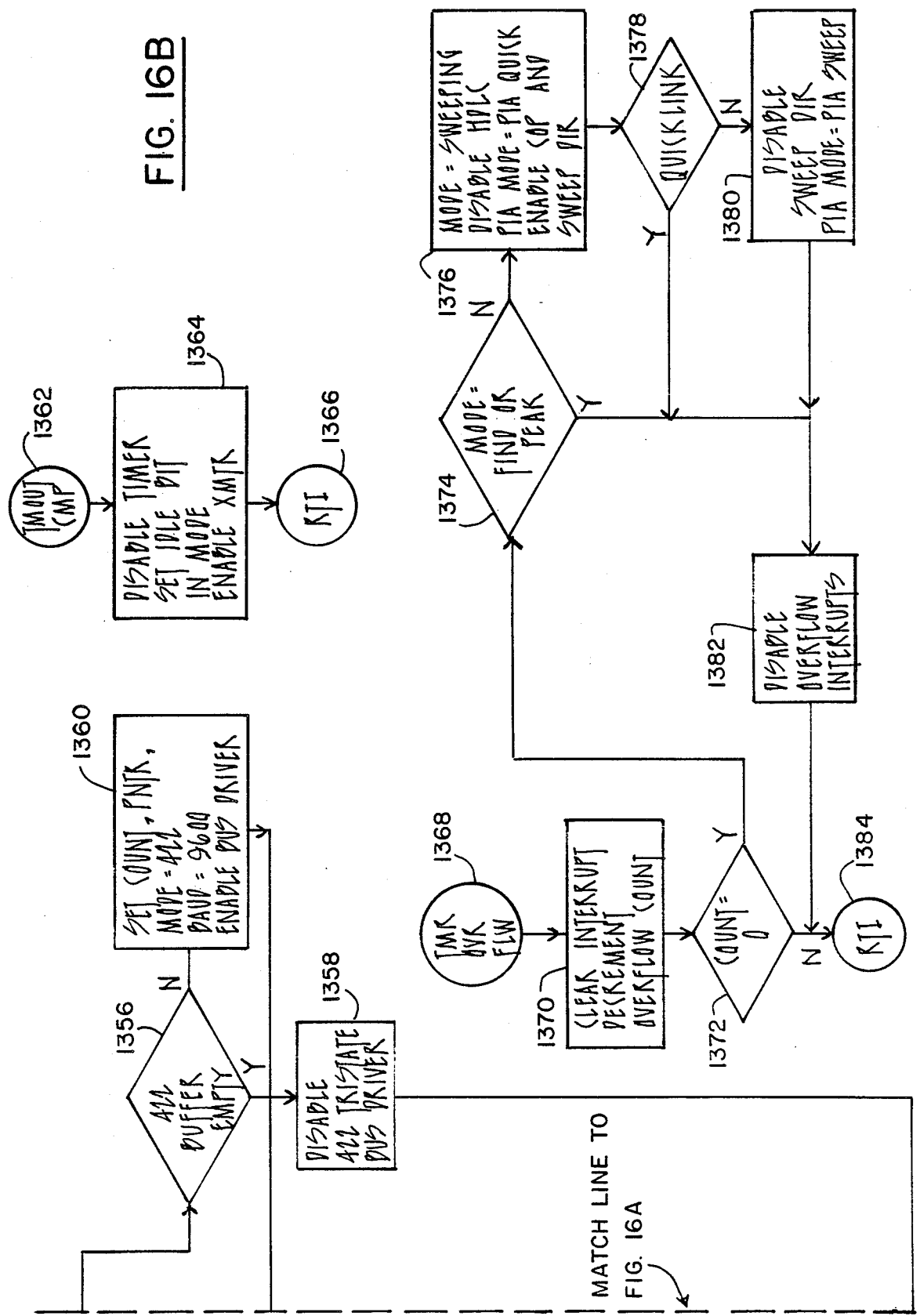
Figure 16C:
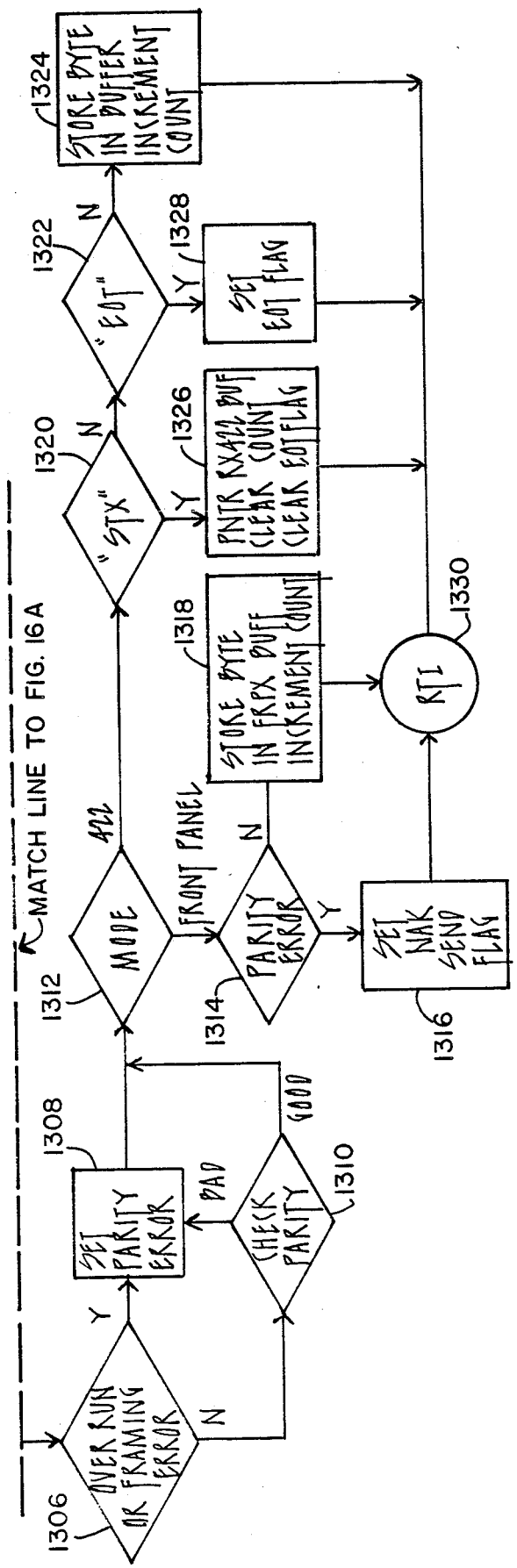

IRQ2 illustrated in FIG. 16 as block 1302 is a processor internal interrupt. The purpose is to control the internal UART operations to the COP bus and RS422 bus. If a bus is to transmit data, the appropriate buffer is filled with the string desired, the string length is set and the transmit enable is set. An interrupt is then generated to send a byte. Bus priority is determined by the buffer counts. The 422 has higher priority than the COP bus. Typically the 422 RCVR is enabled and the XMTR is idled until needed. The COP count is checked for data and sent if any, when XMITCNTR is not=0, the first byte is transmitted and the count decremented. Upon reaching zero, the UART mode is set to serialization wait, the XMTR disabled and the internal timer is set for 2 byte XMIT times. At TIMEOUT, the timer is disabled, mode is set to idle and the XMTR is enabled which causes a priority check again.

When an interrupt at the IRQ2 level is encountered, the processor must first determine if the UART transmitter or receiver interrupts are active, to determine if the TDC is in transmitter or receiver mode, lines E5C-2-E5C8, block 1304. The receiver mode is only utilized when the TDC is in direct interaction with a Quicklink controller. As explained earlier in this application the Quicklink controller and its associated software within the TDC is the subject of a separate application, however, the programming as developed is integrated into a single software program within the TDC. Program lines E755-E83D equivalent to blocks 1306 through 1330 of FIG. 16 are included to fully illustrate the logic of the TDC software but are not detailed herein because they pertain to the subject matter of a separate Quicklink controller application.

If the transmitter is active it indicates that the UART is in communication with Quicklink or to the first LO synthesizer board. The processor then determines if it is in a WAIT mode, block 1332, indicating that the processor must wait for the stop bit to time out. If the processor is in a WAIT mode the transmitter flag is disabled, line E5EF, block 1334, and the routine is exited, block 1350, until the stop bit has timed out at which time a new IRQ2 is detected.

There are five possible modes of operation for the system when an IRQ2 is detected. The modes are: MODE422, COPMODE, IDLE422, COP WAIT and WAIT422. MODE422 is for transmittal of 422 data to Quicklink. COPMODE is for transmittal of COP data for TDC configured system. IDLE422 is for 422 processing COPWAIT and WAIT422 are utilized when waiting for COP stop bit data or 422 stop bit data respectively.

If the WAIT mode is not enabled then the transmitter is evaluated for activity block 1336. If the transmitter is active then the bytes are read from the buffer and directed to the transmitter while incrementing the buffer pointer and decrementing the byte counter, line E62D—E641, block 1338, until the count reaches zero, block 1340. If the count does not reach zero when the buffer is emptied and the TDC is not in UART mode, block 1348, then the routine is exited by a return, block 1350.

If the count equals zero in block 1340 or the mode is not UART block 1348 then a delay is set in either block 1342 or 1344 appropriately to determine if the TDC is in 422 mode. A delay of 2560 or 20480 is established as a waiting period for extention of the final stop bit. The timer is read and the offset of 2560 or 20480 is added and stored. When the actual timer value reaches the stored value in the compare register a flag is set to generate an interrupt. The interrupt is processed by the routine illustrated as block 1362-1366 in FIG. 16.

In block 1364 the timer is disabled, the TDC mode is reset to either 422 IDLE or to COP OUTPUT mode is the TDC is operating in 232 mode.

If the transmitter is inactive at block 1336 it indicates that a buffer is not currently being transmitted and therefore needs to be established. The COP buffer is therefore evaluated to determine if it is empty, block 1352. The COP buffer is associated with the UARTS resident on the first synthesizer board. COP is the manufacturer's name for the series of processors utilized in the preferred embodiment as identified above. The COP buffer if established in the executive routine as desired, will not be empty when evaluated in block 1352.

The TDC mode is therefore set to "COP" mode, the count is set to the number designated in the executive routine e.g. 7 or 8 bytes. The stack pointer is restored, the baud rate is established at 1200 and the COP output Bus pin is enabled, lines E642-E66D, block 1354. Flow then continues through block 1338 as described above.

If the COP buffer is empty the 422 buffer is evaluated, block 1356 to determine if it is also empty. If both buffers are empty the 422 tristate buss driver is disabled, block 1358 the transmitter is disabled, block 1334 and the routine is terminated block 1350.

If the COP buffer is empty and the 422 buffer is not, then the count and pointer are set and the TDC enters "422" Mode block 1360. The baud rate is set to 9,600 and the output driver on the 422 bus is enabled. Flow proceeds through block 1338 as described above.

The routine logically illustrated as blocks 1368 through 1384 program lines E695-E754 is utilized to process timed operations from the IRQ routine in which the desired condition was not detected within the allotted time frame. The timer overflow routine begins at block 1368 when an operation exceeds the allotted time. First the interrupt is cleared and the overflow count is decremented, block 1370. The overflow count is a number established to indicate the number of times the overflow interrupt must be triggered before the timer overflow routine is executed fully. The counter is then evaluated block 1372 and if it is not equal to zero yet, the routine is exited block 1384. The routine will be reentered if within the allotted time from the desired parameter is again not detected.

Once the overflow counter is equal to zero indicating that the parameter was not detected within the allotted number of allotted time frames, the TDC mode must be determined, block 1374. If the mode is "FIND" or "PEAK" then the overflow interrupt is disabled, block 1382 and the routine is exited block 1384.

If the mode is not PEAK or FIND then the mode is set to "SWEEP" and the HDLC is disabled. The COR and sweep directions are enabled and the PIA is set to PIAQUICK mode, block 1376. A determination is then made to determine if the TDC is being controlled by a Quicklink, block 1378, if it is then the interrupts are disabled block 1382 and the routine exited If the TDC is not Quicklink controlled the sweep direction counter is disabled and the PIA is set to "PIASWEEP" mode, block 1380.

The portion of the program in lines E6E8–E712 is utilized for communication parameter monitoring.

The portion of the program lines E715–E730 is utilized to generate breaks for data in order to pull the CIM break line low to allow a pause for reinitialization. An idle condition is forced after each break through operation of lines E732–E745.

Figure 17A:
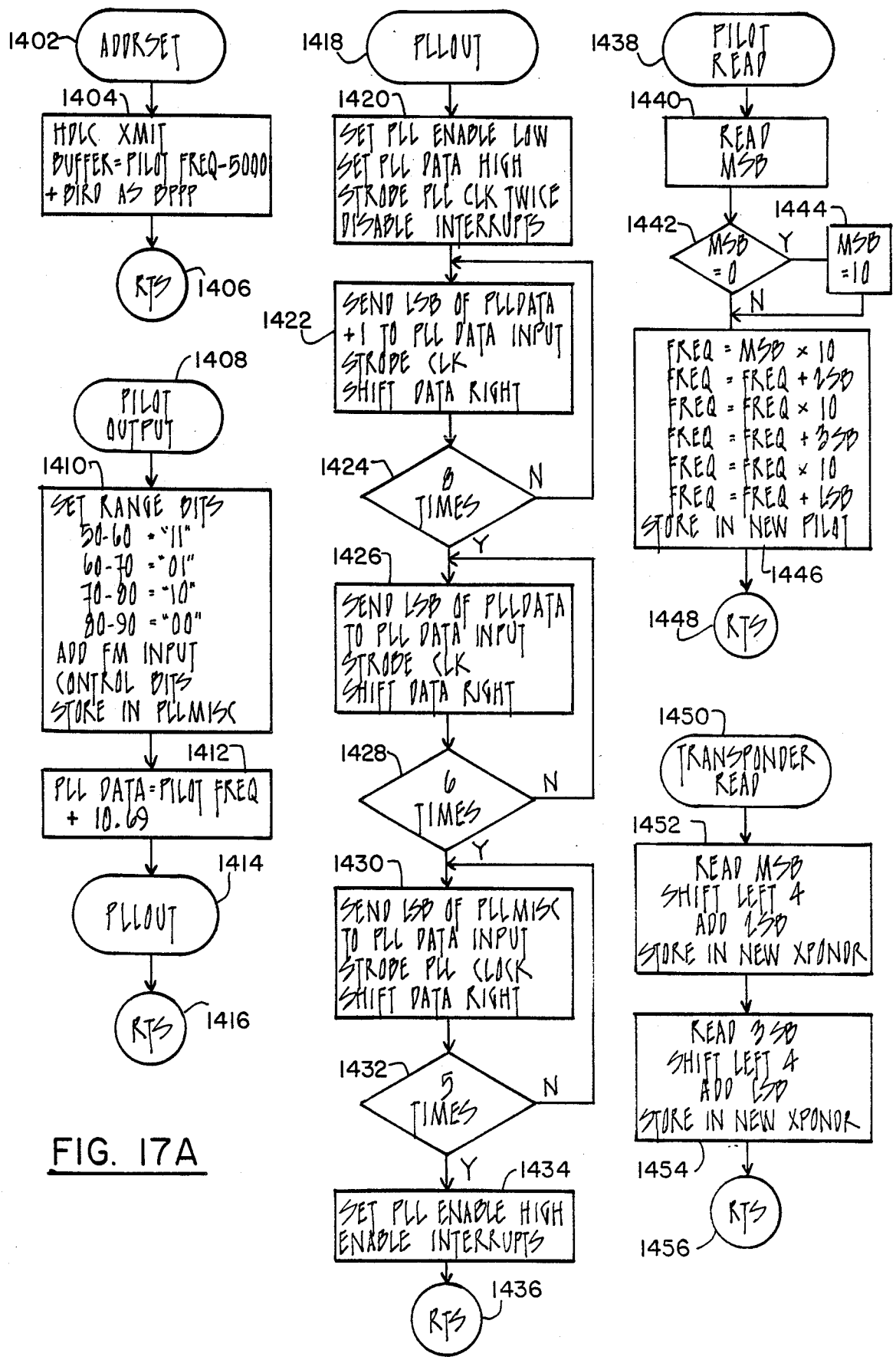
FIGS. 17A-B are a series of logical flow diagrams of various subroutines of the microprocessor control program.
Figure 17B:
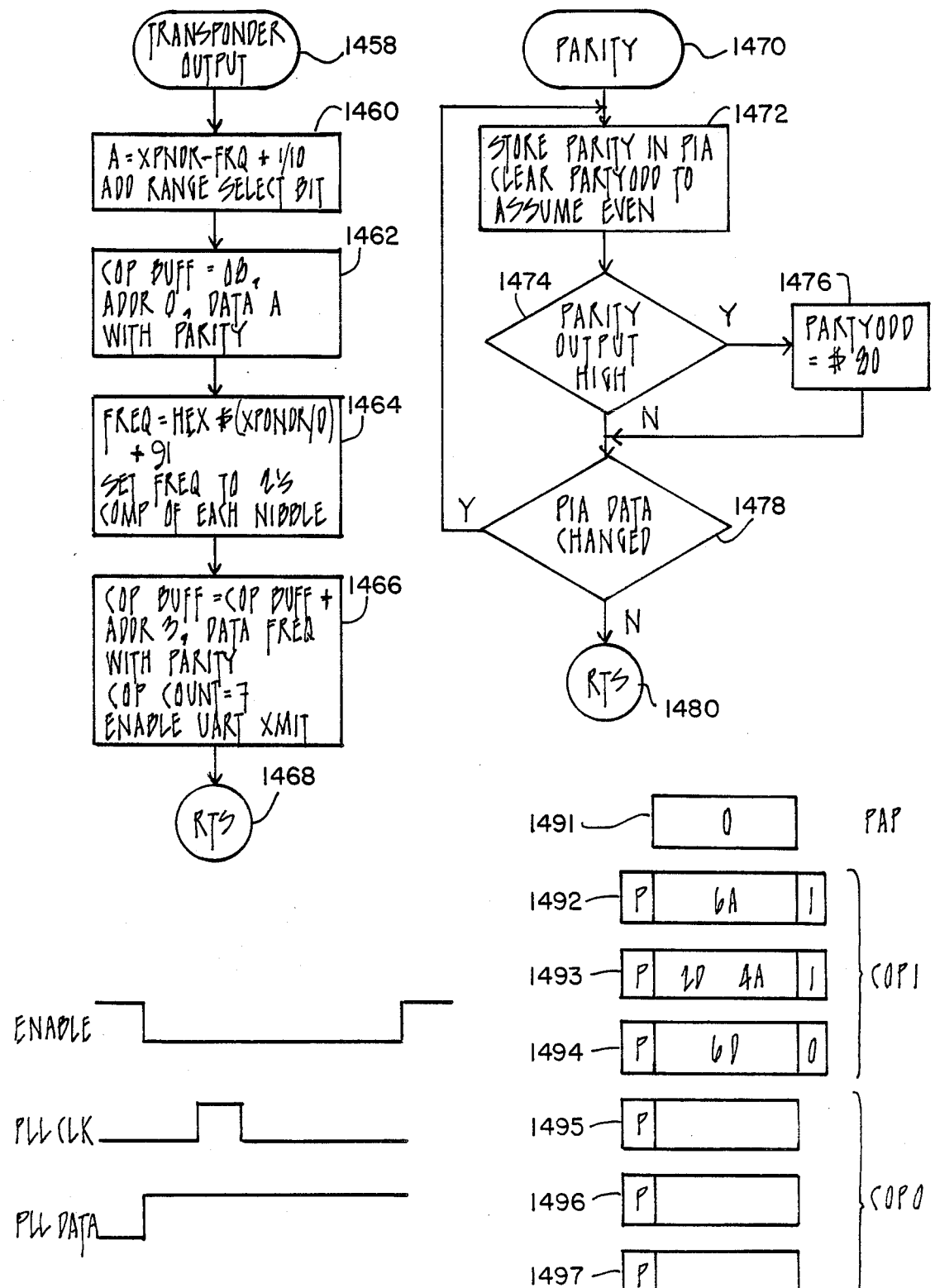

FIG. 17 logically illustrates a number of the subroutines of the TDC/TIM processor program found at various locations throughout the program. ADDRSET, block 1402, lines E2F4–E304, takes the 4 digit pilot frequency between 50 MHz and 90 MHz and converts it from BCD to a hexidecimal binary number between 5,000 and 9,000. Then 5,000 is subtracted from the number to produce a number between 0 to 4,000. This allows the address to fit within 12 bits block 1404. The satellite ID, occupies the next 4 bits in hexidecimal. The entire address is compacted into two 8 bit bytes, the first 4 bits designate the satellite ID and the last 12 bits are occupied by the pilot frequency.

The Pilot output routine, block 1408, lines E84C–E87B, processes the pilot frequency information prior to its transmittal to the synthesizer board. This routine crunches the desired frequency into the divide code. The desired code is read from RAM variable "FREQ". The AFC attenuator is then determined by checking the range of the FREQ. Then 10.7 MHz is added to the desired frequency to give the LO frequency. The number is then sent to the PLL chip. The frequency input is assumed valid upon receipt within this rountine. PILOT OUT controls the four banks of bandpass filters identified in FIG. 8A as 364, 366, 368 and 370. Two bits from the synthesizer are utilized to select the filter bank to be utilized, block 1410.

The IF offset (10.69 MHz) is added to the desired pilot frequency, block 1412, to arrive at the PLLDATA value for the synthesizer. The PLLOUT routine is then utilized to transmit the data to the synthsizer, block 1414, and then the routine is ended block 1416.

The PLLOUT routine, block 1418, lines E8B6–E8FC, first sets the PLL enable line low and sets the PLL data line from the PIA high, block 1420. The PLL clock line is then strobed twice. The chip 102 accepts the strobes then the data followed by extra closing bits. The initial two bits indicate the address of the synthesizer chip. The enable line is then pulled high.

The least significant bit of the pilot frequency is sent first, block 1422. The data is set and the clock strobed this process is repeated eight times, block 1424, thereby transmitting the first byte. Blocks 1426 and 1428 transmit the next 6 bits of PLL Data, one bit at a time, to the PLL Data input by strobing the PLL clock between each bit. Thereby a 14 bit number representative of the pilot frequency and PLL data is transmitted out to the PLL board.

Five more bits are sent to the PLL board to indicate AM or FM mode, the reference frequency, and selection of 50, 60, 70 or 80 MHz band. These sync bits are sent through operation of blocks 1430 and 1432. Once all the data bits have been clocked out the PLL enable line is set high, block 1434 and the routine is exited block 1436.

Pilot Read routine, block 1438, lines E876–E8B5, is utilized to read the pilot frequency settings of the TDC front panel thumbwheel switches. The Most Significant Bit (MSB) is read, block 1440 and evaluated block 1442.

If the most significant bit (MSB) is equal to 0, it is set equal to 10, block 1444. This conversion will allow pilot frequencies in the 100 MHz region of the frequency band. To obtain the final frequency a several step calculation, block 1446, is performed where variable "FREQ" is first set equal to ten times the MSB. The second significant bit (2SB) is then added to FREQ and the total is multiplied by ten. The 3SB is then added and the sum is again multiplied by ten. The least significant bit (LSB) is then added to FREQ and the total value is stored in NEWPILOT. In this way the 4 BCD digits are converted into a binary number representative of the pilot frequency. The program then exits, block 1448.

The Routine TRANSPONDER READ, block 1450, lines E91C–E93A, reads the transponder thumbwheel switch setting value stored as binary coded decimal. Therefore the most significant digit stored as a 4 bit nibble is read, the read pointer is shifted and the next 4 bits representing the second significant digit are read, block 1452. This byte is then stored in "NEWTRANSPONDER", then the pointer is shifted and the next 4 bits defining the third significant digit are read and the pointer is shifted again, block 1454. The least significant digit is read and the third significant and least significant digits are stored in the second byte of "NEWTRANSPONDER".

The Routine TRANSPONDER OUTPUT, block 1458, lines E93B–E9BF, sends the transponder data as two separate digits. This routine formats the transponder frequency and sends the data to the synthesizers thru the COP bus. The formatting process generates 3 digits: A, M and N. A is the inverted modulo 10 remainder of the frequency, M and N are the individual 2's complements of the binary representation of the frequency +600 +31. The 600 is the first IF and the 31 is a calibration factor of the synthesizer. The three digits and range select are sent as two bytes with the first bit skipped over for SK output transitions on the COPs.

The "A" digit represents the lower 4 bits of the transponder frequency in BCD divided by ten, which shifts the bits 4 places left. The high or low band VCO is selected by designation of the next bit, block 1460. The least significant digit and Range Select are assembled as the first byte and sent to the appropriate COP, in the format illustrated in block 1462.

The remainder of the transponder frequency, the upper 3 digits, are divided by ten to alter the position of the binary code and then ninety-one is added to this value to satisfy the LO parameters, block 1464. Then FREQ is set equal to the two's complement of each nibble.

The COPBUFF is then filled in the proper format so that the data is in the proper locations, block 1466. Parity is generated between the first byte which is address, the second byte which is two data bits and four address, and the final byte is six data bits. The routine then exits at block 1468, once the necessary seven bytes are clocked out to the COP. The seven bytes are illustrated as data streams 1491–1497.

The routine Parity, block 1470, lines E9C0–E9DB, is utilized to generate the parity for the data bits of the Transponder Output. The byte in RAM variable "PARITY" is sent to port A of the PIA. The LSB of port B is then tested for even or odd parity and "PARTYODD" is set or reset accordingly. The port A data is then compared with the original data to insure that no interrupts have changed the data before reading. A parity generator is necessary on the output of the PIA, a nine bit parity tree is utilized in the present invention. The data word for which parity is to be generated is stored in the PIA, and a flag is cleared to assume even parity, block 1472. The output is then evaluated, block 1474, and if the output line is high the parity-odd flag is set, block 1476. If the output line is not high the parity remains even and the PIA data is rechecked for changes, block 1478. If the data has remained unchanged, indicating no replacing reception by the PIA, it is ready for transmission by routine Transponder Output.

Subroutine DELAY, program lines E83E-E84B, is utilized to provide programmable delays in one millisecond increments, up to a maximum of 65 seconds time. The desired wait time will be passed in delay 1, a one millisecond loop will then be initiated which decrements the delay count down to zero. The program then returns. This program produces the desired delay time based on a 4.9152 MHz XTAL.

The MULTIPLY routine, lines E8FD-E91B, is utilized to multiply an 8 bit number which is equal in the present embodiment to the decimal value 10, by a 16 bit number which represents the pilot frequency. The product is then stored in the Y register.

The TIM serial input/out interrupt routine is comprised of lines E9DC-EC50 found on pages 35-42 of the microfishe appendix. This routine is where all the host information is received into the TIM system. This program sets up the information to be transferred by the TIM/TDC interaction over the carrier frequency. This information can also be used if set up with the appropriate flag pointers to establish certain desired baud rates and/or reception parameters within the TDC system through establishing the proper signals within the TIM system. These signals can be generated through an exterior CIM system or any other means which will link to the input of the TIM to establish the proper data signals to be transferred over the carrier and received by the TDC.

None of the information established in the TIM by the operation of this routine is utilized by the Quicklink or for control of the Quicklink.

As an overview description of this TIM serial IO routine, a read receive flag RDRF will read the byte and place it in big buff via the write pointer. The pointer is then decremented and compared with the start of the buffer and if at the start of the buffer, the pointer is reset to the end of the buffer. If only 16 bytes remain open in the buffer, then the count sent to the host is turned off. If autoecho is not turned on, an XOFF character is also sent to provide proper reception protocal for modems or other communication devices.

The TDC parameters are remotely controlled by pulling the DSR input pin to ground and sending a set of data strings illustrated on pages 35 and 36 of the microfishe appendix. The strings are processed on input and packed into four bytes. The first byte contains the parity, length and stop bit information. The second byte designates the baud rate. The next two bytes are the number of timer overflow cycles desired in order to hold the serial input/output phase at a break or idle mode. To distinguish the control information a two-byte flag, first byte "00", second byte "01" and the four bytes are inserted into big buff. The TDC is seeking a "00" byte to appear. Since the "00" is a valid character indicative of external information, any incoming "00" are proceeded by an "FF" which is extracted by the TDC.

All commands in this routine require that the exact syntax is used. Commands may be linked one after another without carriage return line feeds. The external command is required to transfer the data to big buff. The abort command may be used by the host to cancel any current activity since the DSR is pulled low if the autoecho indicates read error. Upon completion of the data transfer the DSR output is released. Once all data parameters have been initialized, only changes in those parameters are sent.

Line E9DC, once the serial IO is generated in interrupt the status must be determined. The DSR status is checked to determine if the TIM is CIM controlled. The byte that has come in on the serial interrupt is read and the write pointer is loaded to determine where in the buffer to place this byte, then the byte is stuffed in big buff, line E9EC. The pointers are then decremented until each reaches the bottom of the buffer at which time each is redirected to the top of the buffer. For all incoming "00" bits received, an IF is stored in the buffer.

Lines E9FA-EA00, the write pointer and read pointer are continually compared to determine if the buffer is being filled faster than the information can be transmitted out from it. If the write pointer is within 16 bytes of the read pointer, line EA0E, then writing is discontinued until the read pointer can read out a sufficient quantity of the buffer to allow writing to begin without overwriting information not yet transferred from the buffer. The desired byte is then, when appropriate, sent out over the transmitter via the TIM. The routine is then exited with the return at line EA2F.

If the status register has data in it that was not related to the receiver register, then lines EA30-EA38 are utilized to clear the interrupts and thereby ignore the data in the buffer. Lines EA3A-EC50 are for processing of CIM inputs to a TIM system. These inputs are not part of the subject matter of the present application and are therefore not discussed in detail.

Routine BUFF EMPTY, program lines EC56-EC6C, is utilized to transfer the data in the NEW BUFF to the HDLC transmit buffer, and then to clear the buffer flag. SMALL BUFF stores the information from the HDLC buffer plus two bytes at the end, thereby eliminating the first two bytes of the HDLC buffer which is the address information. Once the transfer is complete the BUFF FLAG cleared, line EC67, the stack point of location is restored and logical flow returns to the executive routine. The executive routine will therefore, upon checking of the buff flag, determine that the buffer has been emptied into the HDLC transmit buffer and can now store information into the buffer.

The next routine, STUFFBUFF, comprising lines EC6D-EDDF, is utilized to compact information into minimal buffer space as above described. The data from stuffbuff is transmitted as a 32 byte frame. Each frame consists of 24 bytes of data and 6 bytes error correction codes. If less than 23 bytes are left the array is packed with "00" codes. The data is packed as follows: first, two bytes of address followed by 23 bytes of user data, followed by one byte of buffer length indicating how much user data has been sent, followed by 6 bytes of error correction coding and two bytes of CRC (cyclic redundancy check).

The first two bytes contain the TDC identification code which is the RF frequency minus 5000 plus the bird select ID in the most significant digit. The two CRC words are appended automatically by the HDLC chip upon the close of a frame. These CRCs are checked by the TDC for detection of valid frames. The six error correction code bytes are generated from a modified Hamming code using typical memory procedures. The 24 bits comprised of data and the buff length are considered as a 24 bit × 8 bit array with a 6 bit × 8 bit array of check words generated on each 24 bit block. This block is then regenerated in the TDC if the CRC indicated error. A syndrome within the TDC points to the bits in error.

The routine is a standard check bit generation routine to generate check bits and check words for the 24 data bytes within the 32 byte message. On the TDC side the entire routine is performed again to add the check bits to determine transmission bit errors. STUFFBUFF loads data from the 8K buffer (BIG BUFF) into the intermediate buffer. Only 23 bytes of data are read at a time into the intermediate buffer, line EC80.

The clear to send line is checked, program line EC88. And the auto echo is interrogated, line EC8F.

The routine identified as TDC serial input/output (SIO) interrupt routine, comprising program lines EDE0-EE8E is utilized by the TDC to read data from BIG BUFF for output to the appropriate external UART. First the transmit-data-request-empty (TDRE) will request a read from BIG BUFF. The read pointer is then incremented and compared to the end of the buffer and to the write pointer. If the read pointer indicates the end of the buffer, then the read pointer is reset to the start of the buffer for looping. If the read pointer is equal to the write pointer it indicates that the buffer has been emptied. The transponder-data-read-empty (TDRE) interrupt is therefore disabled until more data is written to the buffer through the HDLC transmit routines. If a received-data-register-full (RDRF) is detected, the received data flag is cleared and the receiver is disabled. The received data flag is utilized to prevent bad data fields from being transferred to BIG BUFF.

A "00" byte in the data stream is utilized as a flag to distinguish between user data and internal control information such as baud rate changes, forced breaks, etc. If the next byte after the flag is a "FF", then the "00" was a user byte. The "FF" is perged and the "00" is sent to the serial input/output. If the second byte is a "01", then the next six bytes are considered internal information. The first byte is the mode register 1 information relating to data length, parity and stop bits. The second byte is for mode register 2 and contains the baud rate information. The next two bytes are the amount of time needed to force a break. The last two bytes indicate the amount of time needed to set an idle condition.

The routine begins EDE0 upon receipt of a serial intput/ouput interrupt at which time the status is read. The status will indicate whether the transmit buffer is empty or full. If the transmit buffer is empty, then the baud rate is checked for changes. The transmitter from the TDC system out to Quicklink or any other external device is disabled during baud rate changes. Assuming no changes were indicated, the read pointer is read, line EE06, in order to allow data to be read from BIG BUFF. The read pointer is then compared to the write pointer, line EE09 to determine if the buffer is empty. The data is checked for "00's" and then processed accordingly as described above.

At line EE7A the portion of the routine identified as SIOSEND is utilized to send the information out of the TDC into the external UART for the desired data utilization.

The short routine of lines EE85-EE8E is utilized to increment the buffer pointer and to detect if the buffer pointer is located at the end of the buffer. By detecting the buffer pointer at the end of the buffer, proper wrap-around to the top of the buffer can be accomplished.

Routine BUFFFULL program lines EE8F-EEC2, is utilized to transfer the received data from the HDLC buffer to the intermediate buffer variable named NEW-BUFF. Once the data is taken from the HDLC receive buffer and sent to the intermediate buffer, a flag is set for detection within the executive loop to indicate to the microprocessor that it should process errors and data in the 8K buffer, (BIG BUFF).

A test is first made, line EE8F, to determine if the data has been identified as valid by the setting of a locked condition as described earlier. If this data was not received during a locked condition, then it cannot be valid and is therefore ignored. The COR is then checked to see if it is active to be sure that the data was received while the COR signal was being received. If not, the data is ignored again. If these parameters check out, the data is then processed on the assumption that the data was received under valid conditions.

The final routine of the program listing, routine CORRECT comprising lines EEC3-F0E4 is the routine utilized for error correction of the 24 data bytes described earlier in the data message received from the TIM on the carrier frequency via the satellite connection. The six check words which were generated in the TIM using a modifed Hamming code and standard computer memory algorithm are regenerated in the TDC and are analyzed by the CORRECT routine.

The check words when regenerated in the TDC form six 8 bit syndromes. These six syndrome bytes are repolarized to form eight 6 bit words. Each syndrome points to an array to define one of the 24 bits that may be in error. If the syndrome is zero, then no errors exist. Eight syndromes are formed which are capable of correcting 8 bits of data in the field, one from each column. If two bits within the same column are wrong, the syndrome can only flag a double bit error and no correction is possible.

A test is made, line EEC6, to determine if the CRC is good indicating a valid frame. If the CRC check generated by the HDLC indicates that there were no errors in the frame then operation of the CORRECT routine is not necessary. Therefore, the jump is made to line EFE3 to transfer the data to BIF BUFF. If the CRC check indicated that there were errors, then flow is from line EEC9 bypassing line EECB to line EECE to begin the data fix operation. To generate check bit one, or check word one, the appropriate bytes are loaded as illustrated in lines EECE-EEEB for check word two, three, four, five and six, the appropriate bytes to be loaded are listed in the respective program lines. After the forming of each check word, the corresponding syndrome is generated and is then evaluated for any syndromes which are not equal to zero.

If all of the syndromes for all the check words are equal to zero, none of the data needs to be reevaluated or corrected for errors. In this case, the CRC check which indicated a bad field is presumed to have indicated that the bad field was not within the data area but was in the address or some other area of the 32 byte transmission.

If any of the syndromes came up not equal to zero, then the buff flag will be set to non-zero in which case a test of the buff flag at line EFDE will cause a jump to line F04B to fix the data. If not, the information is moved into the buffer through operation of lines EFE-3–F04A. If there was an error detected in the data, then the check words need to be repolarized for proper syndrome evaluation. This is done in lines F052–F06A. The bits are then analyzed and if uncorrectable the uncorrectable error LED is activated, line F08D and the locked LED is turned off, line F0A3. Otherwise, the appropriate bits are corrected by flipping the errored bit and the appropriate checkbit utilizing standard bit correction techniques in the Hamming checkbit format. The operation of lines EFF7–F007 prevent erroneous data from being transferred out by disabling the DTR output by switching the DCD output off. Any desired character can be inserted at this point to indicate an erroneous frame.

The program listing in the microfiche appendix identified as TAPS controller is resident in each of the COPs 12BU26 and 12BU25 of FIG. 12A, of the first LO synthesizer to enable to the first LO synthesizer to simulate an addressable UART. The chip through utilization of this program is able to software simulate a UART input as an RS232 data stream. Ten pins are utilized for chip address and eight pins are utilized for the output, to provide 1024 addressable chip locations, with 8 output lines for each chip. The COPs is first initialized for all channels that are enabled. The serial data is then processed to simulate an UART. The data stream is comprised of three bytes illustrated on page 1 of the microfiche appendix. The first byte is the chip address comprised of a stream of 11 bits. The second is the remaining address bits and any of the first data bits. The last byte is comprised of the remaining data.

Byte 1, as illustrated on page 1 of the microfiche appendix, is comprised of 11 bits. As shown the first bit is a start bit; the second bit is a byte flag "1"; the next six bits are address bits; the next bit is a parity bit followed by two stop bits. The second byte, as illustrated on page 1 of the microfiche appendix, begins with a start bit followed by a bit flag "1", followed by four address bits and two data bits, followed by a parity bit and two stop bits. The third byte begins with a start bit, followed by a bit flag "0" indicating data, which is followed by six data bits, one parity bit and two stop bits.

When the main TIM or TDC system initially boots up it must determine the address of the simulated UART and store it in a buffer. The bit identified as L0 is the least significant bit of the address and the bit identified as L7 is the most significant bit of the address. The bit identified as S0 is the least significant bit of the data and the bit identified as G1 is the most significant bit of the data. If the address and the parity are correct the data is latched to the outputs. Should the address or parity or address stream have errors, the data is ignored. The data stream is standard RS232C UART compatible, ad therefore is comprised of one start bit, a bit flag (high for address, low for data), odd parity and two stop bits. The second stop is ignored to allow processing time after the byte is received.

Within the simulated UART the baud rate can be varied from the onboard timer. In the preferred embodiment described herein the baud rate is set to 1200 bits per second. The clock rate is based on the internal 480 KHz divided by 8 to yield a 60 KHz rate. At 1200 baud this clock rate yields 50 cycles per bit.

The RAM memory map, illustrated at the bottom of page 1 of the microfiche, designates which pins of the chip are address, data, inputs or outputs. The actual address information is determined by the combining of pins in appropriate sequences as shown in the first ten lines on page 2 of the appendix program listing. This information is stored in RAM.

The portion of the routine identified as INIT down to that portion identified as RESTART is utilized for establishing the address bits of the bytes to be transmitted.

At the line identified as RESTART the processor bit counter is cleared to allow for the first incoming byte to be received. The next portion of the routine identified as RDBYTE continues to clear nibbles, parity counters and byte flags to set the proper conditions for receipt of information. At the end of each reception, flow is directed back to RESTART and RDBYTE to reestablish the necessary parameters for reception of the next stream of information.

The line identified as T0 establishes a condition in the processor where it waits for the received data line (RXD) to go high. The received data line high indicates an idle condition where no information is present on the simulated addressable UART lines. Therefore once the line has gone high the processor then, line T1, waits for the RXD line to go low indicating an information stream is present. Once the RXD line has gone low the microprocessor is instructed to wait for half a bit cycle before beginning to read, thereby the processor will begin the read sequence in the middle of a bit reception.

That portion of the program identified as LOOP1 is a loop for the processor to avoid false starting of reading of an information stream. The first bit which should be a start bit is analyzed and if this analysis indicates that the received data RXD line is high, this is an indication of false start and the processor should try again to read the first bit of the stream. Therefore a delay of one bit cycle is performed to position the processor to read during the center of the second bit. If the received data RXD line is again high, the loop is again performed and a one bit cycle wait is performed.

Once the received data line is low during receipt of the first bit this indicates that a start bit has been received. At the beginning of page 3 of the microfiche appendix the loop counter is set for 9 bits thereby ignoring the last stop bit. The 9 bits will encompass the byte flag of each byte, i.e. byte 1, byte 2 or byte 3, through the first stop bit of the same byte. The portion of the program identified LOOP3 is utilized by the processor to receive and store each bit of the byte being received.

After receipt of the start byte a wait of 1 bit time is performed to position theprocessor receiver of the center of the byte flag of the appropriate byte being received. A jump is performed in the middle of LOOP3 portion of the program to that portion of the program identified by the appropriate bit number found on page 3 for proper manipulation of the particular bit being received. This portion of the program for bit manipulation is identified as BIT0, BIT1, BIT2, BIT3, BIT4, BIT5, BIT6, BIT7 and BIT8. From these manipulation routines a jump is made back up to the parity portion of the program found on page 3 of the microfiche appendix. Once flow has returned from the bit manipulation routine and the parity has been added when appropriate the loop counter is incremented, and the next bit read and processed.

A determination is then made as to the byte count number indicating whether or not byte 1, byte 2 or byte 3 is currently being processed. The appropriate action as shown by the processing steps which follow the lines identified as either BYTE1, BYTE2 or BYTE3 is then performed. If the byte counter indicates that the presently processed byte is BYTE1 then the byte address flag is checked to make sure that the byte flag (bit 2) is high. If the byte flag indicates low a restart is performed by jumping back to the line identified as RESTART on page 2. This RESTART is performed in circumstances where the first byte was missed and therefore the byte transmitted as BYTE2 or BYTE3 is processed first which would lead to erroneous data processing. Therefore, the simulated UART must await a retransmittal of BYTE1 as the first byte so that the byte counter setting will agree with the byte being processed.

If the address byte flag was high, flow continues to line indicated as DOBYTE1 for processing of the present byte which so far indicates that it is the first byte. At this point in the program, the value stored as NIB1 as the looping sequence is compared to L0-L3 to verify the address. If these values are equal then NIB2 is evaluated, if not, a jump to restart is performed because the byte counter is not synchronized with the actual byte being processed. The value stored as NIB2 is then compared to ADDRESS 3. If these are not equal again a jump is performed to restart. If all the address information verifies then the first byte processed is presumed to be BYTE1, therefore the byte counter is incremented and flow continues to the line designated as RDBYTE in order to read in the second byte.

Flow proceeds in reading in the second byte as the first byte was read in. However, upon loading of the byte counter after checking parity, the byte counter will now indicate 2 therefore a jump is performed to line BYTE2 in order to check the second byte received and processed to determine if it is the second byte of the three-byte sequence. Again we verified the address flag to assure it is high. If the address flag is low a restart is performed. If the address byte flag is high then the newly stored value for NIB1 is compared to ADDRESS 2; if this is equal, then NIB2 is compared to DATA TEMP. If these comparisons indicate valid address and data information the byte counter is again incremented and a jump is performed to line RDBYTE to read in the third byte. As above the third byte is then checked to determine if the third byte read in and processed is actually the third byte of the three-byte sequence detailed above. The values now stored as NIB1 and NIB2 are compared as illustrated in the program listing.

In this manner, the program allows the UART to simulate an addressable UART for address transfer and reception checks.

During the processing of BYTE2, the data in NIB1 is stored in the data for SK and S0. During the processing of the third byte if properly verified, the data in NIB1 is stored in locations D0-D3. The data temporarily stored in NIB2 is sent to the G outputs, G0 and G1. The temporary data registers in the S0 and SK lines are then set high or low as appropriate and the carry is set to the SK value. Thereby, all the data is sent to the appropriate output.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. A satellite data transmitting and receiving system comprising, a data transmission station having a data transmission modem,
   means at said modem for phase modulating data onto an intermediate frequency signal,
   a source of an identification signal providing a signal indicative solely of a specific channel on a specific satellite,
   means for periodically phase modulating said identification signal onto the intermediate frequency signal,
   means for modulating said intermediate frequency signal onto a subcarrier frequency signal,
   means for modulating said subcarrier signal onto a radio frequency signal,
   a receiving station having a receiver,
   means for transmitting the radio frequency signal from said data transmission station to said receiving station via a satellite,
   said last mentioned means transmitting in one of the available satellite transmission bands, said receiving station comprising
   downconverter means at the receiving station for generating a local oscillator frequency to recover the subcarrier frequency from the radio frequency signal.
   a mixer,
   a voltage controlled oscillator means at the receiving station for generating a local oscillator frequency for application to said mixer to retrieve at the output of said mixer the intermediate frequency signal,
   means for retrieving said ID signal from said intermediate frequency signal and
   means for recovering said phase modulated data in response to recovery of the ID signal generated by said source.

2. A satellite data transmitting and receiving system according to claim 1 further comprising
   means utilizing said identification signal to cause said oscillator means to track the phase and frequency jitter of the subcarrier frequency signal received from said downconverter means.

3. A satellite data transmitting and receiving system according to claim 1 wherein said means for modulating data onto said intermediate frequency signal further comprises
   means for periodically generating false data in the absence of data.

4. A satellite data transmitting and receiving system according to claim 1 wherein said receiving station further comprises
   means for selecting the subcarrier freqency to be received, and
   means for selecting the intermediate frequency to be received.

5. A satellite data transmitting and receiving system according to claim 4 wherein said means to select the radio frequency comprises
   still further oscillator means for selecting the radio frequency signal,
   said still further oscillator means including at least two further oscillators and a plurality of dividers having variable division ratios whereby various frequencies may be selected, and still further means selecting the oscillator and the division ratio of said dividers to produce the desired heterodyning frequency necessary to recover the desired radio frequency.

6. A satellite data transmitting and receiving system according to claim 4 further comprising
a plurality of filters connected in parallel each having the same bandwidth and passing adjacent frequency bands to cover the bandwidth of said intermediate frequency signals,
means for preventing passage of signals through said filters,
means applying said intermediate frequency signals to all said filters, and
still further means responsive to said means for selecting the intermediate frequency to be received to permit passage of signals through the one filter covering the band of said selected intermediate frequency signal.

7. A satellite data transmitting and receiving system according to claim 6 further comprising
a further mixer,
further oscillator means for establishing a heterodyning frequency that when combined in said further mixer with the signal passed by the selected filter the signal bearing the phase shift and identification stream is reproduced.

8. A satellite data transmitting and receiving system according to claim 6 wherein said still further means comprises,
a microprocessor,
means for storing a program for controlling responses of said microprocessor to external data.
means for selecting the intermediate frequency to be processed by said receiver,
said microprocessor being responsive to said last mentioned means to select said oscillator and said division ratios.

9. A satellite data transmitting and receiving system according to claim 8 wherein said data transmission modem includes
a microprocessor identical to said microprocessor in said receiver,
means for storing a program for said last mentioned microprocessor, said program being identical to that utilized with said microprocessor in said receiver,
means for selecting the intermediate frequency of said modem,
said means for selecting in said modem being identical to the means for selecting the intermediate frequency at said receiving station,
said means for selecting having means to communicate to said microprocessor to operate in the modem on the receiver mode.

10. A satellite data transmitting and receiving system according to claim 1 wherein
said means for modulating the intermediate frequency signal onto said RF signal includes means for modulating said intermediate frequency signal with a subcarrier signal and modulating the RF signal by said subcarrier signal, and
wherein said downconverter means includes a low cost block downconverter for retrieving said subcarrier, said low cost block downconverter introducing unacceptable levels of phase and frequency jitters into the subcarrier signal,
a long loop phase detector for controlling the voltage controlled oscillator to eliminate said phase and frequency jitters including
three additional heterodyning stages to reduce the subcarrier frequency to a lower frequency from which the identifying signal is retrieved,
a comparator for comparing the phase of the identifying frequency signal with a fixed phase and frequency signal of the same frequency, and
a filter and integrator located between said comparator and said voltage controlled oscillator to complete the long loop phase detector and reduce to acceptable levels the phase and frequency jitter introduced by said block downconverter.

11. A satellite data transmitting and receiving system according to claim 1 wherein
said means for modulating the intermediate frequency signal onto said RF signal includes means for modulating said intermediate frequency signal onto a subcarrier signal and modulating the RF signal by said subcarrier signal, and
wherein said downconverter means includes a low cost block downconverter for retrieving said subcarrier, said low cost block downconverter introducing unacceptable levels of phase and frequency jitters into the subcarrier signal,
a long phase locked loop for controlling the voltage controlled oscillator to eliminate said phase and frequency jitters including
means for downconverting the intermediate frequency to a lower frequency from which data may be retrieved,
a comparator for comparing the phase of the lower frequency with a frequency of fixed phase, and
a filter and integrator connected between said last comparator and said voltage controlled oscillator to complete the long phase locked loop and reduce to acceptable levels the phase and frequency jitters introduced by said block downconverter.

* * * * *